United States Patent
Oami

(10) Patent No.: US 10,037,466 B2
(45) Date of Patent: Jul. 31, 2018

(54) VIDEO PROCESSING APPARATUS, VIDEO PROCESSING METHOD, AND VIDEO PROCESSING PROGRAM

(71) Applicant: NEC Corporation, Tokyo (JP)

(72) Inventor: Ryoma Oami, Tokyo (JP)

(73) Assignee: NEC Corporation, Tokyo (JP)

( * ) Notice: Subject to any disclaimer, the term of this patent is extended or adjusted under 35 U.S.C. 154(b) by 140 days.

(21) Appl. No.: 14/913,469

(22) PCT Filed: Aug. 5, 2014

(86) PCT No.: PCT/JP2014/070547
§ 371 (c)(1),
(2) Date: Feb. 22, 2016

(87) PCT Pub. No.: WO2015/025704
PCT Pub. Date: Feb. 26, 2015

(65) Prior Publication Data
US 2016/0203367 A1    Jul. 14, 2016

(30) Foreign Application Priority Data
Aug. 23, 2013    (JP) ................... 2013-173165

(51) Int. Cl.
*G06K 9/00* (2006.01)
*G06F 17/30* (2006.01)
(Continued)

(52) U.S. Cl.
CPC ...... *G06K 9/00711* (2013.01); *G06F 17/3079* (2013.01); *G06F 17/30256* (2013.01);
(Continued)

(58) Field of Classification Search
None
See application file for complete search history.

(56) References Cited

U.S. PATENT DOCUMENTS 5,627,915 A * 5/1997 Rosser ............... G06K 9/6282
                                                         382/219
6,741,655 B1 * 5/2004 Chang ............... G06F 17/30247
                                                         375/240.08
(Continued)

FOREIGN PATENT DOCUMENTS

JP    2010-198207    9/2010
JP    2012-8791      1/2012
(Continued)

OTHER PUBLICATIONS

Yusuke Takahashi, Yasufumi Hirakawa, and Ryoma Oami, "Visual Features Extraction for Human Identification with Privacy Protection", ITE (The Institute of Image Information and Television Engineers) Technical Report, 36(18), pp. 23-26, Mar. 23, 2012.
(Continued)

*Primary Examiner* — Matthew Bella
*Assistant Examiner* — Jose M Torres
(74) *Attorney, Agent, or Firm* — Finnegan, Henderson, Farabow, Garrett & Dunner, L.L.P.

(57) ABSTRACT

This invention provides a video processing apparatus for suppressing a decrease in search accuracy of an object of a search target based on a feature extracted from a degraded image in a video. The video processing apparatus includes an image degradation estimator that extracts an image in an image region used as an index of image degradation from a video and estimates a degree of image degradation in the image region, a feature extractor that extracts a feature of an object of a search target from the video, a feature database that stores the feature of the object of the search target, and a matcher that controls matching between the extracted feature and the stored feature based on the degree of image degradation estimated by the image degradation estimator, when searching for the object from the video.

17 Claims, 47 Drawing Sheets

(51) Int. Cl.
*G06K 9/46* (2006.01)
*G06K 9/62* (2006.01)
*G06T 7/00* (2017.01)
*G06K 9/03* (2006.01)
*G06T 7/90* (2017.01)
*H04N 5/232* (2006.01)
*G08G 1/017* (2006.01)
*G08G 1/04* (2006.01)

(52) U.S. Cl.
CPC ......... *G06K 9/00228* (2013.01); *G06K 9/036* (2013.01); *G06K 9/4652* (2013.01); *G06K 9/6202* (2013.01); *G06K 9/6215* (2013.01); *G06T 7/0002* (2013.01); *G06T 7/90* (2017.01); *H04N 5/23229* (2013.01); *G06K 2209/15* (2013.01); *G06T 2207/10016* (2013.01); *G06T 2207/20008* (2013.01); *G06T 2207/30168* (2013.01); *G06T 2207/30201* (2013.01); *G08G 1/0175* (2013.01); *G08G 1/04* (2013.01); *H04N 5/23219* (2013.01)

(56) References Cited

U.S. PATENT DOCUMENTS

| | | | | |
|---|---|---|---|---|
| 2005/0162515 | A1* | 7/2005 | Venetianer | G06F 17/3079 348/143 |
| 2009/0040311 | A1* | 2/2009 | Okamoto | H04N 17/004 348/181 |
| 2009/0060294 | A1* | 3/2009 | Matsubara | G06K 9/00496 382/118 |
| 2009/0110303 | A1* | 4/2009 | Nishiyama | G06K 9/00228 382/225 |
| 2011/0199499 | A1* | 8/2011 | Tomita | G06K 9/00268 348/222.1 |
| 2012/0030208 | A1* | 2/2012 | Brown | G06F 17/30793 707/741 |
| 2012/0201468 | A1 | 8/2012 | Oami et al. | |
| 2013/0044944 | A1* | 2/2013 | Wang | G06F 17/3025 382/165 |
| 2013/0070973 | A1 | 3/2013 | Saito et al. | |
| 2014/0301634 | A1 | 10/2014 | Ishii | |
| 2015/0023596 | A1 | 1/2015 | Oami et al. | |
| 2015/0294186 | A1* | 10/2015 | Ali | G06K 9/40 382/199 |

FOREIGN PATENT DOCUMENTS

| | | |
|---|---|---|
| JP | 2013-65119 | 4/2013 |
| WO | WO 2011/046128 A1 | 4/2011 |
| WO | WO 2013/088707 A1 | 6/2013 |

OTHER PUBLICATIONS

International Search Report and Written Opinion dated Oct. 21, 2014 in corresponding PCT International Application.

* cited by examiner

FIG. 4C

| | MATCHING FEATURE ID 421 | | EXTRACTED FEATURE 422 | EACH MATCHING RESULT 423 | RELIABILITY (WEIGHT) 424 | ... | TOTAL MATCHING RESULT 425 |
|---|---|---|---|---|---|---|---|
| 405a → | PORTION | FEATURE | | | | | |
| | FACE | EYE/NOSE/MOUTH | | | | | |
| | | GLASSES/MASK | | | | | |
| | | ... | | | | | |
| | CLOTHES | COLOR | | | | | |
| | | PATTERN | | | | | |
| | | ... | | | | | |
| | PORTABLE OBJECT (BAG) | PATTERN | | | | | |
| | | ... | | | | | |
| | BODY SHAPE | HEIGHT | | | | | |
| | ... | ... | | | | | |

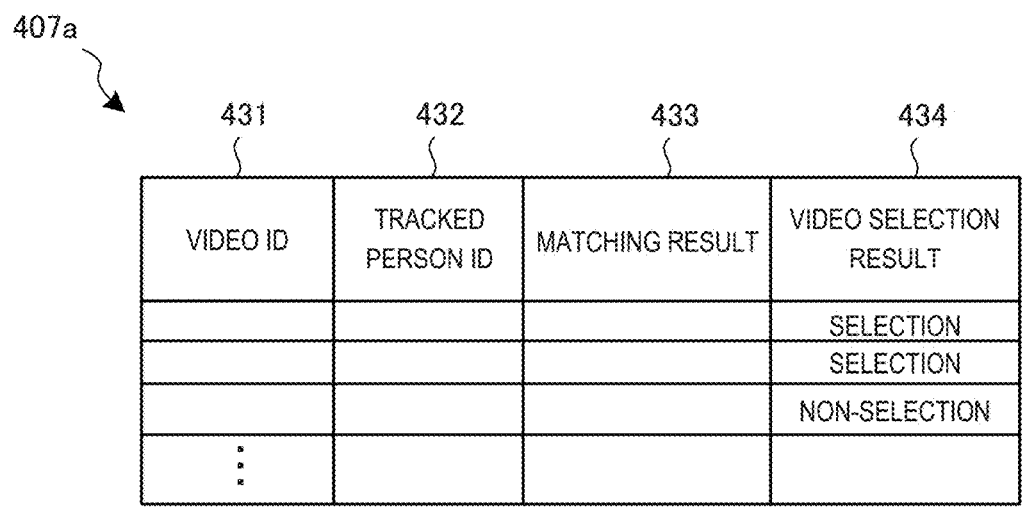
F I G. 4D

FIG. 5B

| SEARCH CLOTHING ID | COLOR FEATURE | PATTERN FEATURE | SHAPE FEATURE | ... |
|---|---|---|---|---|
| | | | | |
| | | | | |
| | | | | |
| | | | | |

| INTENDED FEATURE | | RELIABILITY REDUCTION FACTOR | DETERMINATION RELIABILITY | WEIGHT AT TIME OF MATCHING (0: DISUSE) |
| FEATURE | DETAILS | | | |
|---|---|---|---|---|
| COLOR | RED | ⋮ | | |
| | BLUE | ⋮ | | |
| | ⋮ | | | |
| PATTERN | STRIPE | ⋮ | | |
| | STIPPLE (INCLUDING DOTS) | ⋮ | | |
| | GRID | ⋮ | | |
| | LINE DRAWING | ⋮ | | |
| | PRINT PATTERN | ⋮ | | |
| | ⋮ | | | |
| SHAPE | POCKET | ⋮ | | |
| | ⋮ | | | |
| ⋮ | | | | |

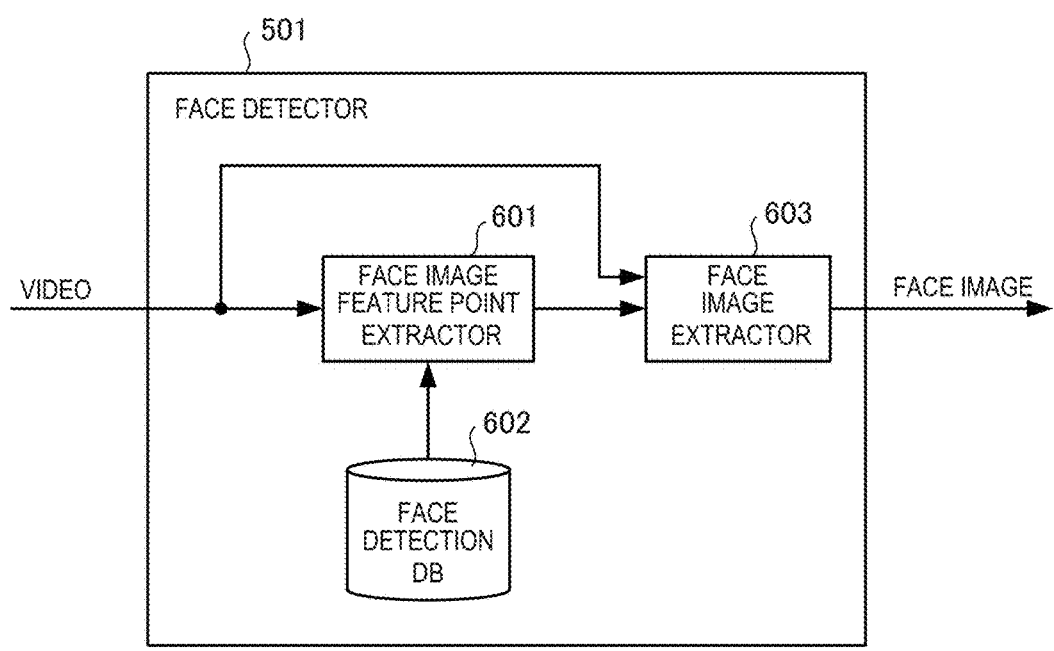
F I G. 6

502a

| IMAGE DEGRADATION INDEX || IMAGE DEGRADATION DEGREE |
|---|---|---|
| CONTENTS | DEGREE | |
| DEFOCUSING | | |
| | | |
| | ⋮ | |
| FOG | | |
| | | |
| | ⋮ | |
| RAINDROP | | |
| | | |
| | ⋮ | |
| NIGHT STREETLIGHT | | |
| | ⋮ | |
| BACKLIGHT | | |
| | ⋮ | |
| ⋮ | | |

F I G. 7C

230a

| IDENTIFICATION TARGET ID | INTENTED FEATURE | | ESTIMATED IMAGE DEGRADATION DEGREE | RELIABILITY DETERMINATION RESULT | WEIGHT AT TIME OF MATCHING (0: DISUSE) | MATCHING RESULT |
|---|---|---|---|---|---|---|
| | FEATURE | DETAILS | | | | |
| CLOTHING ID | COLOR | RED | | | | |
| | PATTERN | STRIPE | | | | |
| | SHAPE | POCKET | | | | |
| | ... | | | | | |
| 811 | 812 | | 813 | 814 | 815 | 816 |

FIG. 8B

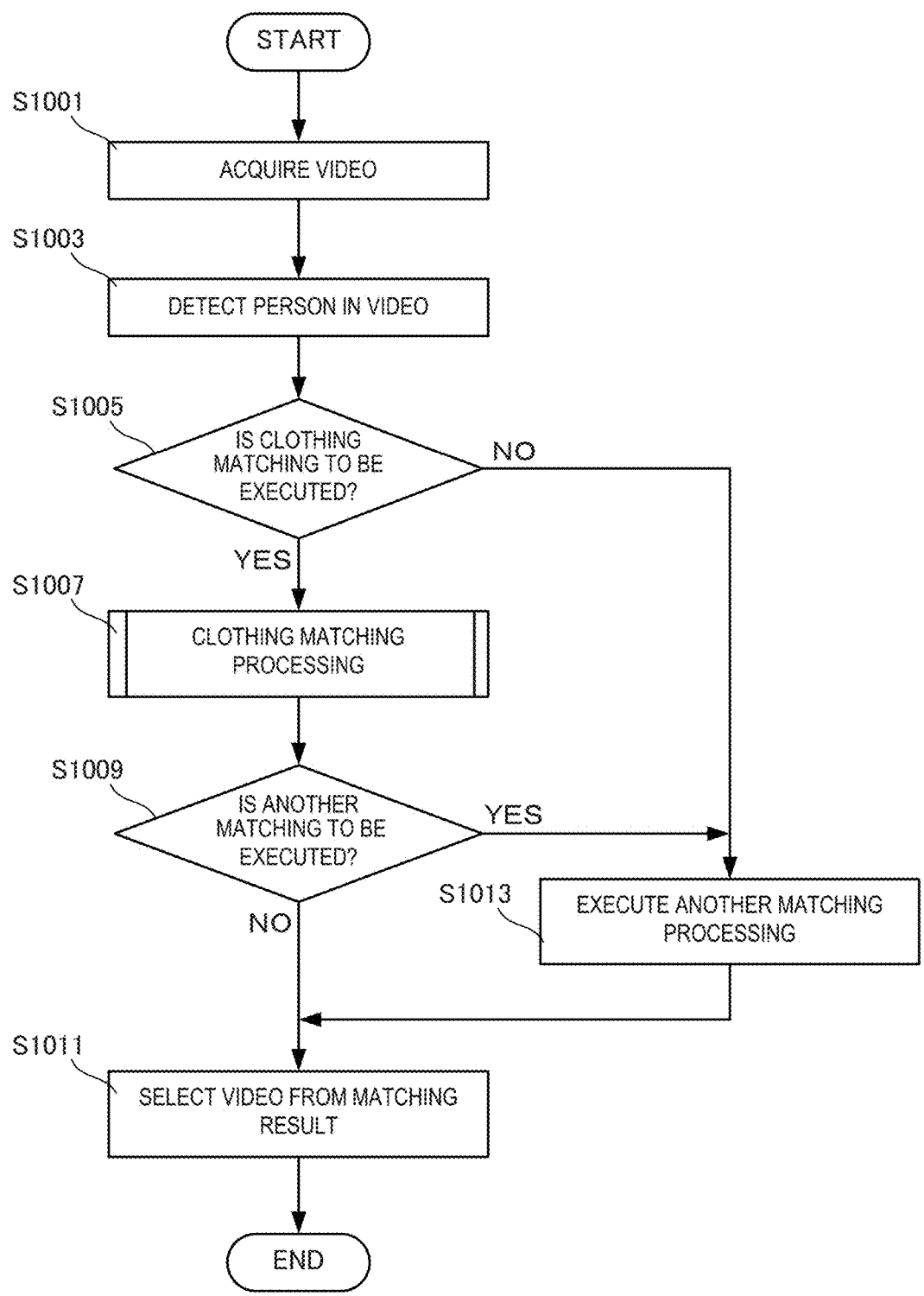
F I G. 10

| MATCHING FEATURE ID 1321 | | EXTRACTED FEATURE 1322 | EACH MATCHING RESULT 1323 | RELIABILITY (WEIGHT) 1324 | ... | TOTAL MATCHING RESULT 1325 |
|---|---|---|---|---|---|---|
| PORTION | FEATURE | | | | | |
| LICENSE PLATE | COLOR | | | | | |
| | REGISTRATION NUMBER | | | | | |
| | ... | | | | | |
| VEHICLE BODY | COLOR | | | | | |
| | PATTERN | | | | | |
| | ... | | | | | |
| ATTACHMENT (LOADED OBJECT) | PATTERN | | | | | |
| | SIZE | | | | | |
| | ... | | | | | |
| SHAPE | ... | | | | | |

1305a

F I G. 13B

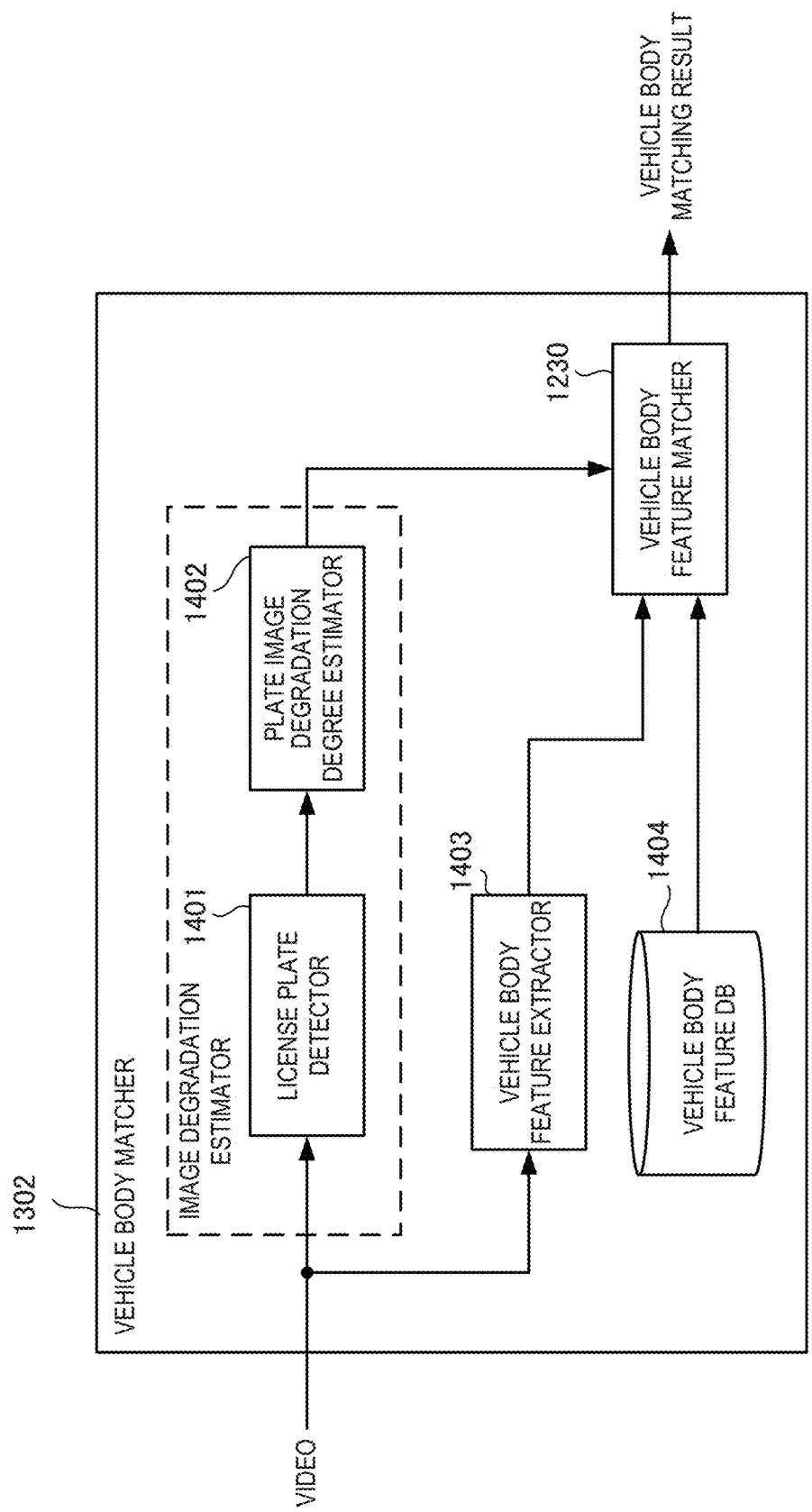
F I G. 14A

FIG. 14B

| SEARCH VEHICLE BODY ID | COLOR FEATURE | PATTERN FEATURE | SHAPE FEATURE | ... |
|---|---|---|---|---|
|  |  |  |  |  |
|  |  |  |  |  |
|  |  |  |  |  |
|  |  |  |  |  |

| INTENDED FEATURE | | RELIABILITY REDUCTION FACTOR | DETERMINATION RELIABILITY | WEIGHT AT TIME OF MATCHING (0: DISUSE) |
|---|---|---|---|---|
| FEATURE | DETAILS | | | |
| COLOR | RED | ⋮ | | |
|  | BLUE | ⋮ | | |
|  | ⋮ | | | |
| VEHICLE BODY PATTERN | SEDAN | ⋮ | | |
|  | COUPE | ⋮ | | |
|  | WAGON | ⋮ | | |
|  | MINIVAN | ⋮ | | |
|  | PICKUP | ⋮ | | |
|  | ⋮ | | | |
| MODEL | LICENSE PLATE | ⋮ | | |
|  |  | | | |
| ⋮ | | | | |

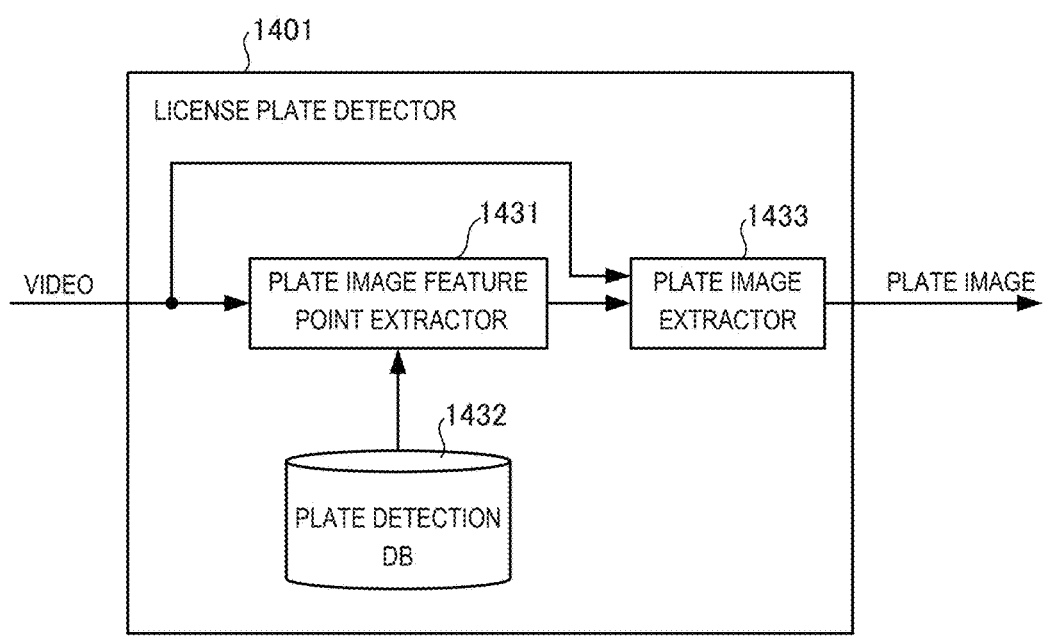
F I G. 14C

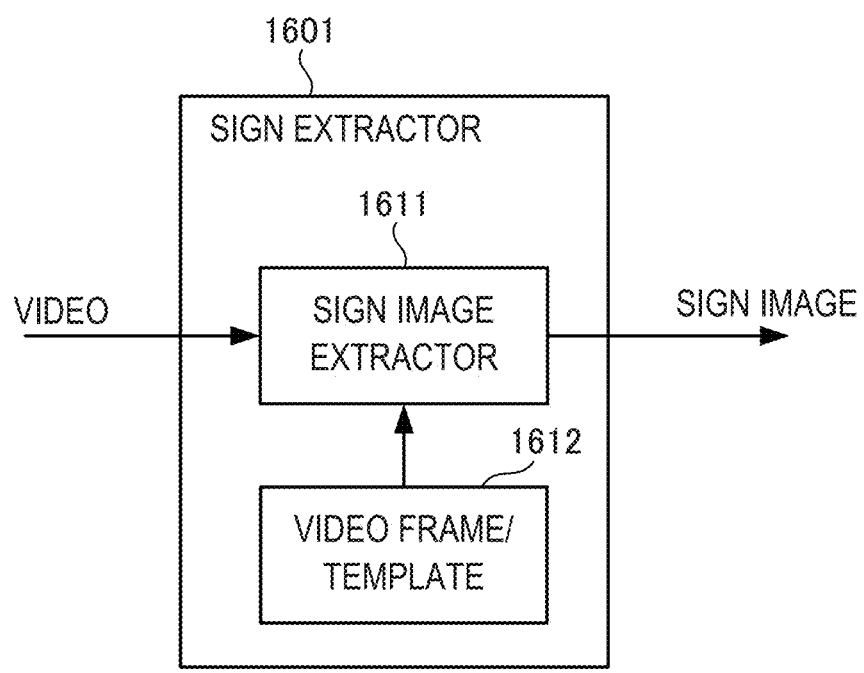
F I G. 16B

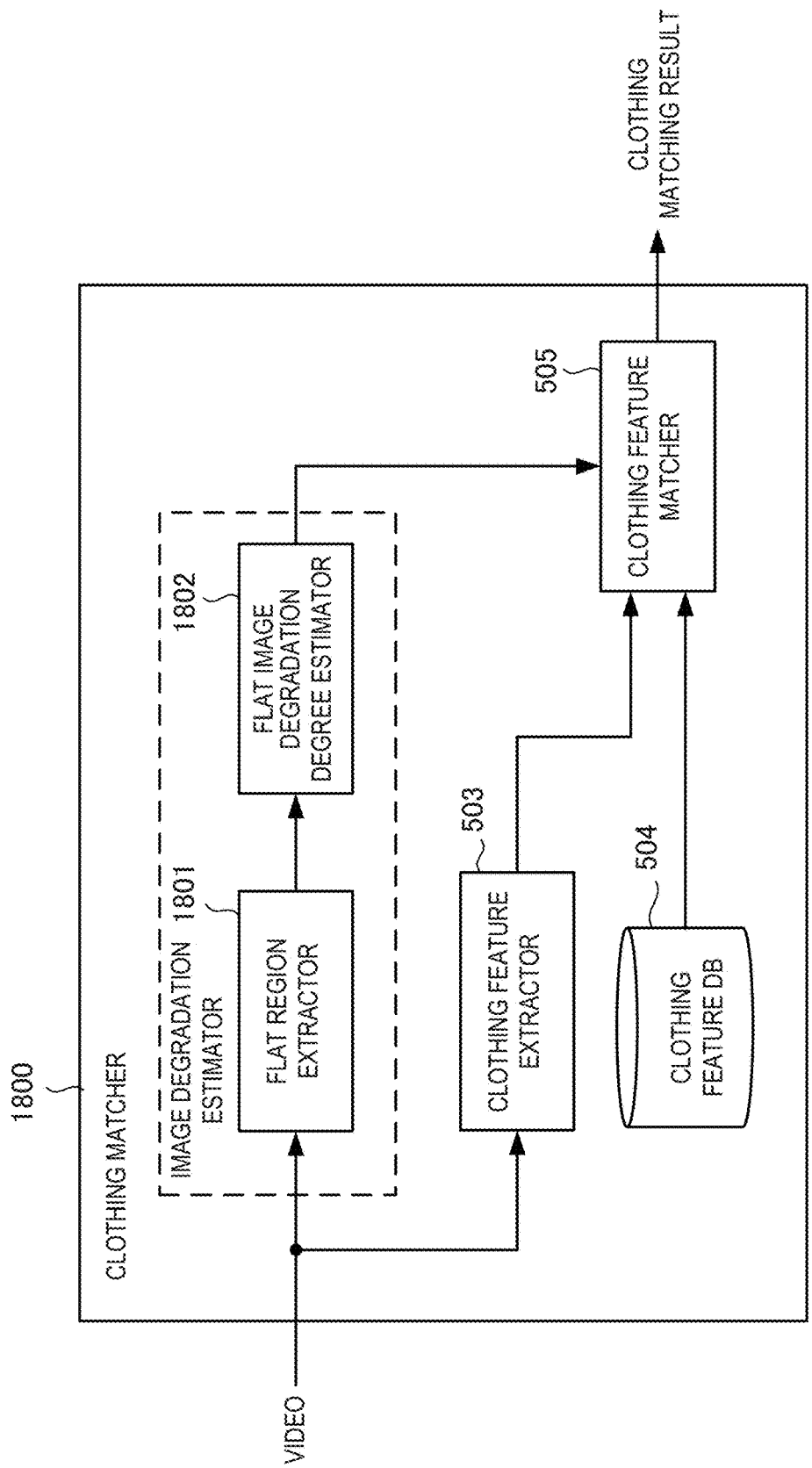
F I G. 18A

| 1821 | 1822 | 1823 | 1824 | 1825 | 1826 |
|---|---|---|---|---|---|
| FLAT REGION ID | FLAT REGION POSITION | EXTRACTED FLAT IMAGE | EXTRACTED DATA OF VARIATIONS | REFERENCE FLAT IMAGE | IMAGE DEGRADATION DEGREE |
| ... | | | | | |

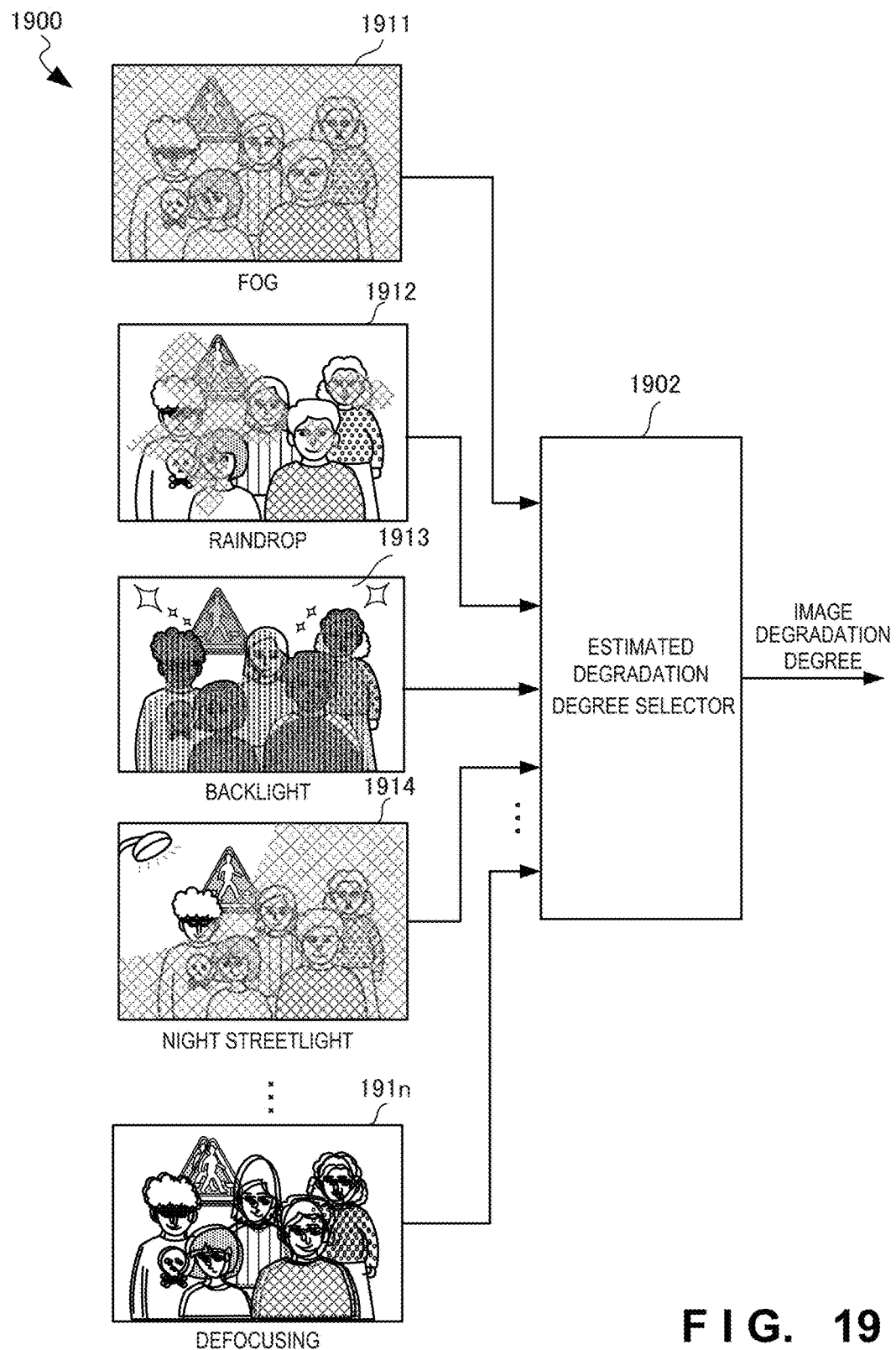
F I G. 19

| DEGRADATION FACTOR | WEIGHT | PRIORITY LEVEL | IMAGE DEGRADATION DEGREE |
|---|---|---|---|
|  |  |  |  |
|  |  |  |  |
|  |  |  |  |
|  |  |  |  |
|  |  |  |  |
|  |  |  |  |
|  |  |  |  |

F I G. 21B

2202a

| PATTERN TYPE | DEGRADATION DEGREE ESTIMATION IMAGE | ESTIMATED DEGRADATION DEGREE | CALCULATED DEGRADATION DEGREE | WEIGHT (0: DISUSE) |
|---|---|---|---|---|
| STRIPE | | | | |
| | ⋮ | | | |
| | | | | |
| STIPPLE (INCLUDING DOTS) | | | | |
| | ⋮ | | | |
| | | | | |
| PRINT PATTERN | | | | |
| | ⋮ | | | |
| PLAIN PATTERN | | | | |
| | ⋮ | | | |
| ⋮ | | | | |

2401, 2402, 2403, 2404, 2405

F I G. 24

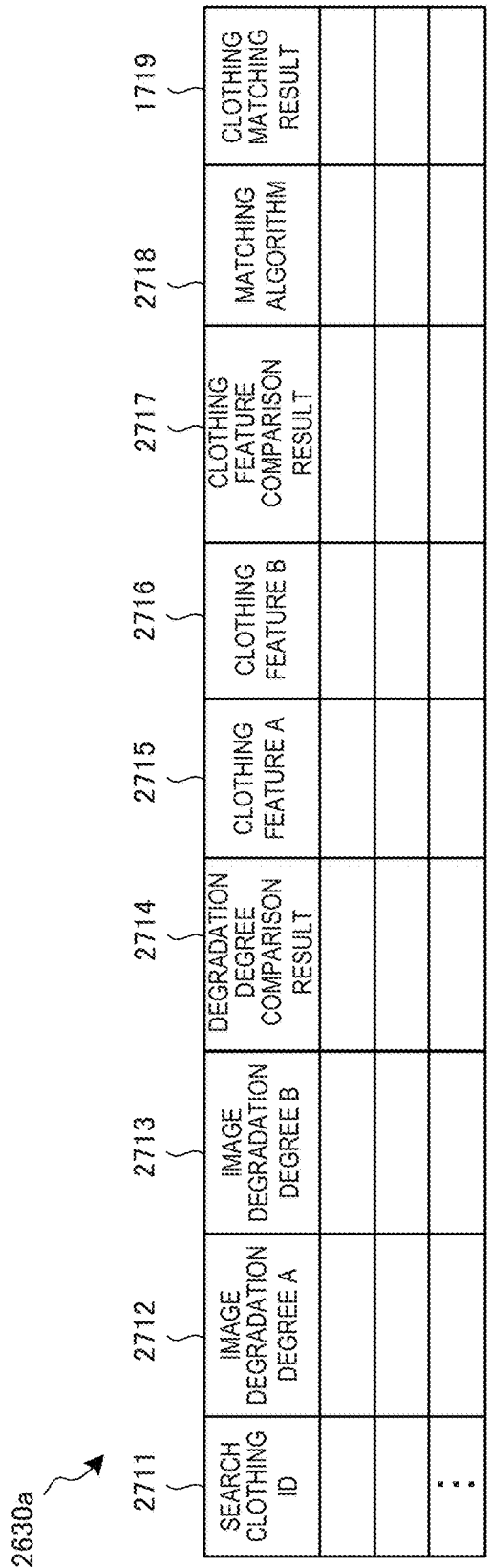
F I G. 27B

VIDEO PROCESSING APPARATUS, VIDEO PROCESSING METHOD, AND VIDEO PROCESSING PROGRAM

CROSS-REFERENCE TO RELATED PATENT APPLICATIONS

This application is a National Stage Entry of International Application No. PCT/JP2014/070547, filed Aug. 5, 2014, which claims priority from Japanese Patent Application No. 2013-173165, filed Aug. 23, 2013. The entire contents of the above-referenced applications are expressly incorporated herein by reference.

TECHNICAL FIELD

The present invention relates to a technique of searching for a target object from a video.

BACKGROUND ART

In the above technical field, patent literature 1 discloses a technique of searching for a person dressed in a color or pattern designated by query text of clothes from a video. Patent literature 2 discloses a technique of determining area security by comparing the feature of the color or pattern of the clothes of a person in a video with the feature of a color or pattern stored in advance. Non-patent literature 1 describes a technique of detecting a person position from a video based on a head, and extracting the features of the color and pattern of the upper half of a body model as a person feature.

CITATION LIST

Patent Literature

Patent literature 1: International Publication No. 2011-046128
Patent literature 2: Japanese Patent Laid-Open No. 2010-198207

Non-Patent Literature

Non-patent literature 1: Yusuke Takahashi, Yasufumi Hirakawa, and Ryoma Oami, "Visual Features Extraction for Human Identification with Privacy Protection", ITE (The Institute of Image Information and Television Engineers) Technical Report, 36(18), pp. 23-26, Mar. 23, 2012.

SUMMARY OF THE INVENTION

Technical Problem

The techniques described in the above literatures do not consider degradation of an image in a video acquired by a camera, which is caused by a device condition such as a camera shake or an image capturing environment such as weather. As a result, it is impossible to solve the problem that the search accuracy of a person based on a feature extracted from the degraded image in the video decreases.

The present invention enables to provide a technique of solving the above-described problem, and suppressing a decrease in search accuracy of an object of a search target based on a feature extracted from a degraded image in a video.

Solution to Problem

One aspect of the present invention provides a video processing apparatus comprising:
an image degradation estimator that extracts an image in an image region used as an index of image degradation from a video and estimates a degree of image degradation in the image region;
a feature extractor that extracts a feature of an object of a search target from the video;
a feature database that stores the feature of the object of the search target; and
a matcher that controls matching between the extracted feature and the stored feature based on the degree of image degradation estimated by said image degradation estimator, when searching for the object from the video.

Another aspect of the present invention provides a video processing method comprising:
extracting an image in an image region used as an index of image degradation from a video and estimating a degree of image degradation in the image region;
extracting a feature of an object of a search target from the video;
storing the feature of the object of the search target in a feature database; and
controlling matching between the extracted feature and the stored feature based on the degree of image degradation estimated in the estimating, when searching for the object from the video.

Still other aspect of the present invention provides a video processing program for causing a computer to execute a method, comprising:
extracting an image in an image region used as an index of image degradation from a video and estimating a degree of image degradation in the image region;
extracting a feature of an object of a search target from the video;
storing the feature of the object of the search target in a feature database; and
controlling matching between the extracted feature and the stored feature based on the degree of image degradation estimated in the estimating, when searching for the object from the video.

Advantageous Effects of Invention

According to the present invention, it is possible to suppress a decrease in the search accuracy of an object of a search target based on a feature extracted from a degraded image in a video.

BRIEF DESCRIPTION OF DRAWINGS

FIG. 4C is a table showing the structure of a person matching table used by a search person matcher according to the second embodiment of the present invention;

FIG. 4D is a table showing the structure of a video selection table used by a video selector according to the second embodiment of the present invention;

FIG. 5B is a view showing the structure of a clothing feature DB of the clothing matcher according to the second embodiment of the present invention;

FIG. 6 is a block diagram showing the functional arrangement of a face detector of the clothing matcher according to the second embodiment of the present invention;

FIG. 7C is a table showing the structure of a face image degradation degree estimation table used by the face image degradation degree estimator according to the second embodiment of the present invention;

FIG. 8B is a table showing the structure of a clothing feature matching table used by the clothing feature matcher according to the second embodiment of the present invention;

FIG. 10 is a flowchart illustrating the processing procedure of the video processing apparatus according to the second embodiment of the present invention;

FIG. 13B is a table showing the structure of a vehicle matching table used by a search vehicle matcher according to the third embodiment of the present invention;

FIG. 14A is a block diagram showing the functional arrangement of a vehicle body matcher of the video processing apparatus according to the third embodiment of the present invention;

FIG. 14B is a view showing the structure of a vehicle body feature DB of the vehicle body matcher according to the third embodiment of the present invention;

FIG. 14C is a block diagram showing the functional arrangement of a license plate detector of the vehicle body matcher according to the third embodiment of the present invention;

FIG. 16B is a block diagram showing the functional arrangement of a sign extractor of the clothing matcher according to the fourth embodiment of the present invention;

FIG. 18A is a block diagram showing the functional arrangement of a clothing matcher of the video processing apparatus according to the fifth embodiment of the present invention;

FIG. 18B is a table showing the structure of a flat image degradation degree estimation table used by a flat image degradation degree estimator according to the fifth embodiment of the present invention;

FIG. 19 is a view showing the outline of processing by a video processing apparatus according to the sixth embodiment of the present invention;

FIG. 21B is a table showing the structure of an image degradation degree estimation table used by an image degradation degree estimator according to the seventh embodiment of the present invention;

FIG. 24 is a table showing the structure of an estimated degradation degree calculation table used by a set degradation degree calculator according to the eighth embodiment of the present invention;

FIG. 27B is a table showing the structure of a clothing feature matching table used by the clothing feature matcher according to the 10th embodiment of the present invention.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

"An object of a search target" used in this specification includes a person and a vehicle each of which has features. The present invention, however, is not limited to them, and the object conceptually includes all targets to be searched for from a video. For example, the clothes of a person, a specific bag as a portable object of a person, or the like may be set as an object. An attachment or loaded object of a vehicle may be set as an object. That is, all target objects to be searched for can be objects.

First Embodiment

A video processing apparatus 100 as the first embodiment of the present invention will be described with reference to FIG. 1. The video processing apparatus 100 is an apparatus for searching for a target object from a video.

Figure 1:
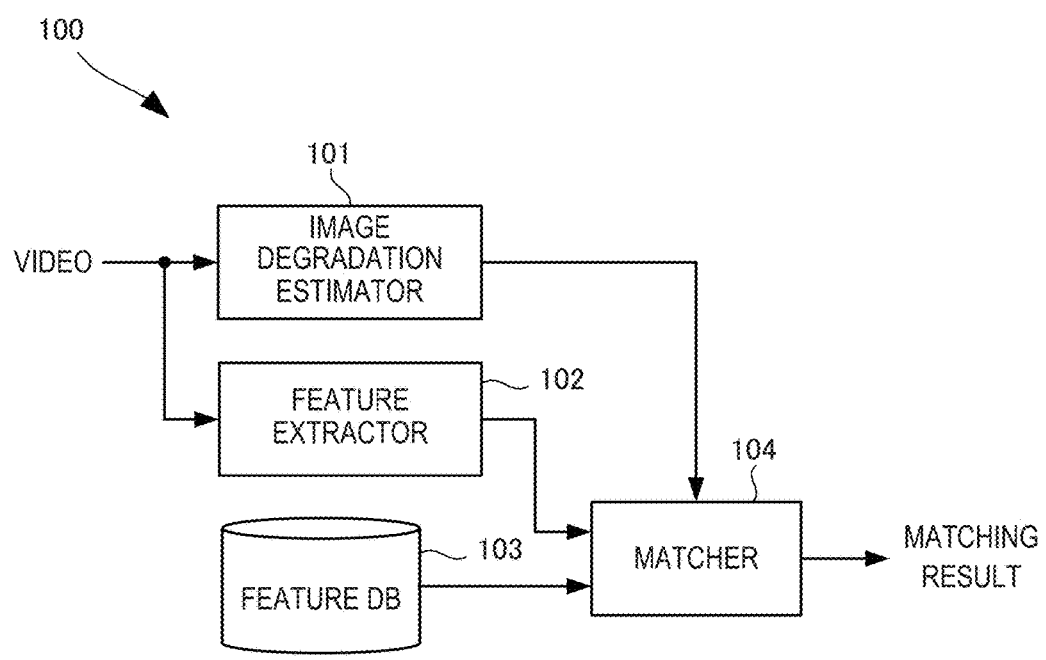
FIG. 1 is a block diagram showing the arrangement of a video processing apparatus according to the first embodiment of the present invention.

As shown in FIG. 1, the video processing apparatus 100 includes an image degradation estimator 101, a feature extractor 102, a feature database 103, and a matcher 104. The image degradation estimator 101 extracts an image of an image region serving as an index of image degradation from a video, and estimates the degree of image degradation of the image of the image region. The feature extractor 102 extracts the feature of an object of a search target from the video. The feature database 103 stores the feature of the object of a search target. When searching for the object from the video, the matcher 104 controls matching between the extracted feature and the stored feature based on the degree of image degradation estimated by the image degradation estimator 101.

According to this embodiment, it is possible to suppress a decrease in search accuracy of an object of a search target based on a feature extracted from a degraded image in a video.

Second Embodiment

A video processing apparatus according to the second embodiment of the present invention will be described. The video processing apparatus according to this embodiment searches for a person as an object from a video, and selects a video including the person. In this embodiment, as a feature for searching for a person, the feature of the color or pattern of the clothes of the person, the feature of the color or pattern of a portable object, or the like is used. The degree of image degradation is estimated based on the contour of a face image that is a portion of the person of a search target in the video, a pattern or edge included in a face region, or the like. Based on the estimated image degradation degree, for example, clothing feature matching is controlled.

The image degradation degree is an index representing the degree of degradation of an image of an object of a search target, and may be defined for each degradation factor (for example, a blur, a shake, or backlight), or an index obtained by converting a value obtained for each factor into an abstracted value independent of the factor. For example, in the case of a blur, the degree of blur can be expressed by an estimated value of a parameter of a point spread function, and the image degradation degree may be defined in association with the parameter. Alternatively, the parameter itself may be defined as the image degradation degree. Note that a method of describing the degree of blur is not limited to this and another method may be adopted.

<<Outline of Processing by Video Processing Apparatus>>

Figure 2:
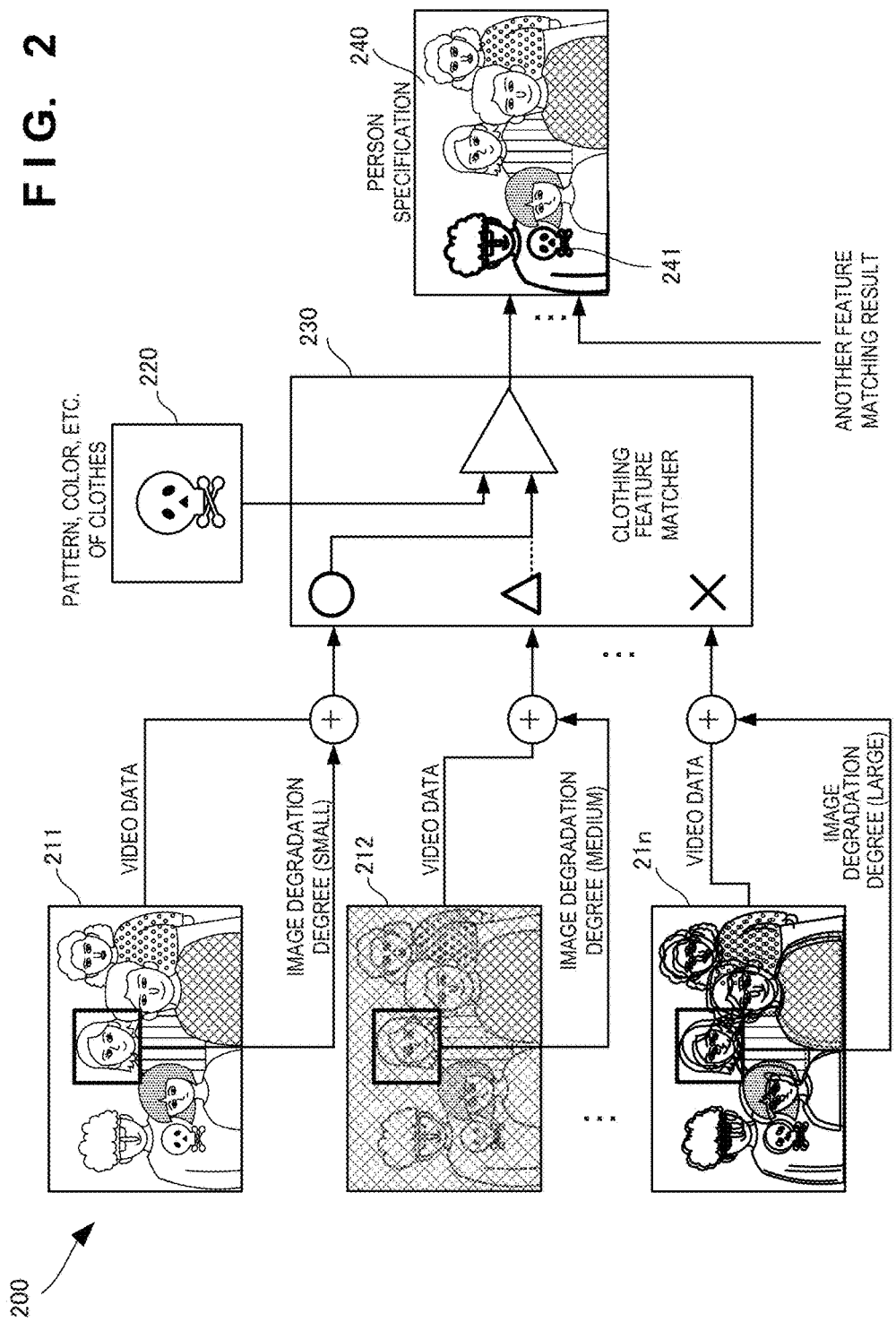
FIG. 2 is a view showing the outline of processing by a video processing apparatus according to the second embodiment of the present invention.

FIG. 2 is a view showing the outline of processing by a video processing apparatus 200 according to this embodiment.

The video processing apparatus 200 searches for a characteristic person from video data of various videos 211 to 21n. For example, a person 241 dressed in skull pattern clothes is specified from a video 240, and a video including the person 241 is selected. In this person search operation, a property such as the color or pattern of the clothes of the person is extracted as a feature, and the clothing feature matcher 230 performs matching with a feature 220 such as the color or pattern of clothes stored in advance, thereby specifying the person.

At this time, in the videos 211 to 21n, image degradation occurs due to a camera condition (for example, a shake or defocusing) or an image capturing environment (for example, a fog, raindrops, or backlight) such as weather. Referring to FIG. 2, the video 211 is a video without image degradation, the video 212 is a video with image degradation caused by a fog, and the video 21n is a video with image degradation caused by a shake or defocusing. If matching is performed using, as a feature, the pattern of the clothes of the person in the video with image degradation, the reliability of a person search lowers due to a decrease in accuracy of the feature. For example, if the clothes have a stripe, dot, or grid pattern, lines or dots cannot be recognized as a clearly separated pattern due to image degradation. On the other hand, a person dressed in blur pattern clothes may be unwantedly recognized as a search target.

In this embodiment, when performing feature matching of a person search using the pattern of clothes as one feature, the degree of image degradation with which the accuracy of feature matching of the pattern of clothes readily lowers is estimated by comparison between face images, thereby generating an estimated degradation degree. In feature matching, the reliability of matching is generated in association with the estimated degradation degree, and sent. Alternatively, if the estimated degradation degree exceeds a predetermined threshold and the reliability significantly lowers, for example, the result of feature matching of the color of clothes with which the reliability of feature matching does not lower is adopted without performing feature matching of the pattern of clothes. Note that in an intermediate state, each feature matching operation is weighted to generate a matching result.

With this processing, the accuracy decrease of feature matching due to the occurrence of image degradation is prevented, thereby maintaining the accuracy of a person search even in image degradation.

<<System Configuration>>

Figure 3:
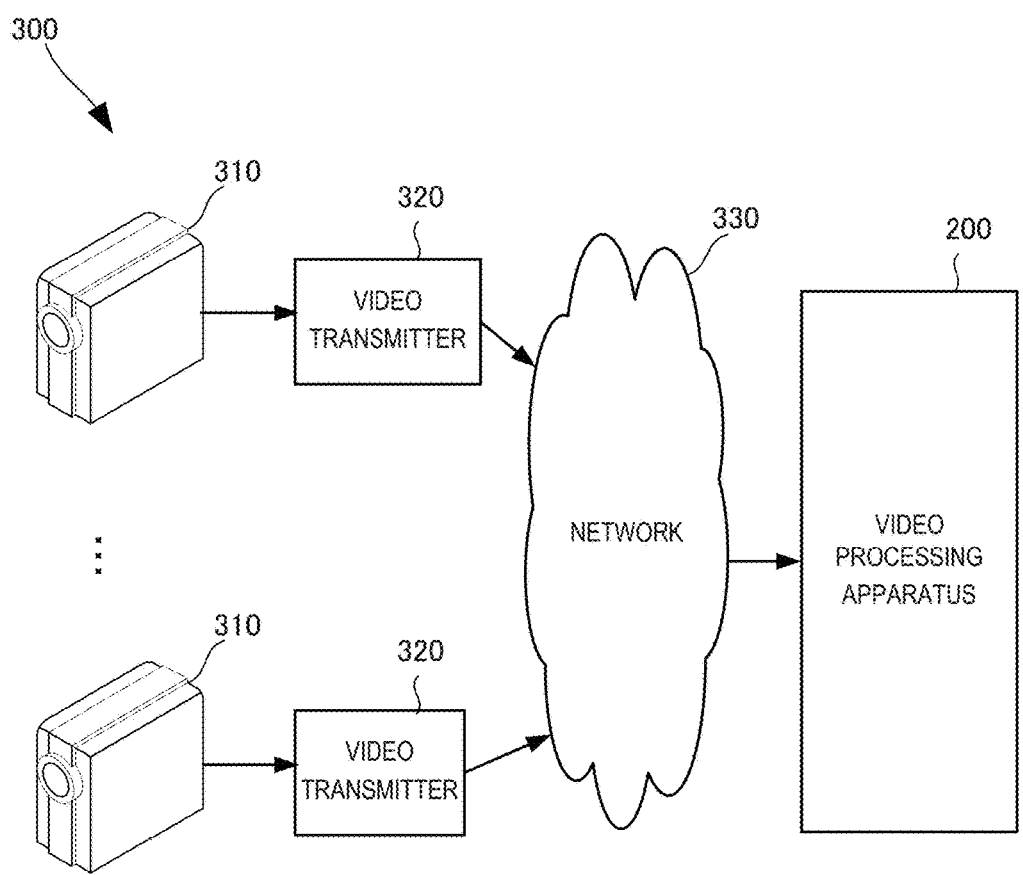
FIG. 3 is a block diagram showing the configuration of a video processing system including the video processing apparatus according to the second embodiment of the present invention.

FIG. 3 is a block diagram showing the configuration of a video processing system 300 including the video processing apparatus 200 according to this embodiment.

The video processing system 300 includes a surveillance camera 310, a video transmitter 320, a network 330, and the video processing apparatus 200 according to this embodiment. The video transmitter 320 transmits a video captured by the camera 310 to the video processing apparatus 200 via the network 330. Note that the video transmitter 320 may be integrated with the camera 310. The video processing apparatus 200 according to this embodiment searches for an object of a search target (a person in this example) from the video of the camera 310, and selects a video including the object (for example, an object whose similarity is equal to or higher than a predetermined value), as shown in FIG. 2. The object from the selected video may be further analyzed. Note that in this embodiment, processing of further analyzing the object from the selected video will not be described in detail.

<<Functional Arrangement of Video Processing Apparatus>>

Figure 4A:
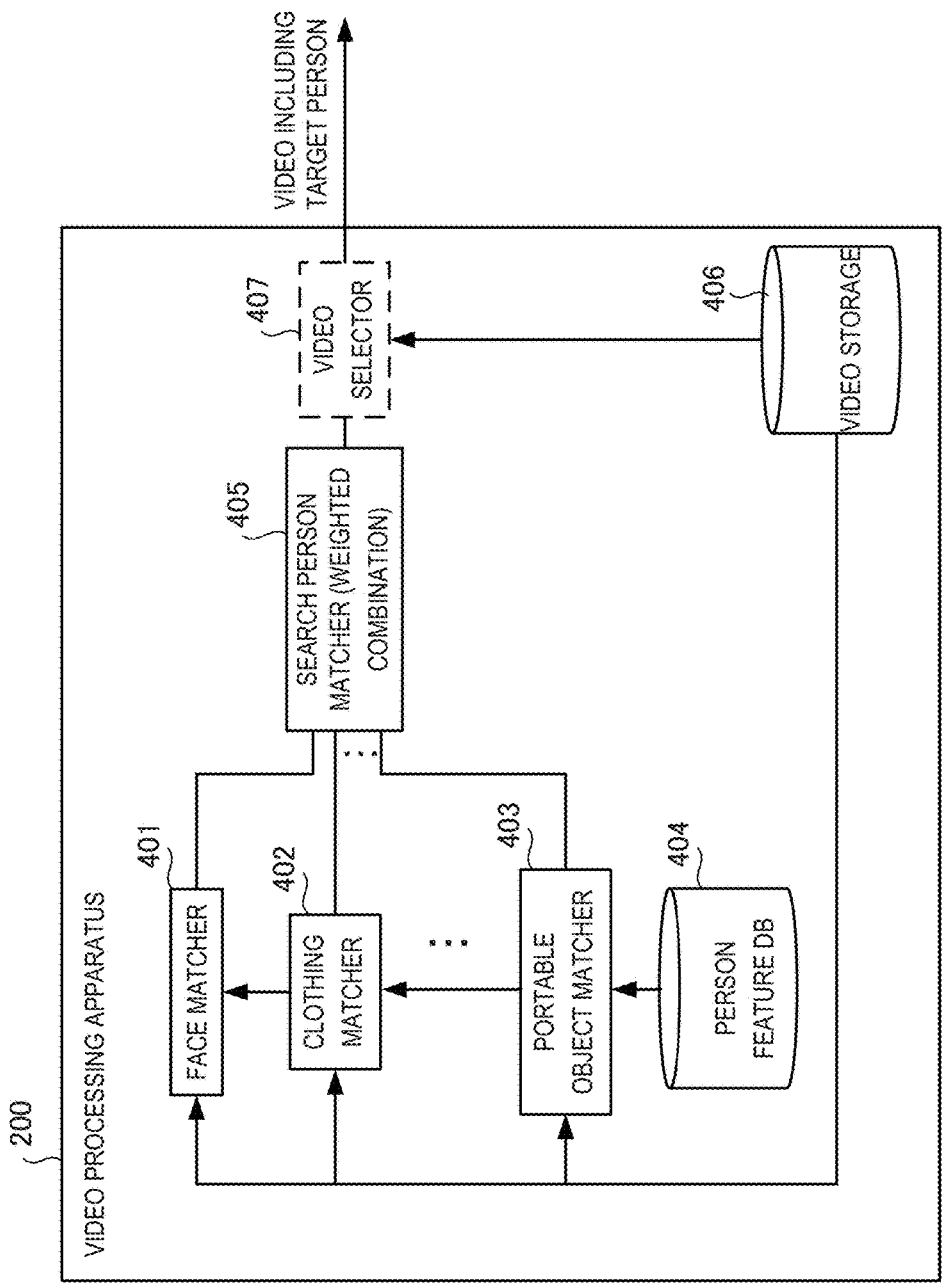
FIG. 4A is a block diagram showing the functional arrangement of the video processing apparatus according to the second embodiment of the present invention.

FIG. 4A is a block diagram showing the functional arrangement of the video processing apparatus 200 according to this embodiment.

The video processing apparatus 200 includes a plurality of matchers 401 to 403, a person feature DB 404, a search person matcher 405, and a video storage 406. The video processing apparatus 200 may also include a video selector 407 indicated by broken lines. The plurality of matchers 401 to 403 include, for example, the face matcher 401 for performing matching by the face of the search person, the clothing matcher 402 for performing matching by the clothes of the search person, and the portable object matcher 403 for performing matching by the portable object of the search person. The person feature DB 404 provides the respective features of the person for matching, which are stored in advance, to the plurality of matchers 401 to 403. The video storage 406 stores the video, transmitted from the camera 310, to be searchable. The search person matcher 405 searches for the person in the video by combining the matching results of the plurality of matchers 401 to 403. The video selector 407 extracts, from the video storage 406, the video including the person having been determined to be matched by the search person matcher 405, and sends it to next processing such as analysis. Note that the selected video may be selected as an entire video, as a time-unit video, or as a video including the search person.

(Person Feature DB)

Figure 4B:
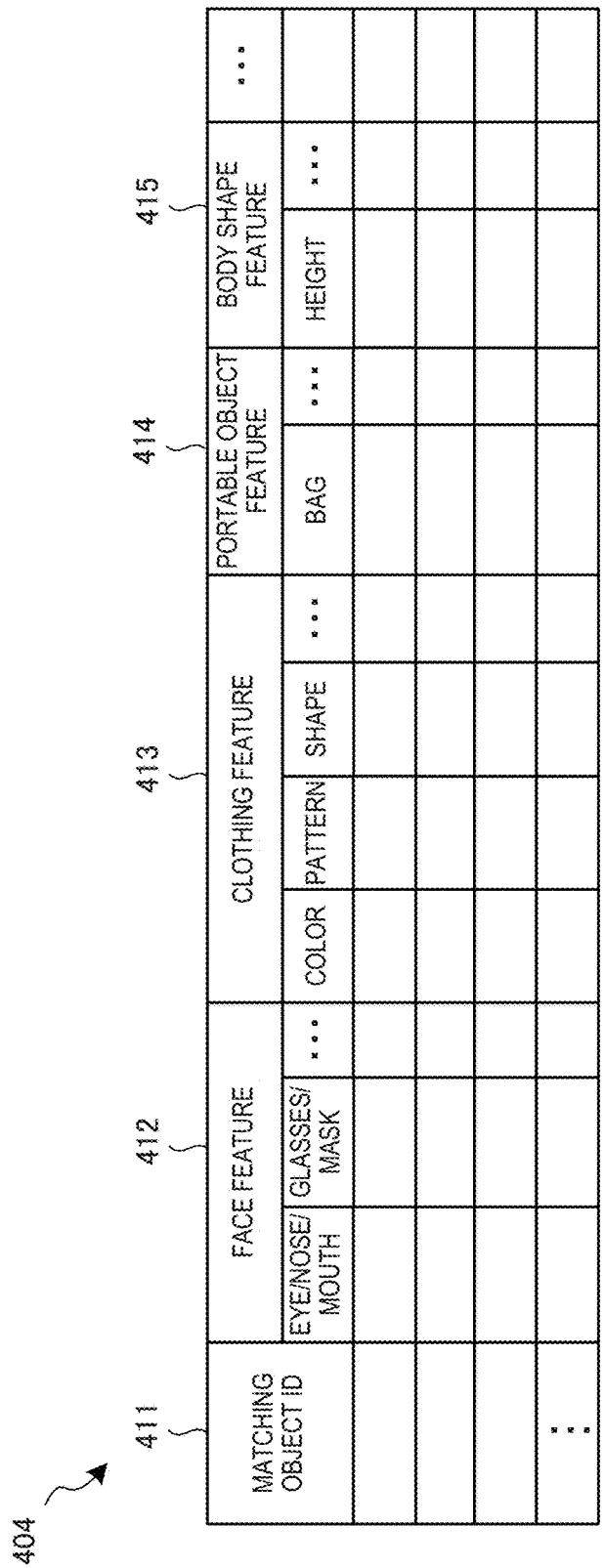
FIG. 4B is a table showing the structure of a person feature DB of the video processing apparatus according to the second embodiment of the present invention.

FIG. 4B is a table showing the structure of the person feature DB 404 of the video processing apparatus 200 according to this embodiment. The person feature DB 404 stores features to be used for various matching operations in a person search. Note that the structure of the person feature DB 404 is not limited to that shown in FIG. 4B. For example, a feature need not be numerical data in a text format, and may be stored as binary data. For example, the feature may be binary data in a feature format standardized by MPEG-7. Furthermore, a face feature need not be extracted for each partial region such as eye/nose/mouth, and may be extracted as the whole face.

The person feature DB 404 stores a feature to be used, in association with a matching object ID to be searched for (in this example, a person ID to be searched for). For example, the person feature DB 404 stores a face feature 412 to be used for face matching, a clothing feature 413 to be used for clothing matching, a portable object feature 414 to be used for portable object matching, a body shape feature 415 to be used for body shape matching, and the like.

(Person Matching Table)

FIG. 4C is a table showing the structure of a person matching table 405a used by the search person matcher 405 according to this embodiment. The person matching table 405a is a table used by the search person matcher 405 to perform a total person search based on various matching results. An example of describing the matching results in a table format is shown for the sake of convenience but the matching results need not always be stored in a table format, and may be stored in an arbitrary format (for example, a structure having variables for storing the values, or the like) which can store the same contents.

The person matching table 405a stores an extracted feature 422 extracted by each of the matchers 401 to 403, each matching result 423, and reliability 424 of the matching result in association with each matching feature ID 421. The person matching table 405a stores a total matching result 425 in consideration of the above items.

(Video Selection Table)

FIG. 4D is a table showing the structure of a video selection table 407a used by the video selector 407 according to this embodiment. The video selection table 407a is a table used by the video selector 407 to select a video including a search person if it is determined based on the total matching result of the search person matcher 405 that the reliability of the search person is higher than a predetermined threshold. An example of describing selection results in a table format is shown for the sake of convenience, but the selection results need not always be stored in the table format, similarly to FIG. 4C.

The video selection table 407a stores a tracked person ID 432 to be searched for, a total matching result 433, and a video selection result 434 in association with a video ID 431. The video selection result 434 stores selection or non-selection but may be accompanied by, for example, reliability so as to be used for subsequent analysis processing. That is, when performing subsequent analysis processing, it may be determined whether to use a video by checking its reliability information.

<<Functional Arrangement of Clothing Matcher>>

Figure 5A:
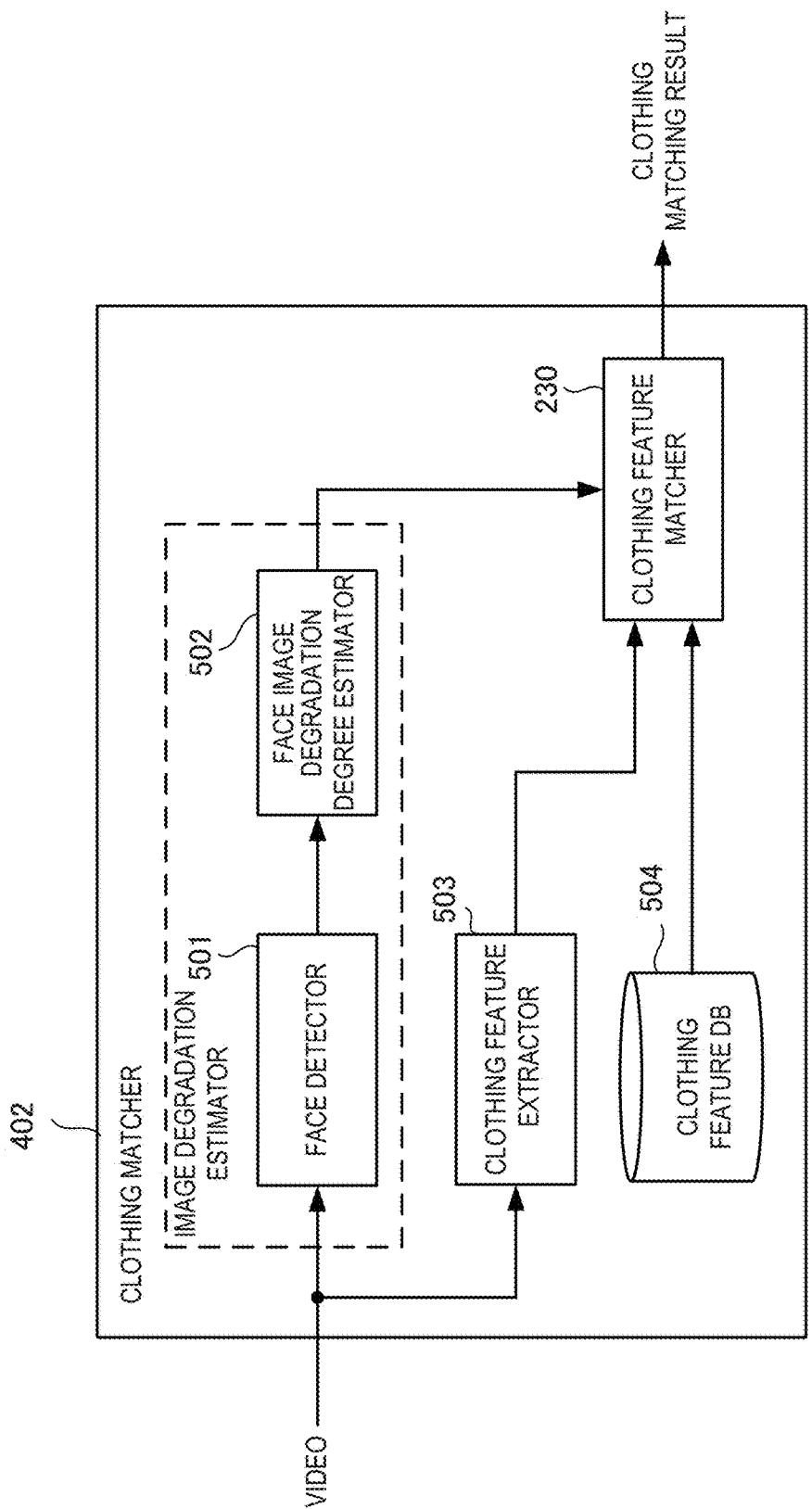
FIG. 5A is a block diagram showing the functional arrangement of a clothing matcher of the video processing apparatus according to the second embodiment of the present invention.

FIG. 5A is a block diagram showing the functional arrangement of the clothing matcher 402 of the video processing apparatus 200 according to this embodiment. This embodiment will mainly describe the clothing matcher 402 but other matchers have the same arrangement. In this embodiment, the pattern of clothes influenced by image degradation in clothing matching will be described in detail. However, features influenced by image degradation in other matchers can be processed in the same manner as that for the pattern of clothes.

The clothing matcher 402 includes a face detector 501, a face image degradation degree estimator 502, a clothing feature extractor 503, a clothing feature DB 504, and the clothing feature matcher 230. The face detector 501 detects the face of a person from a video. The face image degradation degree estimator 502 estimates an image degradation degree from the face image detected by the face detector 501. Note that the face detector 501 and the face image degradation degree estimator 502 form an image degradation estimator according to this embodiment. The clothing feature extractor 503 extracts the feature of the clothes of the person in the video read out from the video storage 406. The clothing feature DB 504 stores a clothing feature for a search to perform matching with the feature extracted by the clothing feature extractor 503. Note that the clothing feature DB 504 may be shared with the person feature DB 404 shown in FIG. 4A, or may store the clothing feature acquired from the person feature DB 404. The clothing feature matcher 230 performs matching between the feature extracted by the clothing feature extractor 503 and that stored in the clothing feature DB 504. If the features match, a clothing matching result is output to the search person matcher 405.

(Clothing Feature DB)

FIG. 5B is a view showing the structure of the clothing feature DB 504 of the clothing matcher 402 according to this embodiment. The clothing feature DB 504 acquires a clothing feature for clothing matching for a person search from the person feature DB 404, and stores it. Note that the structure of the clothing feature DB 504 is not limited to that shown in FIG. 5B. For example, the clothing feature DB 504 may store binary feature data such as an HSV histogram or representative color feature for the color, or an edge histogram or Gabor wavelet feature for the pattern.

The clothing feature DB 504 includes a feature table 510 for identifying the clothes of a search person, and an image degradation table 520 for storing the influence of image degradation on a matching result. Note that in this embodiment, the image degradation table 520 is stored in the clothing feature DB 504, and used by the clothing feature matcher 230 to control matching. However, the image degradation table 520 may be stored in the clothing feature matcher 230 or the face image degradation degree estimator 502.

The feature table 510 stores a color feature 512 to be used for clothing matching, a pattern feature 513, and a shape feature 514 in association with a search clothing ID 511 for identifying the clothes of a search person. On the other hand, the image degradation table 520 stores determination reliability 523 in association with an intended feature 521 of clothing matching. Furthermore, the feature table 510 may store a reliability reduction factor 522 and a weight 524 used at the time of matching. The reliability reduction factor stores an estimation result when a factor of reducing the reliability can be estimated. For example, when a factor is estimated to be a shake, information indicating it is described. Note that if the feature is largely influenced by image degradation and is not used for a person search, zero is stored in the weight 524 used at the time of matching, and the feature is not used for a person search. In the image degradation table 520, the reliabilities are determined for details of an intended feature. However, the intended feature need not be divided into details, and reliability may be calculated for each intended feature such as a color, pattern, or shape.

(Face Detector)

FIG. 6 is a block diagram showing the functional arrangement of the face detector 501 of the clothing matcher 402 according to this embodiment. The face detector 501 detects a face from a video obtained from the video storage 406.

The face detector 501 includes a face image feature point extractor 601, a face detection DB 602, and a face image extractor 603. The face image feature point extractor 601 extracts the feature points of the contour of the face, the color of the face, and parts (eyebrows, eyes, a nose, a mouth, and the like) of the face, and performs matching between the extracted feature points and feature points stored in the face detection DB 602, thereby determining a region as a face region. The face detection DB 602 stores feature points indicating a face image. The face image extractor 603 extracts, as a face image, an image of the region which has been determined as a face region by the face image feature point extractor 601. Note that the above-described face detection method is merely an example, and other face detection methods may be used. For example, an image may be directly input to a neural network which has learned the features of a face image, and it may be determined whether the input image indicates a face, without detecting individual feature points.

Note that the face detection DB 602 may store the contours or edges of various characteristic face images, for example, the contours or edges of face images of a Japanese, foreigner, male, female, adult, and child. The detected face image may be any face image existing in the video. If a plurality of face images are detected, the face detector 501 may select a face image of a predetermined size (corresponding to a distance from the camera) or a face image of a person which has been set as a search person candidate by another matching operation. Alternatively, the plurality of face images may be output to the face image degradation degree estimator 502, and the face image degradation degree estimator 502 may calculate the average degradation degree of the plurality of face images, and select a face image appropriate for estimation of a degradation degree.

(Face Image Degradation Degree Estimator)

Figure 7A:
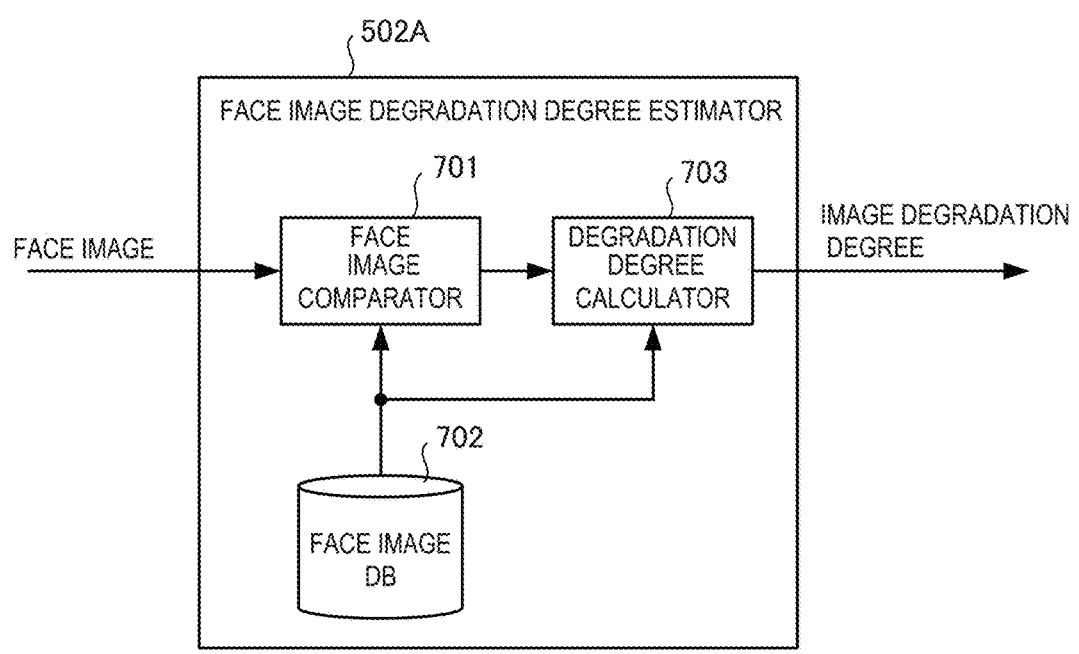
FIG. 7A is a block diagram showing the functional arrangement of the first example of a face image degradation degree estimator of the clothing matcher according to the second embodiment of the present invention.

FIG. 7A is a block diagram showing the functional arrangement of a face image degradation degree estimator 502A, as the first example, of the clothing matcher 402 according to this embodiment. The face image degradation degree estimator 502A estimates an image degradation degree from the face image detected by the face detector 501.

The face image degradation degree estimator 502A includes a face image comparator 701, a face image DB 702, and a degradation degree calculator 703. The face image comparator 701 compares the contour or edge of the face image detected by the face detector 501 with that of a standard face image stored in the face image DB 702, and outputs the difference degree between them, for example, the difference degree in sharpness. The face image DB 702 stores the contour or edge of a standard face image. Note that in fact, since it is desirable to perform comparison with a standard face image in an environment in which each camera captures an image, the contour or edge of a face image captured by each camera may be stored in advance, and a standard face image may be selected using a video ID associated with an image capturing location. A standard face image corresponding to an image capturing location or a feature such as the contour or edge extracted from the face may be selected using a video ID, and downloaded to the face image DB 702. The degradation degree calculator 703 estimates and calculates an image degradation degree based on the difference in sharpness or the like between the standard face image and the face image detected from the video, which has been output from the face image comparator 701.

Figure 7B:
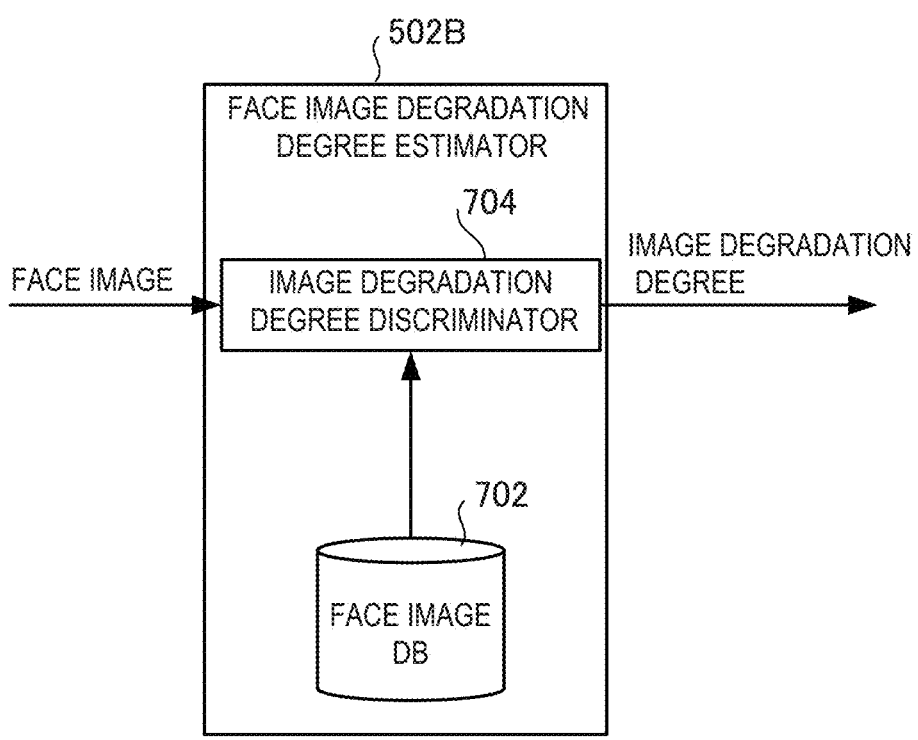
FIG. 7B is a block diagram showing the functional arrangement of the second example of a face image degradation degree estimator of the clothing matcher according to the second embodiment of the present invention.

FIG. 7B is a block diagram showing the functional arrangement of a face image degradation degree estimator 502B, as the second example, of the clothing matcher 402 according to this embodiment. The face image degradation degree estimator 502B also estimates an image degradation degree from the face image detected by the face detector 501.

The face image degradation degree estimator 502B includes the face image DB 702 and an image degradation degree discriminator 704. The image degradation degree discriminator 704 determines a face image degradation degree using a discriminator which has learned for each degree of degradation of the face image. For example, a face image may be input to a neural network which has learned for each degree of blur, thereby determining the degree of blur. The discriminator used is not limited to the neural network. For example, an SVM (Support Vector Machine) discriminator or GLVQ (Generalized Learning Vector Quantization) discriminator may be used. In this case, a feature such as the contour or edge of the face image is extracted and input to the discriminator. Consequently, a learning image is prepared for each degree of blur, and the discriminator is trained using the features of these images, thereby determining an image degradation degree.

FIG. 7C is a table showing the structure of a face image degradation degree estimation table 502a used by the face image degradation degree estimator 502A according to this embodiment. The table is used when an image degradation degree is determined for each image degradation factor in association with a parameter representing the degree of image degradation. The face image degradation degree estimation table 502a is a table used by the face image degradation degree estimator 502A to estimate an image degradation degree in association with the degradation factor based on the difference between the standard face image and the face image detected from the video, which has been output from the face image comparator 701.

The face image degradation degree estimation table 502a stores an image degradation degree 712 in association with an image degradation index 711. Note that in FIG. 7C, an image degradation degree is estimated in association with a degradation factor. However, the degree of difference between the standard face image and the face image detected from the video, which has been output from the face image comparator 701, may be converted into a numerical value without the association. If an image degradation factor is associated with its parameter, and defined as an image degradation degree, a combination of the estimated image degradation factor and the parameter is set as an image degradation degree without using the table.

(Clothing Feature Matcher)

Figure 8A:
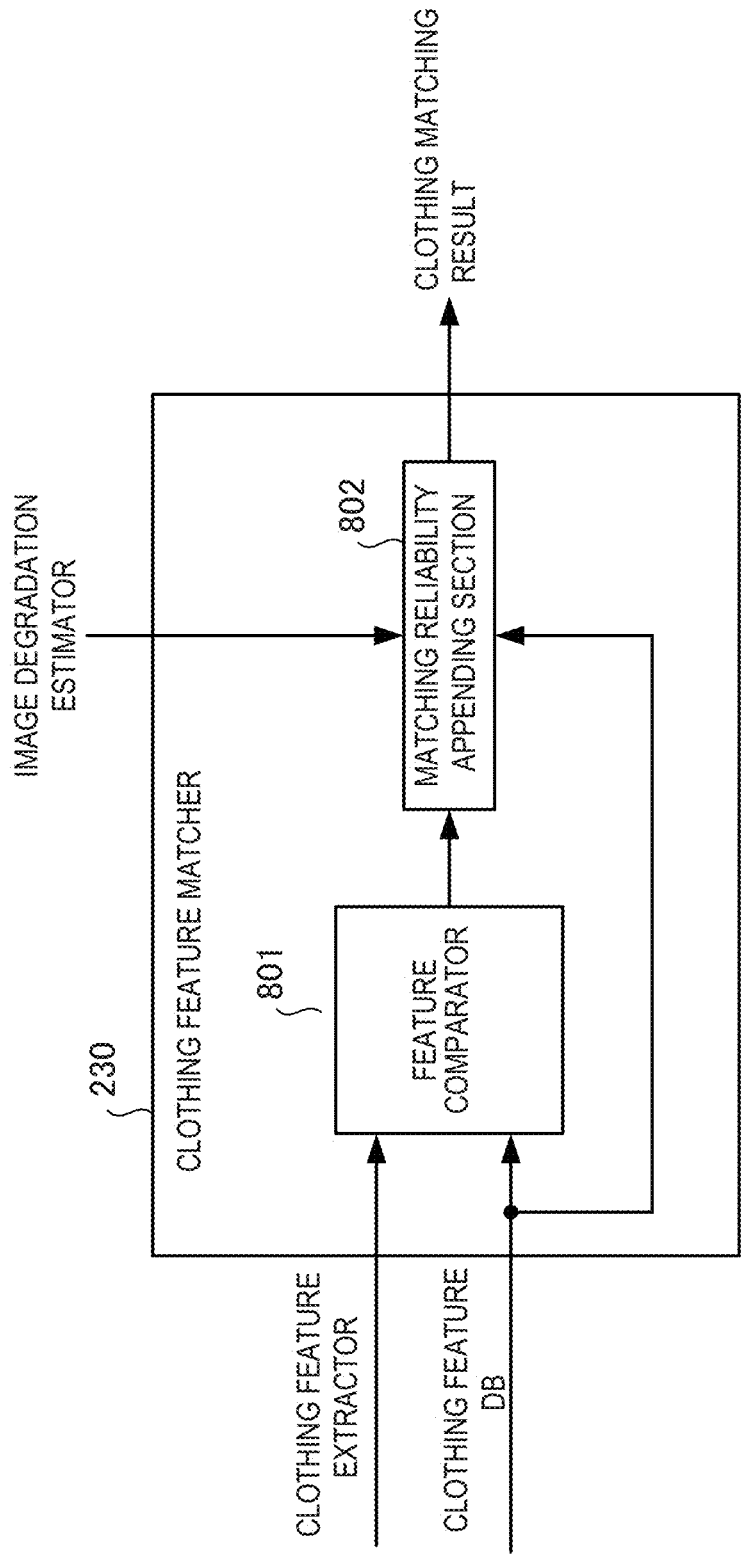
FIG. 8A is a block diagram showing the functional arrangement of a clothing feature matcher of the clothing matcher according to the second embodiment of the present invention.

FIG. 8A is a block diagram showing the functional arrangement of the clothing feature matcher 230 of the clothing matcher 402 according to this embodiment. The clothing feature matcher 230 performs matching between the feature extracted from the video and the stored feature, and determines whether clothes having the similar feature are included in the video.

The clothing feature matcher 230 includes a feature comparator 801 and a matching reliability appending section 802. The feature comparator 801 compares the feature extracted from the video by the clothing feature extractor 503 with the feature stored in the clothing feature DB 504. The matching reliability appending section 802 appends the image degradation degree from the image degradation estimator to the comparison result of the feature comparator 801, and outputs resultant data as a clothing matching result. Alternatively, the matching reliability appending section 802 may convert the image degradation degree into reliability representing the reliability of the feature corresponding to the degree of image degradation, and append it. As for the value of the reliability, for example, the accuracy of a matching result based on a clothing feature is calculated in advance for each image degradation degree, and the accuracy rate is calculated as reliability.

Note that in FIG. 8A, the image degradation degree is appended to the comparison result of the feature comparator 801. However, based on the image degradation degree, comparison of the feature comparator 801 may be changed or the comparison result of the feature comparator 801 may be weighted. When the comparison result is weighted, for example, if a color matching result is used without using the matching result of the pattern of clothes because of image degradation, the weight of the pattern comparison result is set to zero.

FIG. 8B is a table showing the structure of a clothing feature matching table 230a used by the clothing feature matcher 230 according to this embodiment. The clothing feature matching table 230a is a table used by the clothing feature matcher 230 to perform clothing feature matching. In this example, an example of describing matching results in a table format is shown for the sake of convenience but the matching results need not always be stored in the table format, similarly to FIG. 4C.

The clothing feature matching table 230a stores an estimated image degradation degree 813 from the image degradation estimator in association with an identification target ID 811 and an intended feature 812. The clothing feature matching table 230a may also store a reliability determination result 814 based on the estimated image degradation degree 813, and a weight 815 used at the time of matching. The clothing feature matching table 230a stores a matching result 816 in association with one clothing ID by combining the matching results of the intended features.

<<Hardware Arrangement of Video Processing Apparatus>>

Figure 9:
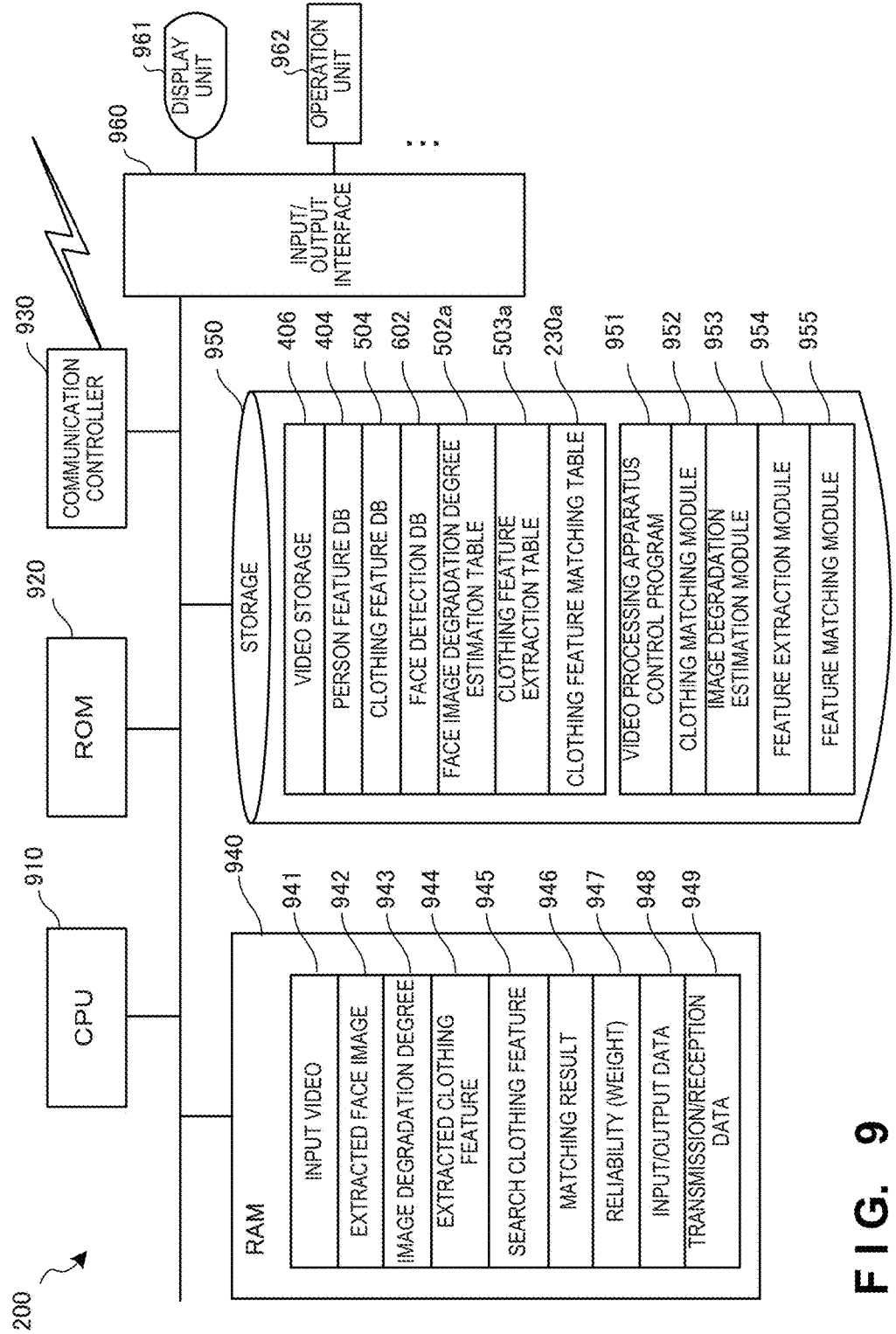
FIG. 9 is a block diagram showing the hardware arrangement of the video processing apparatus according to the second embodiment of the present invention.

FIG. 9 is a block diagram showing the hardware arrangement of the video processing apparatus 200 according to this embodiment. Note that FIG. 9 shows an arrangement associated with a clothing feature as one feature used in a person search in a video but does not show an arrangement associated with another feature or an arrangement for total matching using a plurality of features. However, those arrangements can be implemented by the similar arrangement as that shown in FIG. 9.

Referring to FIG. 9, a CPU 910 is an arithmetic control processor, and implements the functions of the functional components of the video processing apparatus 200 shown in FIG. 4A by executing programs and modules stored in a storage 950 using a RAM 940. A ROM 920 stores programs and permanent data such as initial data and programs. A communication controller 930 communicates with an external apparatus via a network. Note that the number of CPUs 910 is not limited to one, and a plurality of CPUs or a GPU for image processing may be included.

The RAM 940 is a random access memory used by the CPU 910 as a work area for temporary storage. An area to store data necessary for implementation of the embodiment is allocated to the RAM 940. An input video 941 is a video stored in the video storage 406 or a video read out from the video storage 406 to search for an object (in this example, a person). An extracted face image 942 is a face image extracted to estimate image degradation of the video. An image degradation degree 943 is an image degradation degree estimated from the extracted face image 942. An extracted clothing feature 944 is a feature extracted from the clothes of the person in the video. Note that a clothing region can be extracted by, for example, a known method of estimating a body portion based on extraction of a head or face region. A search clothing feature 945 is the feature of search clothes of a search target person stored in the clothing feature DB 504. A matching result 946 is result information indicating whether clothes are target clothes, which has been obtained by comparison between the extracted clothing feature 944 and the search clothing feature 945 in consideration of the image degradation degree 943. Reliability (weight) 947 is the degree of reliability of the matching result 946 corresponding to the image degradation degree 943. Note that the reliability (weight) 947 may be appended to the matching result 946 or integrated in the matching result 946. Input/output data 948 indicates input/output data input/output via an input/output interface 960. Transmission/reception data 949 indicates transmission reception data transmitted/received via the communication controller 930.

The storage 950 stores a database, various parameters, or the following data or programs necessary for implementation of the embodiment. The video storage 406 stores videos collected from the respective cameras 310. The person feature DB 404 is a database for storing the feature of a person to be searched for, in association with a person ID. The clothing feature DB 504 is a database for storing the feature of the clothes of a person to be searched for, in association with a clothing ID. Note that the clothing feature DB 504 may be included in the person feature DB 404. The face detection DB 602 is a database for storing the features (contour, color, and parts) of a face for detecting a face image from a video. The face image degradation degree estimation table 502*a* is a table used by the face image degradation degree estimator 502 to estimate an image degradation degree. A clothing feature extraction table 503*a* is a table used by the clothing feature extractor 503 to extract a clothing feature from a video. The clothing feature matching table 230*a* is a table used by the clothing feature matcher 230 to perform clothing feature matching. Note that each table may be saved in the RAM 940.

The storage 950 stores the following programs. A video processing apparatus control program 951 is a control program for controlling the overall video processing apparatus 200. A clothing matching module 952 is a module for performing matching between a clothing feature in a video and that stored in the clothing feature DB 504 for a person search in the video processing apparatus control program 951. An image degradation estimation module 953 is a module for extracting an image of a predetermined region from a video, and estimating image degradation in the video based on the extracted image. A feature extraction module 954 is a module for extracting, from a video, the feature of a person for a person search. A feature matching module 955 is a module for performing matching between the feature extracted by the feature extraction module 954 and that of a person to be searched for in order to find the person of a search target. Note that in this embodiment, the image degradation estimation module 953 estimates image degradation from a face image, and the feature extraction module 954 perform extraction and matching of a clothing feature, especially the feature of the pattern of clothes.

The input/output interface 960 interfaces input/output data with an input/output device. The input/output interface 960 is connected to a display unit 961 and an operation unit 962 such as a keyboard, touch panel, and pointing device.

Note that programs and data which are associated with the general-purpose functions of the video processing apparatus 200 and other feasible functions are not shown in the RAM 940 or the storage 950 of FIG. 9.

<<Processing Procedure of Video Processing Apparatus>>

FIG. 10 is a flowchart illustrating the processing procedure of the video processing apparatus 200 according to this embodiment. This flowchart is executed by the CPU 910 of FIG. 9 using the RAM 940 and the storage 950, thereby implementing the functional components of FIG. 4A or 5A.

In step S1001, the video processing apparatus 200 acquires, from the video storage 406, a video to search for a target person. In step S1003, the video processing apparatus 200 detects a person image from the acquired video. In step S1005, the video processing apparatus 200 determines whether to execute clothing matching of specific clothes for the detected person.

Figure 11A:
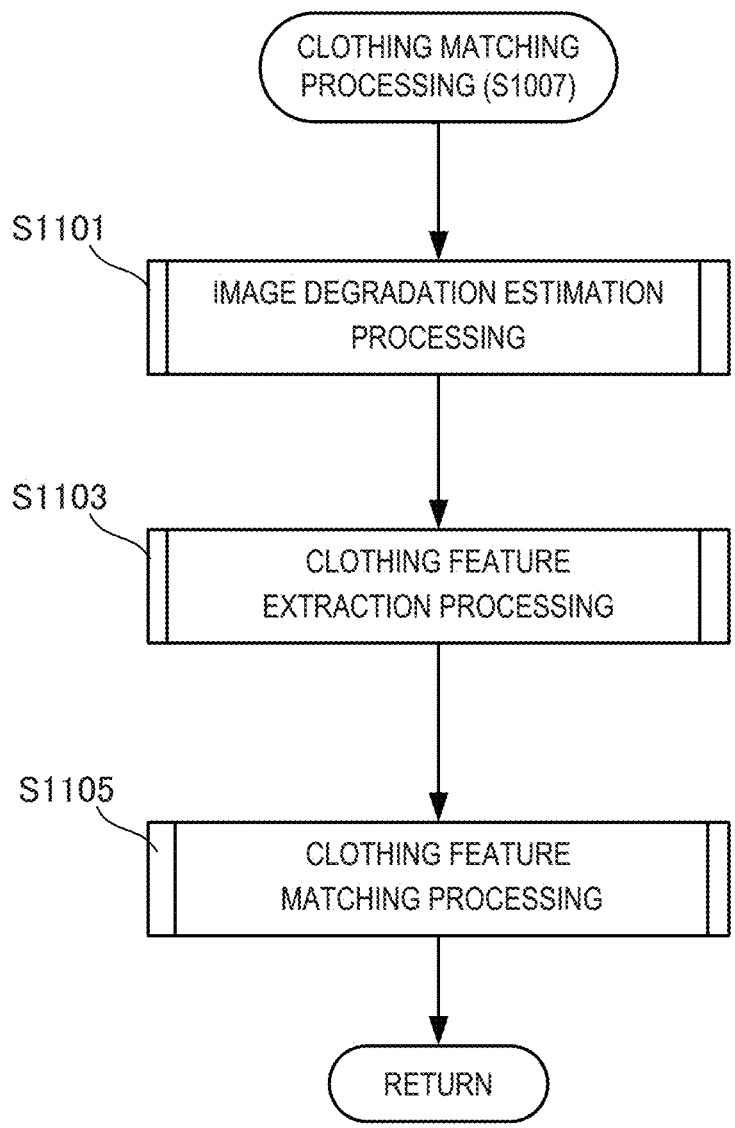
FIG. 11A is a flowchart illustrating the procedure of clothing matching processing according to the second embodiment of the present invention.

If it is determined to execute clothing matching, the video processing apparatus 200 executes clothing matching processing in step S1007 (see FIG. 11A). Upon completion of the clothing matching processing, the video processing apparatus 200 determines in step S1009 whether to execute another matching (face, portable object, or the like). When searching for specific clothes as an object in matching, the video processing apparatus 200 selects, in step S1011, a video including the search target object from a clothing matching result. On the other hand, when searching for an object including another matching, the video processing apparatus 200 executes another matching processing in step S1013, and selects a video including the search target object by combining a plurality of matching results in step S1011.

(Clothing Matching Processing)

FIG. 11A is a flowchart illustrating the procedure of the clothing matching processing (S1007) according to the embodiment.

In step S1101, the video processing apparatus 200 executes image degradation estimation processing of detecting a face image from the video, and estimating image degradation. In step S1103, the video processing apparatus 200 executes clothing feature extraction processing of extracting the feature of clothes detected from the video. In step S1105, the video processing apparatus 200 executes clothing feature matching processing of performing matching between the extracted clothing feature and the clothing feature of the search person prepared in advance.

(Image Degradation Estimation Processing)

Figure 11B:
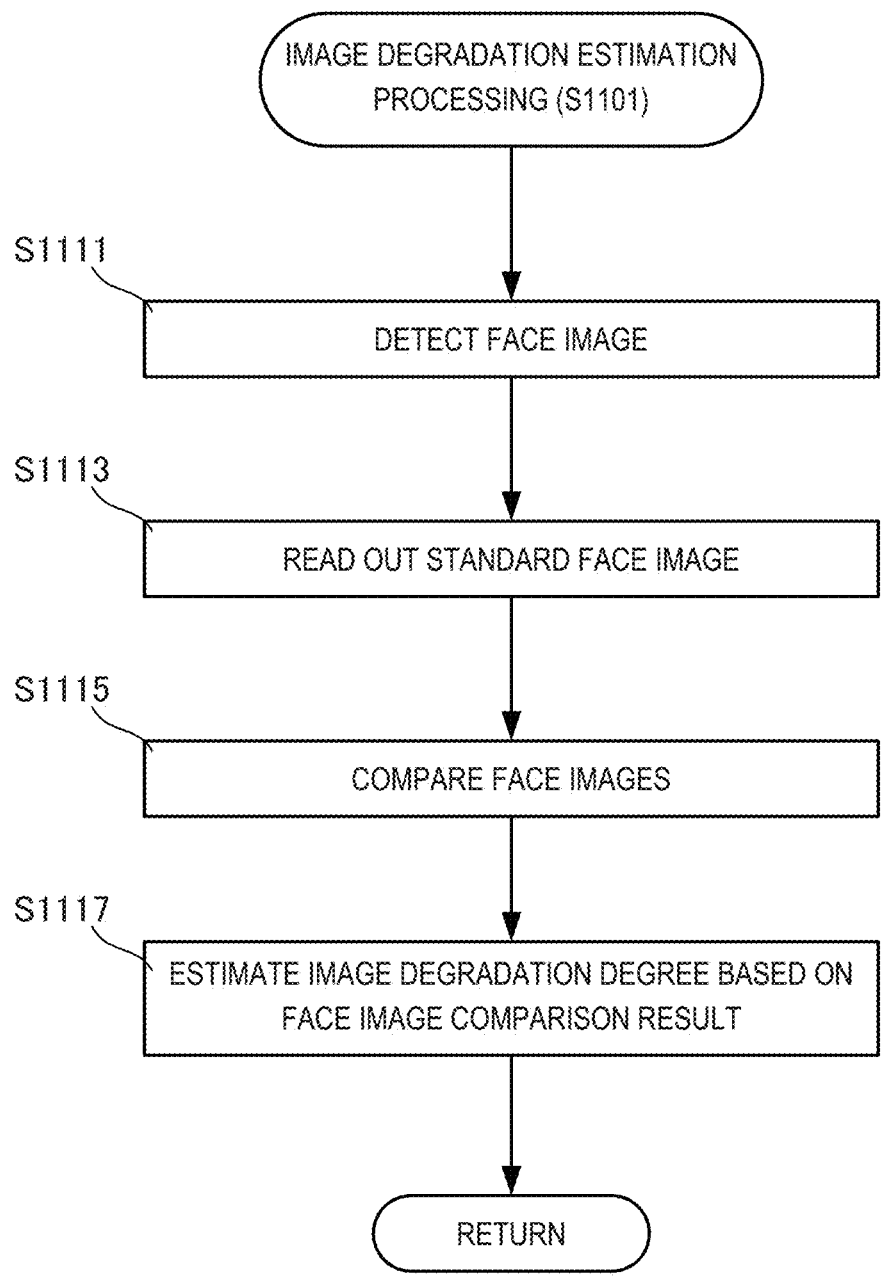
FIG. 11B is a flowchart illustrating the procedure of image degradation estimation processing according to the second embodiment of the present invention.

FIG. 11B is a flowchart illustrating the procedure of the image degradation estimation processing (S1101) according to the embodiment.

In step S1111, the video processing apparatus 200 detects a face image from the video. In step S1113, the video processing apparatus 200 reads out a standard face image. In step S1115, the video processing apparatus 200 compares the sharpness or the like of the face image extracted from the video with that of the standard face image. In step S1117, the video processing apparatus 200 estimates an image degradation degree based on a face image comparison result obtained in step S1115. Note that as for the image degradation degree, an image degradation degree corresponding to the numerical value of the sharpness of the contour or partial edge of the detected face image may be generated without performing comparison with the standard face image. Note that the above-described image degradation degree estimation processing is merely an example, and another method without using the standard image, which has been described above, may be used.

(Clothing Feature Extraction Processing)

Figure 11C:
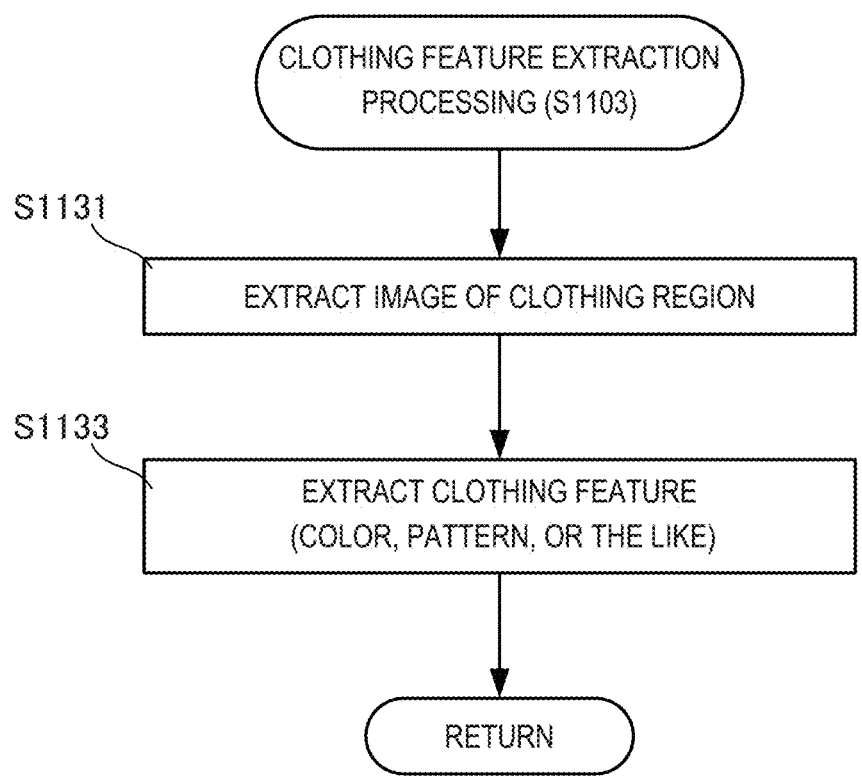
FIG. 11C is a flowchart illustrating the procedure of feature extraction processing according to the second embodiment of the present invention.

FIG. 11C is a flowchart illustrating the procedure of the feature extraction processing (S1103) according to the embodiment.

In step S1131, the video processing apparatus 200 extracts an image of a clothing region from the video. Note that the clothing region can be extracted by, for example, a known method of estimating a body portion based on extraction of a head or face region. In step S1133, the video processing apparatus 200 extracts a feature from a clothing image in the clothing region. The feature is, for example, a color feature, a pattern feature, or a combination thereof.

(Clothing Feature Matching Processing)

Figure 11D:
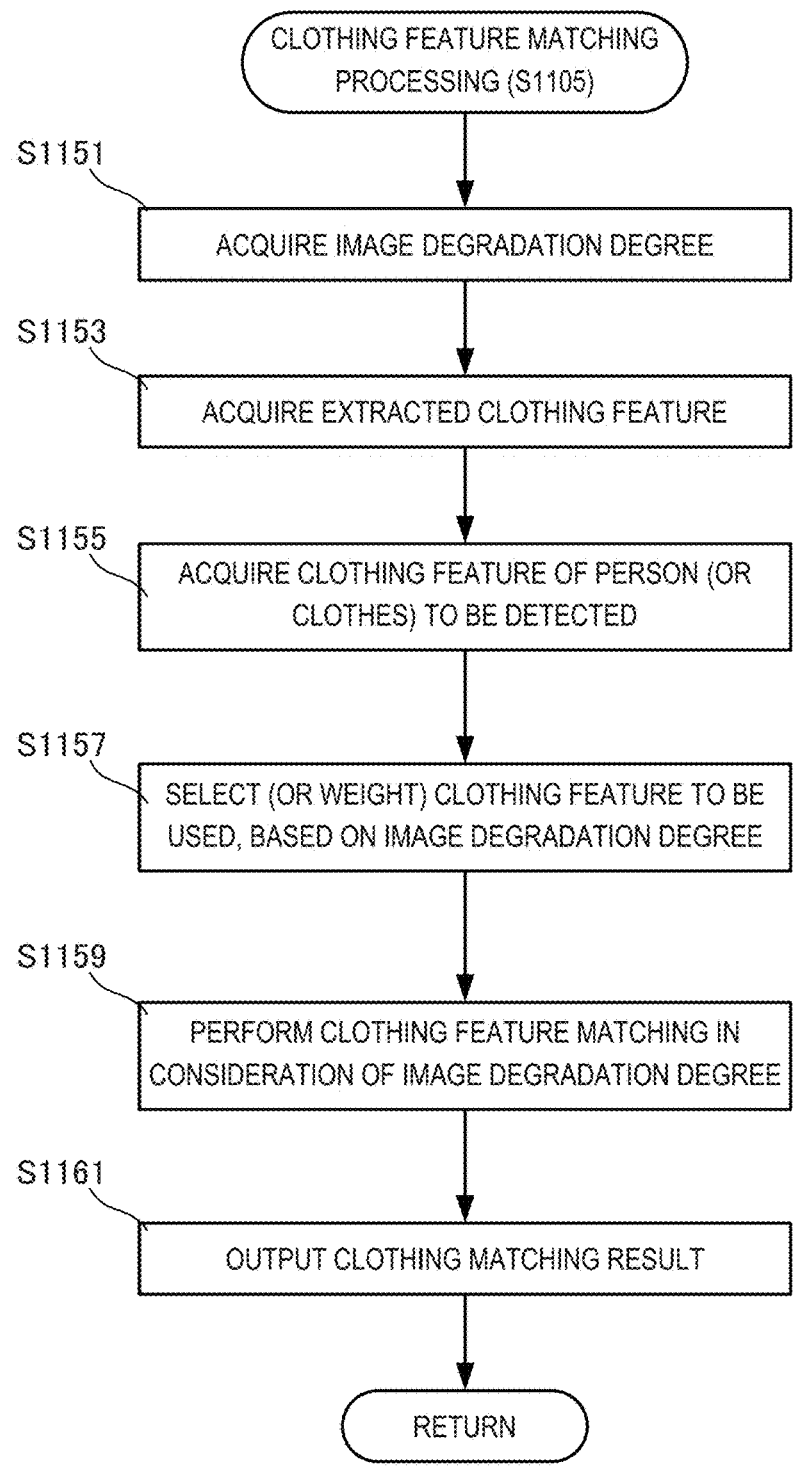
FIG. 11D is a flowchart illustrating the procedure of feature matching processing according to the second embodiment of the present invention.

FIG. 11D is a flowchart illustrating the procedure of the feature matching processing (S1105) according to the embodiment.

In step S1151, the video processing apparatus 200 acquires the image degradation degree estimated by the image degradation degree estimation processing. In step S1153, the video processing apparatus 200 acquires the feature extracted by the clothing feature extraction processing. In step S1155, the video processing apparatus 200 acquires, from the clothing feature DB 504, the clothing feature of a person to be searched for (or clothes to be searched for). In step S1157, based on the image degradation degree acquired in step S1151, the video processing apparatus 200 selects a feature to be used for clothing matching. Alternatively, the video processing apparatus 200 respectively assigns, to a plurality of features, weights each indicating a contribution rate to clothing matching. In step S1159, the video processing apparatus 200 executes clothing feature matching in consideration of the image degradation degree. In step S1161, the video processing apparatus 200 outputs the result of clothing matching.

According to this embodiment, it is possible to suppress a decrease in search accuracy of a person based on a feature extracted from a degraded image in a video by estimating image degradation based on a face image of a person in the video, and especially controlling matching of the feature of the pattern of clothes readily influenced by image degradation.

Third Embodiment

A video processing apparatus according to the third embodiment of the present invention will be described. The video processing apparatus according to this embodiment is different from that in the second embodiment in that an object of a search target is a vehicle. Especially in this embodiment, the feature of the color or pattern of the vehicle body of a vehicle, the feature of the color or pattern of a loaded object, or the like is used as one feature for searching for the vehicle. In this embodiment, the degree of image degradation is estimated from the contour or edge of a license plate image that is a part of a vehicle image. The vehicle is searched for by controlling matching of the feature of the color or pattern of the vehicle body, attachment, or loaded object based on the degree of image degradation. Since other components and operations are the same as in the second embodiment, the same reference numerals and symbols denote the same components and operations and a detailed description thereof will be omitted.

<<Outline of Processing by Video Processing Apparatus>>

Figure 12:
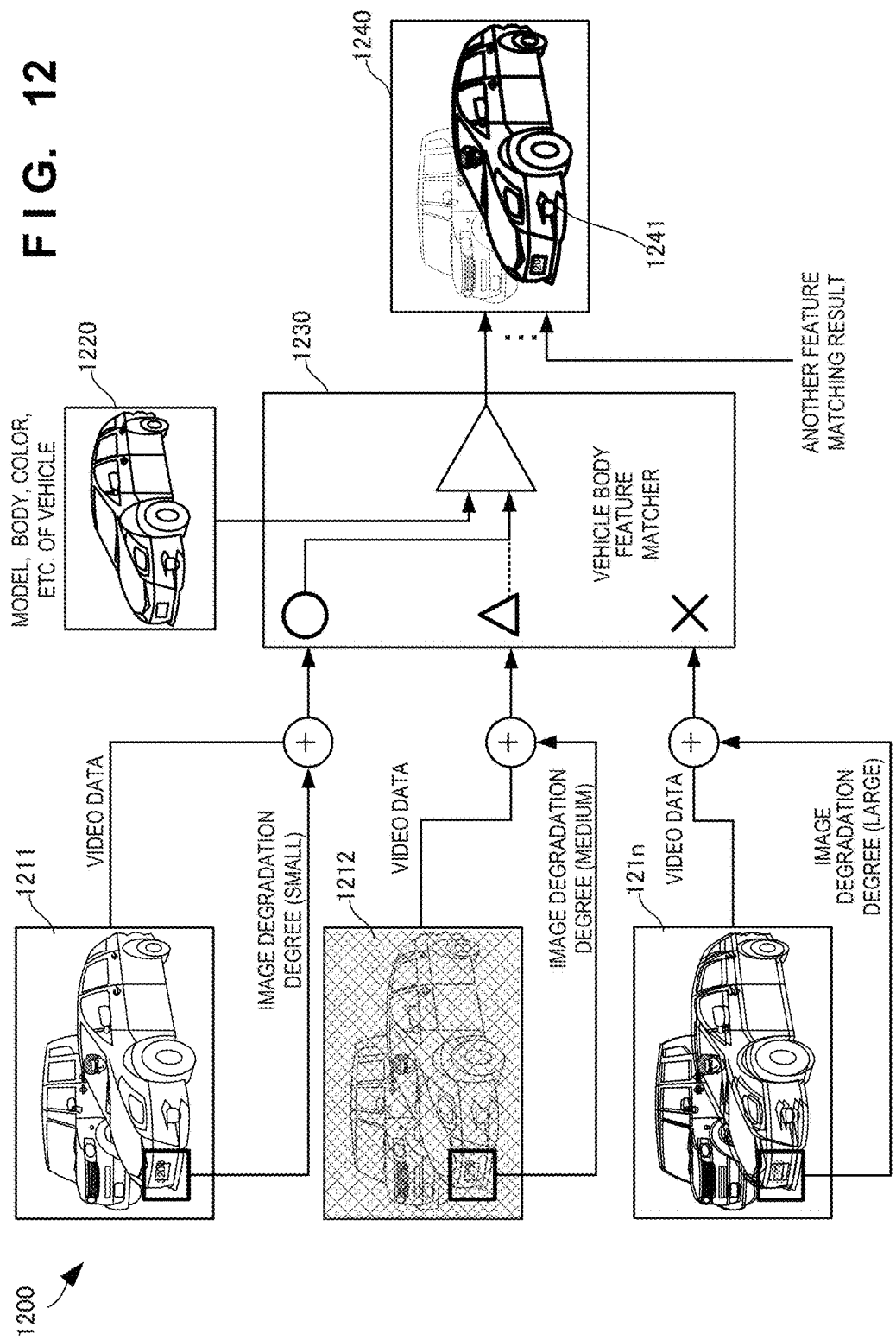
FIG. 12 is a view showing the outline of processing by a video processing apparatus according to the third embodiment of the present invention.

FIG. 12 is a view showing the outline of processing by a video processing apparatus 1200 according to this embodiment. Note that in FIG. 12, a search target is changed from the person of FIG. 2 to a vehicle, and a region in which image degradation is estimated is changed from the face of FIG. 2 to a license plate but the same processing is performed.

The video processing apparatus 1200 searches for a characteristic vehicle from video data of various videos 1211 to 121n. For example, a vehicle 1241 is specified from a video 1240, and a video including the vehicle 1241 is selected. In this vehicle search operation, a property such as the color or pattern (contour line pattern) of a vehicle body is extracted as a feature, and a vehicle body feature matcher 1230 performs matching with a feature 1220 such as the vehicle body color or vehicle body pattern of the search target stored in advance, thereby specifying the vehicle.

At this time, in the videos 1211 to 121n, image degradation occurs due to a camera condition (for example, a shake or defocusing) or an image capturing environment (for example, a fog, raindrops, or backlight) such as weather. Referring to FIG. 12, the video 1211 is a video without image degradation, the video 1212 is a video with image degradation caused by a fog, and the video 121n is a video with image degradation caused by a shake or defocusing. If matching is performed using, as a feature, the vehicle body pattern in the video with image degradation, the reliability of a vehicle search lowers due to a decrease in accuracy of the feature. That is, since the vehicle body pattern is a line pattern, if lines are blurred or defocused due to image degradation, the pattern cannot be recognized clearly.

In this embodiment, when performing feature matching of a vehicle search using the vehicle body pattern as one feature, the degree of image degradation with which the accuracy of feature matching of the vehicle body pattern readily lowers is estimated by comparison between license plate images, thereby generating an estimated degradation degree. In feature matching, the reliability of matching is generated in association with the estimated degradation degree, and sent. Alternatively, if the estimated degradation degree exceeds a predetermined threshold and the reliability significantly lowers, for example, the result of feature matching of the vehicle body color with which the reliability of feature matching does not lower is adopted without performing feature matching of the vehicle body pattern. Note that in an intermediate state, each feature matching operation is weighted to generate a matching result.

With this processing, the accuracy decrease of feature matching due to the occurrence of image degradation is prevented, thereby maintaining the accuracy of a vehicle search even in image degradation.

<<Functional Arrangement of Video Processing Apparatus>>

Figure 13A:
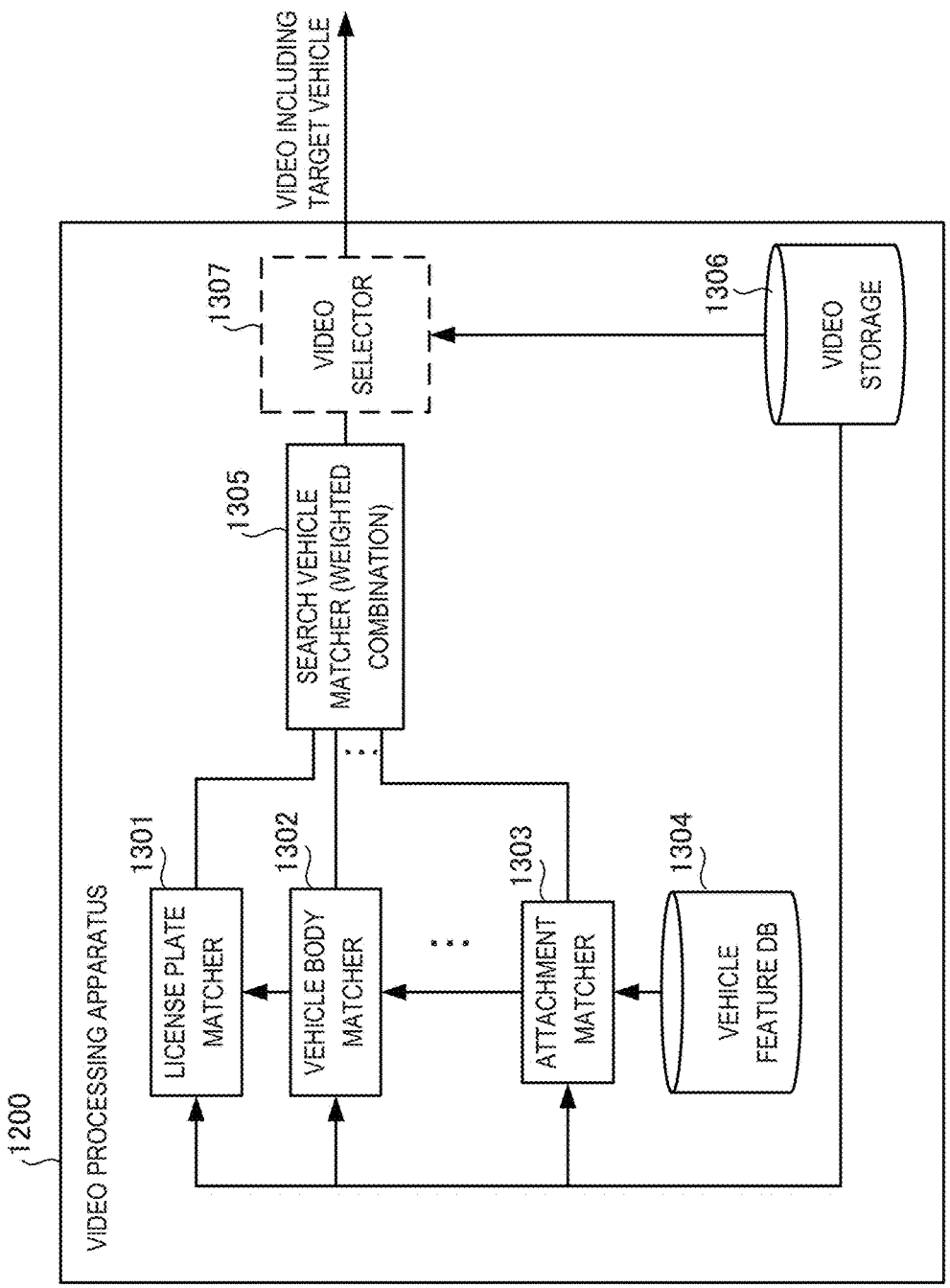
FIG. 13A is a block diagram showing the functional arrangement of the video processing apparatus according to the third embodiment of the present invention.

FIG. 13A is a block diagram showing the functional arrangement of the video processing apparatus 1200 according to this embodiment.

The video processing apparatus 1200 includes a plurality of matchers 1301 to 1303, a vehicle feature DB 1304, a search vehicle matcher 1305, and a video storage 1306. The video processing apparatus 1200 may also include a video selector 1307 indicated by broken lines. The plurality of matchers 1301 to 1303 include, for example, the license plate matcher 1301, the vehicle body matcher 1302, and the attachment matcher 1303. The license plate matcher 1301 performs matching using the license plate of a search vehicle. The vehicle body matcher 1302 performs matching using the search vehicle for a vehicle body including a color and a line pattern. The attachment matcher 1303 performs matching using the attachment of the search vehicle. Note that matching using the color or pattern of the loaded object of the vehicle may be included. The vehicle feature DB 1304 provides, to the plurality of matchers 1301 to 1303, respective features which are stored in advance and used to search for the vehicle for matching. The video storage 1306 stores a video, transmitted from a camera 310, to be searchable. The search vehicle matcher 1305 searches for the vehicle in the video by combining the matching results of the plurality of matchers 1301 to 1303. The video selector 1307 extracts, from the video storage 1306, the video including the vehicle having been determined to be matched by the search vehicle matcher 1305, and sends it to next processing such as analysis. Note that the selected video may be selected as an entire video, as a time-unit video, or as a video including the search vehicle.

(Vehicle Matching Table)

FIG. 13B is a table showing the structure of a vehicle matching table 1305a used by the search vehicle matcher 1305 according to this embodiment. The vehicle matching table 1305a is a table used by the search vehicle matcher 1305 to perform a total vehicle search based on various matching results. An example of describing the matching results in a table format is shown for the sake of convenience but the matching results need not always be stored in the table format, similarly to FIG. 4C.

The vehicle matching table 1305a stores an extracted feature 1322 extracted by each of the matchers 1301 to 1303, each matching result 1323, and reliability 1324 of the matching result in association with each matching feature ID 1321. The vehicle matching table 1305a stores a total matching result 1325 in consideration of the above items.

<<Functional Arrangement of Vehicle Matcher>>

FIG. 14A is a block diagram showing the functional arrangement of the vehicle body matcher 1302 of the video processing apparatus 1200 according to this embodiment. This embodiment will mainly describe the vehicle body matcher 1302 but other matchers have the same arrangement. In this embodiment, the line pattern of the vehicle body influenced by image degradation in vehicle matching will be described in detail. However, features influenced by image degradation in other matchers can be processed in the same manner as that for the line pattern.

The matcher 1302 includes a license plate detector 1401, a plate image degradation degree estimator 1402, a vehicle body feature extractor 1403, a vehicle body feature DB 1404, and the vehicle body feature matcher 1230. The license plate detector 1401 detects a license plate image (to be referred to as a plate image hereinafter) of the vehicle from the video. The plate image degradation degree estimator 1402 estimates an image degradation degree from the plate image detected by the license plate detector 1401. Note that the license plate detector 1401 and the plate image degradation degree estimator 1402 form an image degradation estimator according to this embodiment. The vehicle body feature extractor 1403 extracts the feature (color or contour line pattern) of the vehicle body of the vehicle in the video read out from the video storage 1306. The vehicle body feature DB 1404 stores the vehicle body feature for a search to perform matching with the feature extracted by the vehicle body feature extractor 1403. Note that the vehicle body feature DB 1404 may be shared with the vehicle feature DB 1304 shown in FIG. 13A, or may store a vehicle body feature acquired from the vehicle feature DB 1304. The vehicle body feature matcher 1230 performs matching between the feature extracted by the vehicle body feature extractor 1403 and that stored in the vehicle body feature DB 1404. If the features match, a vehicle body matching result is output to the search vehicle matcher 1305.

(Vehicle Feature DB)

FIG. 14B is a view showing the structure of the vehicle body feature DB 1404 of the vehicle body matcher 1302 according to this embodiment. The vehicle body feature DB 1404 acquires a vehicle body feature for vehicle body matching for a vehicle search from the vehicle feature DB 1304, and stores it. Note that the structure of the vehicle body feature DB 1404 is not limited to that shown in FIG. 14B. For example, the vehicle body feature DB 1404 may store binary feature data such as an HSV histogram or representative color feature for the color, or an edge histogram or Gabor wavelet feature for the pattern.

The vehicle body feature DB 1404 includes a feature table 1410 for identifying the vehicle body of a search vehicle, and an image degradation table 1420 for storing the influence of image degradation on a matching result. Note that in this embodiment, the image degradation table 1420 is stored in the vehicle body feature DB 1404, and used by the vehicle body feature matcher 1230 to control matching. However, the image degradation table 1420 may be stored in the vehicle body feature matcher 1230 or the plate image degradation degree estimator 1402.

The feature table 1410 stores a color feature 1412 to be used for vehicle body matching, a pattern feature 1413, and a shape feature 1414 in association with a search vehicle body ID 1411 for identifying the vehicle body of a search vehicle. On the other hand, the image degradation table 1420 stores determination reliability 1423 in association with an intended feature 1421 of vehicle body matching. Furthermore, the feature table 1410 may store a reliability reduction factor 1422 and a weight 1424 used at the time of matching. The reliability reduction factor is the same as that in the image degradation table 520. Note that if the feature is largely influenced by image degradation and is not used for a vehicle search, zero is stored in the weight 1424 used at the time of matching, and the feature is not used for a vehicle search. In the image degradation table 1420, the reliabilities are determined for details of an intended feature. However, the intended feature need not be divided into details, and reliability may be calculated for each intended feature such as a color, pattern, or shape.

(License Plate Detector)

FIG. 14C is a block diagram showing the functional arrangement of the license plate detector 1401 of the vehicle body matcher 1302 according to this embodiment. The license plate detector 1401 detects a license plate from a video obtained from the video storage 1306.

The license plate detector 1401 includes a plate image feature point extractor 1431, a plate detection DB 1432, and a plate image extractor 1433. The plate image feature point extractor 1431 extracts the feature points of the contour of the license plate, the color of the license plate, and a portion of the license plate from the video, and performs matching between the extracted feature points and feature points stored in the plate detection DB 1432, thereby determining a region as a license plate region. The plate detection DB 1432 stores feature points indicating a plate image. The plate image extractor 1433 extracts, as a plate image, an image of the region which has been determined as a license plate region by the plate image feature point extractor 1431. Note that the above-described license plate detection method is merely an example, and other license plate detection methods may be used, similarly to the face detector 501.

Note that the plate detection DB 1432 may store the contours or edges of various characteristic plate images, for example, the contours or edges of plate images of a passenger vehicle, a freight vehicle, a private vehicle, a commercial vehicle, a light vehicle, a two-wheeled vehicle, and the like. The detected plate image may be any plate image existing in the video. If a plurality of plate images are detected, the license plate detector 1401 selects a plate image of a predetermined size (corresponding to a distance from the camera). A plate image of a vehicle set as a search vehicle candidate by another matching operation may be selected. Alternatively, the plurality of plate images may be output to the plate image degradation degree estimator 1402, and the plate image degradation degree estimator 1402 may calculate the average degradation degree of the plurality of plate images, and select a plate image appropriate for estimation of a degradation degree.

According to this embodiment, it is possible to suppress a decrease in search accuracy of a vehicle based on a feature extracted from a degraded image in a video by estimating image degradation based on a plate image of a vehicle in the video, and especially controlling matching of the feature of the vehicle body of the vehicle readily influenced by image degradation.

Fourth Embodiment

A video processing apparatus according to the fourth embodiment of the present invention will be described. The video processing apparatus according to this embodiment is different from that in the second embodiment in that a fixed camera uses a known sign image in a specific region in a video instead of a face image to estimate the degree of video degradation. Since other components and operations are the same as in the second embodiment, the same reference numerals and symbols denote the same components and operations and a detailed description thereof will be omitted. Note that a person search will be exemplified in this embodiment. However, this embodiment is applied to another object search such as a vehicle search to obtain the same effects.

<<Outline of Processing by Video Processing Apparatus>>

Figure 15:
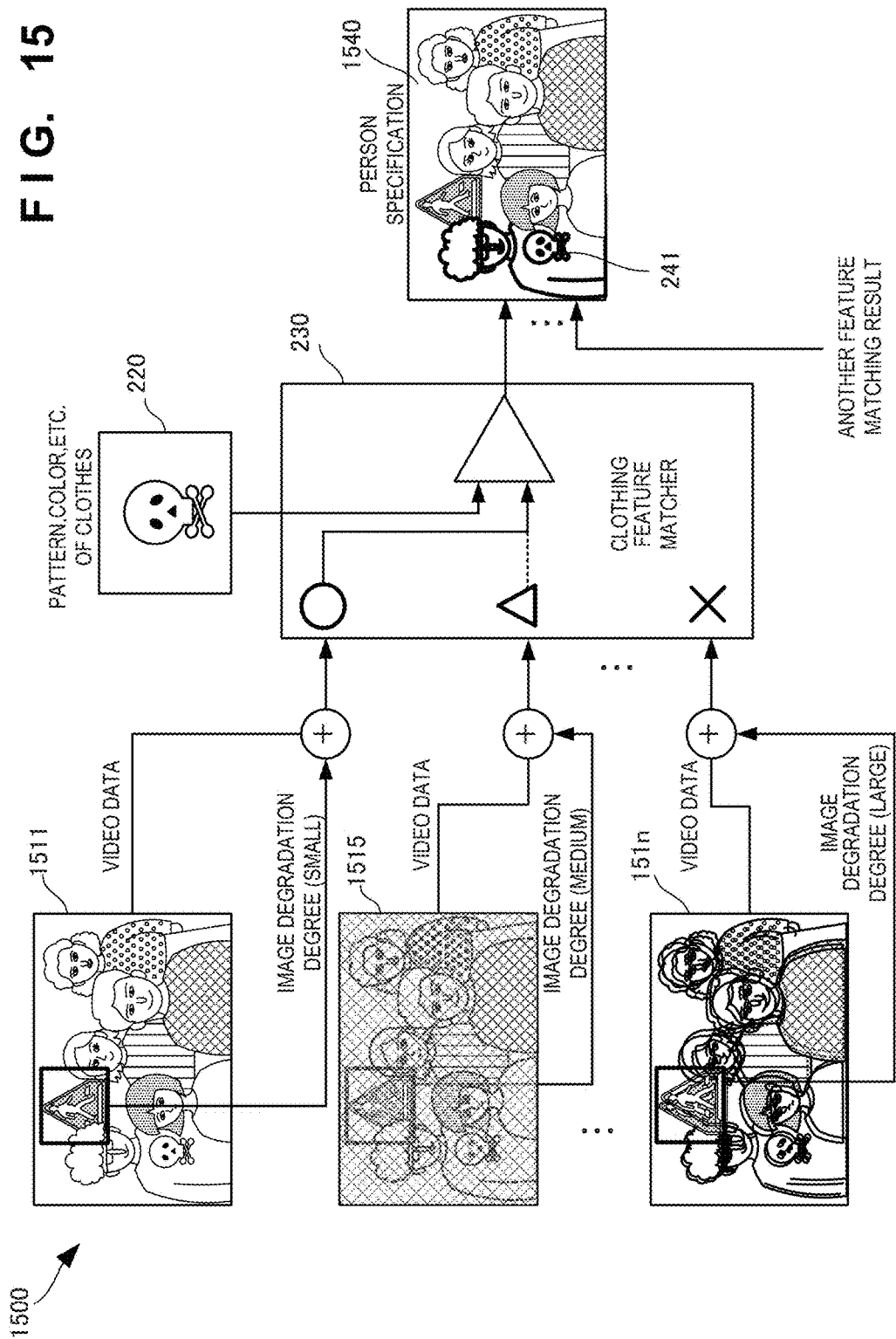
FIG. 15 is a view showing the outline of processing by a video processing apparatus according to the fourth embodiment of the present invention.

FIG. 15 is a view showing the outline of processing by a video processing apparatus 1500 according to this embodiment. Note that in FIG. 15, the same reference numerals as in FIG. 2 denote the same elements and a description thereof will be omitted.

The video processing apparatus 1500 searches for a characteristic person from video data of various videos 1511 to 151n. For example, a person 241 dressed in skull pattern clothes is specified from a video 1540, and a video including the person 241 is selected. In this person search operation, a property such as the color or pattern of the clothes of the person is extracted as a feature, and a clothing feature matcher 230 performs matching with a feature 220 such as the color or pattern of clothes stored in advance, thereby specifying the person.

At this time, in the videos 1511 to 151n, image degradation occurs due to a camera condition (for example, a shake or defocusing) or an image capturing environment (for example, a fog, raindrops, or backlight) such as weather. Referring to FIG. 15, the video 1511 is a video without image degradation, the video 1512 is a video with image degradation caused by a fog, and the video 151n is a video with image degradation caused by a shake or defocusing. If matching is performed using, as a feature, the pattern of the clothes of the person in the video with image degradation, the reliability of a person search lowers due to a decrease in accuracy of the feature. For example, if the clothes have a stripe, dot, or grid pattern, lines or dots cannot be recognized as a clearly separated pattern due to image degradation. On the other hand, a person dressed in blur pattern clothes may be unwantedly recognized as a search target.

In this embodiment, when performing feature matching of a person search using the pattern of clothes as one feature, the degree of image degradation with which the accuracy of feature matching of the pattern of clothes readily lowers is estimated by comparison between sign images captured at a specific position in the video, thereby generating an estimated degradation degree. In feature matching, the reliability of matching is generated in association with the estimated degradation degree, and sent. Alternatively, if the estimated degradation degree exceeds a predetermined threshold and the reliability significantly lowers, for example, the result of feature matching of the color of clothes with which the reliability of feature matching does not lower is adopted without performing feature matching of the pattern of clothes. Note that in an intermediate state, each feature matching operation is weighted to generate a matching result.

With this processing, image degradation is estimated from a sign image captured at a specific position in a video to prevent the accuracy decrease of feature matching due to the occurrence of image degradation, thereby maintaining the accuracy of a person search even in image degradation.

<<Functional Arrangement of Clothing Matcher>>

Figure 16A:
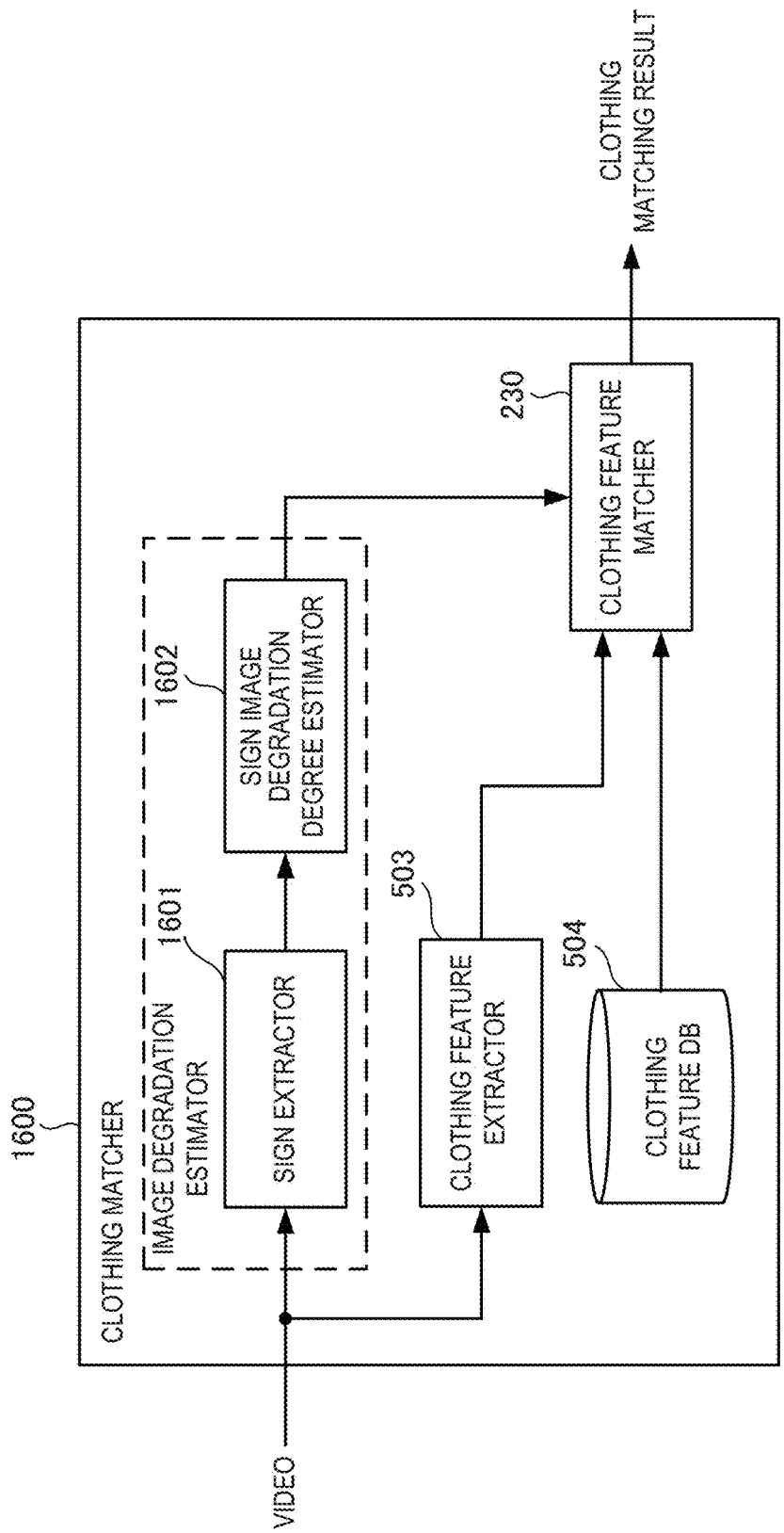
FIG. 16A is a block diagram showing the functional arrangement of a clothing matcher of the video processing apparatus according to the fourth embodiment of the present invention.

FIG. 16A is a block diagram showing the functional arrangement of a clothing matcher 1600 of the video processing apparatus 1500 according to this embodiment. Note that in FIG. 16A, the same reference numerals as in FIG. 5A denote the same functional components and a description thereof will be omitted.

The clothing matcher 1600 includes a sign extractor 1601, a sign image degradation degree estimator 1602, a clothing feature extractor 503, a clothing feature DB 504, and the clothing feature matcher 230. The sign extractor 1601 extracts a sign captured in a specific region from a video. The sign image degradation degree estimator 1602 estimates an image degradation degree from the sign image extracted by the sign extractor 1601. Note that the sign extractor 1601 and the sign image degradation degree estimator 1602 form an image degradation estimator according to this embodiment.

(Sign Extractor)

FIG. 16B is a block diagram showing the functional arrangement of the sign extractor 1601 of the clothing matcher 1600 according to this embodiment.

The sign extractor 1601 includes a sign image extractor 1611 and a video frame/template 1612. The sign image extractor 1611 extracts a sign image from a specific region at a specific position in a video stored in the video frame/template 1612. The video frame/template 1612 stores the specific region at the specific position in the video of the sign. Note that in this embodiment, a camera is fixed, and if a camera position, image capturing direction, or sign position is changed, the video frame/template 1612 is changed to be able to always extract the sign.

(Sign Image Degradation Degree Estimation Table)

Figure 16C:
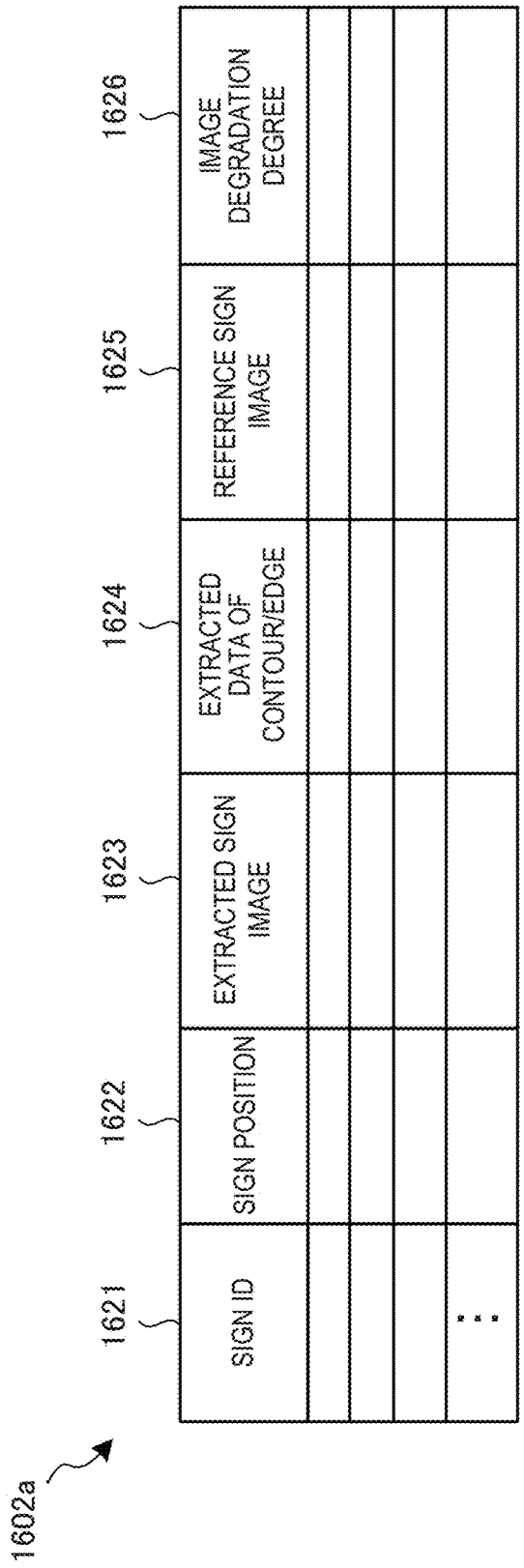
FIG. 16C is a table showing the structure of a sign image degradation degree estimation table used by a sign image degradation degree estimator according to the fourth embodiment of the present invention.

FIG. 16C is a table showing the structure of a sign image degradation degree estimation table 1602a used by the sign image degradation degree estimator 1602 according to this embodiment. The sign image degradation degree estimation table 1602a is a table used by the sign image degradation degree estimator 1602 to estimate an image degradation degree in association with a degradation factor based on the difference between a standard sign image captured in a normal condition and a sign image detected from a video.

The sign image degradation degree estimation table 1602a stores a sign position 1622, an extracted sign image 1623, extracted data 1624 of a contour, an edge, or the like, and a reference standard sign image 1625, in association with a sign ID 1621. The sign image degradation degree estimation table 1602a stores an image degradation degree 1626 generated based on the result of comparison between the extracted sign image 1623 and the reference standard sign image 1625.

According to this embodiment, it is possible to suppress a decrease in search accuracy of an object of a search target based on a feature extracted from a degraded image in a video by estimating image degradation based on a sign image in the video, and especially controlling matching of the feature readily influenced by image degradation.

Fifth Embodiment

A video processing apparatus according to the fifth embodiment of the present invention will be described. The video processing apparatus according to this embodiment is different from that in the fourth embodiment in that an image having a flat surface is extracted as a specific region in a video, and image degradation is estimated based on variation of pixels. Since other components and operations are the same as in the fourth embodiment, the same reference numerals and symbols denote the same components and operations and a detailed description thereof will be omitted. Note that a person search will be exemplified in this embodiment. However, this embodiment is applied to another object search such as a vehicle search to obtain the same effects.

<<Outline of Processing by Video Processing Apparatus>>

Figure 17:
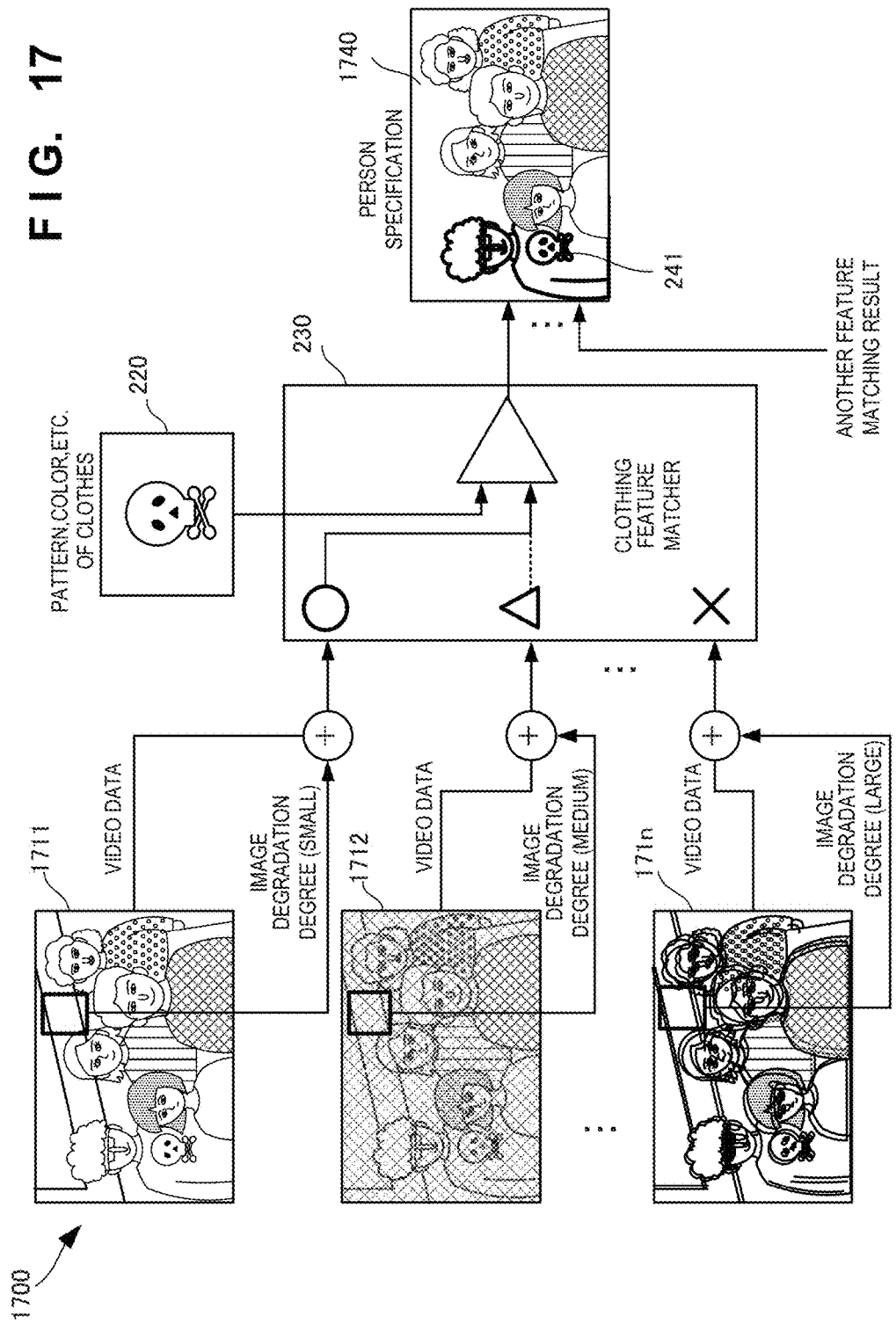
FIG. 17 is a view showing the outline of processing by a video processing apparatus according to the fifth embodiment of the present invention.

FIG. 17 is a view showing the outline of processing by a video processing apparatus 1700 according to this embodiment. Note that in FIG. 17, the same reference numerals as in FIG. 2 denote the same elements and a description thereof will be omitted.

The video processing apparatus 1700 searches for a characteristic person from video data of various videos 1711 to 171n. For example, a person 241 dressed in skull pattern clothes is specified from a video 1740, and a video including the person 241 is selected. In this person search operation, a property such as the color or pattern of the clothes of the person is extracted as a feature, and a clothing feature matcher 230 performs matching with a feature 220 such as the color or pattern of clothes stored in advance, thereby specifying the person.

At this time, in the videos 1711 to 171n, image degradation occurs due to a camera condition (for example, a shake or defocusing) or an image capturing environment (for example, a fog, raindrops, or backlight) such as weather. Referring to FIG. 17, the video 1711 is a video without image degradation, the video 1712 is a video with image degradation caused by a fog, and the video 171n is a video with image degradation caused by a shake or defocusing. If matching is performed using, as a feature, the pattern of the clothes of the person in the video with image degradation, the reliability of a person search lowers due to a decrease in accuracy of the feature. For example, if the clothes have a stripe, dot, or grid pattern, lines or dots cannot be recognized as a clearly separated pattern due to image degradation. On the other hand, a person dressed in blur pattern clothes may be unwantedly recognized as a search target.

In this embodiment, when performing feature matching of a person search, the degree of image degradation with which the accuracy of feature matching of the pattern of clothes readily lowers is estimated based on pixel variations caused by, for example, the image capturing environment of a flat image captured at a specific position in a video. Note that as a flat image, a sign or signboard having a flat surface or an object in a video such as a part of a building, which does not change over time, is selected. In FIG. 17, a flat surface of the perimeter of a large signboard put by a roadside is selected. In feature matching, the reliability of matching is generated in association with an estimated degradation degree, and sent. Alternatively, if the estimated degradation degree exceeds a predetermined threshold and the reliability significantly lowers, for example, the result of feature matching of the color of clothes with which the reliability of feature matching does not lower is adopted without performing feature matching of the pattern of clothes. Note that in an intermediate state, each feature matching operation is weighted to generate a matching result.

With this processing, image degradation is estimated from a sign image captured at a specific position in a video to prevent the accuracy of feature matching from lowering due to the occurrence of image degradation, thereby maintaining the accuracy of a person search even in image degradation.

<<Functional Arrangement of Clothing Matcher>>

FIG. 18A is a block diagram showing the functional arrangement of a clothing matcher 1800 of the video processing apparatus 1700 according to this embodiment. Note that in FIG. 16A, the same reference numerals as in FIG. 5A denote the same functional components and a description thereof will be omitted.

The clothing matcher 1800 includes a flat region extractor 1801, a flat image degradation degree estimator 1802, a clothing feature extractor 503, a clothing feature DB 504, and the clothing feature matcher 230. The flat region extractor 1801 extracts a flat region captured in a specific region from a video. The flat image degradation degree estimator 1802 estimates an image degradation degree based on, for example, pixel variations caused by the image capturing environment of the flat image extracted by the flat region extractor 1801. Note that the flat region extractor 1801 and the flat image degradation degree estimator 1802 form an image degradation estimator according to this embodiment.

(Flat Image Degradation Degree Estimation Table)

FIG. 18B is a table showing the structure of a flat image degradation degree estimation table 1802a used by the flat image degradation degree estimator 1802 according to this embodiment. The flat image degradation degree estimation table 1802a is a table used by the flat image degradation degree estimator 1802 to estimate an image degradation degree in association with a degradation factor based on the difference between a flat image captured in a normal condition and a flat image detected from a video.

The flat image degradation degree estimation table 1802a stores a flat region position 1822, an extracted flat image 1823, extracted data 1824 of pixel variations or the like, and a reference flat image 1825 in association with a flat region ID 1821. The flat image degradation degree estimation table 1802a stores an image degradation degree 1826 generated based on the result of comparison between the extracted flat image 1823 and the reference flat image 1825.

According to this embodiment, image degradation is estimated based on pixel variations of a flat image in a video, and feature matching readily influenced by image degradation is especially controlled. With this control operation, it is possible to suppress a decrease in search accuracy of an object of a search target based on a feature extracted from a degraded image in the video.

Sixth Embodiment

A video processing apparatus according to the sixth embodiment of the present invention will be described. The video processing apparatus according to this embodiment is different from those in the second to fifth embodiments in that one of degrees of estimated image degradation generated based on images of a plurality of regions is selected based on the feature of an object, and used to control feature matching. Since other components and operations are the same as in the second to fifth embodiments, the same reference numerals and symbols denote the same components and operations and a detailed description thereof will be omitted. Note that a person search will be exemplified in this embodiment. However, this embodiment is applied to another object search such as a vehicle search to obtain the same effects.

<<Outline of Processing by Video Processing Apparatus>>

FIG. 19 is a view showing the outline of processing by a video processing apparatus 1900 according to this embodiment. Note that FIG. 19 shows processing up to generation of an image degradation degree. Processing of searching for an object from a video using the image degradation degree is the same as in FIG. 2, and an illustration and description thereof will be omitted.

The video processing apparatus 1900 searches for a characteristic person from video data of various videos 1911 to 191n. At this time, in the videos 1911 to 191n, image degradation occurs due to a camera condition (for example, a shake or defocusing) or an image capturing environment (for example, a fog, raindrops, or backlight) such as weather. Referring to FIG. 19, the video 1911 is a video with image degradation caused by a fog, the video 1912 is a video with image degradation caused by raindrops, the video 1913 is a video with image degradation caused by backlight, the video 1914 is a video with image degradation caused by a night streetlight, and the video 21n is a video with image degradation caused by a shake or defocusing. Note that an image degradation factor is not limited to the above examples. For example, reflection such as morning sunlight, smog, and the like are included. If matching is performed using, as a feature, the pattern of the clothes of a person in the video with image degradation, the reliability of a person search lowers due to a decrease in accuracy of the feature. For example, if the clothes have a stripe, dot, or grid pattern, lines or dots cannot be recognized as a clearly separated pattern due to image degradation. On the other hand, a person dressed in blur pattern clothes may be unwantedly recognized as a search target.

In this embodiment, an estimated degradation degree selector 1902 selects an image degradation degree, which influences a feature subject to matching, from a plurality of image degradation degrees obtained from a plurality of image regions in which image degradation can be estimated by comparison with a known image. Alternatively, the estimated degradation degree selector 1902 generates an image degradation degree to be used for clothing feature matching by combining the plurality of image degradation degrees. In feature matching, the reliability of matching is generated in association with the estimated degradation degree, and sent. Alternatively, if the estimated degradation degree exceeds a predetermined threshold and the reliability significantly lowers, for example, the result of feature matching of the color of clothes with which the reliability of feature matching does not lower is adopted without performing feature matching of the pattern of clothes. Note that in an intermediate state, each feature matching operation is weighted to generate a matching result.

There are various methods of calculating an image degradation degree to be used for clothing feature matching by combining a plurality of image degradation degrees. Examples of the methods are a method of selecting a largest image degradation degree, and a method of calculating an image degradation degree by modeling. Modeling may be determined heuristically based on experimental values, or determined by learning using a plurality of images.

With this processing, an image degradation degree corresponding to a feature subject to matching is generated from a plurality of image degradation degrees, and the accuracy of feature matching is prevented from lowering due to the occurrence of image degradation, thereby maintaining the accuracy of a person search even in image degradation.

<<Functional Arrangement of Clothing Matcher>>

Figure 20A:
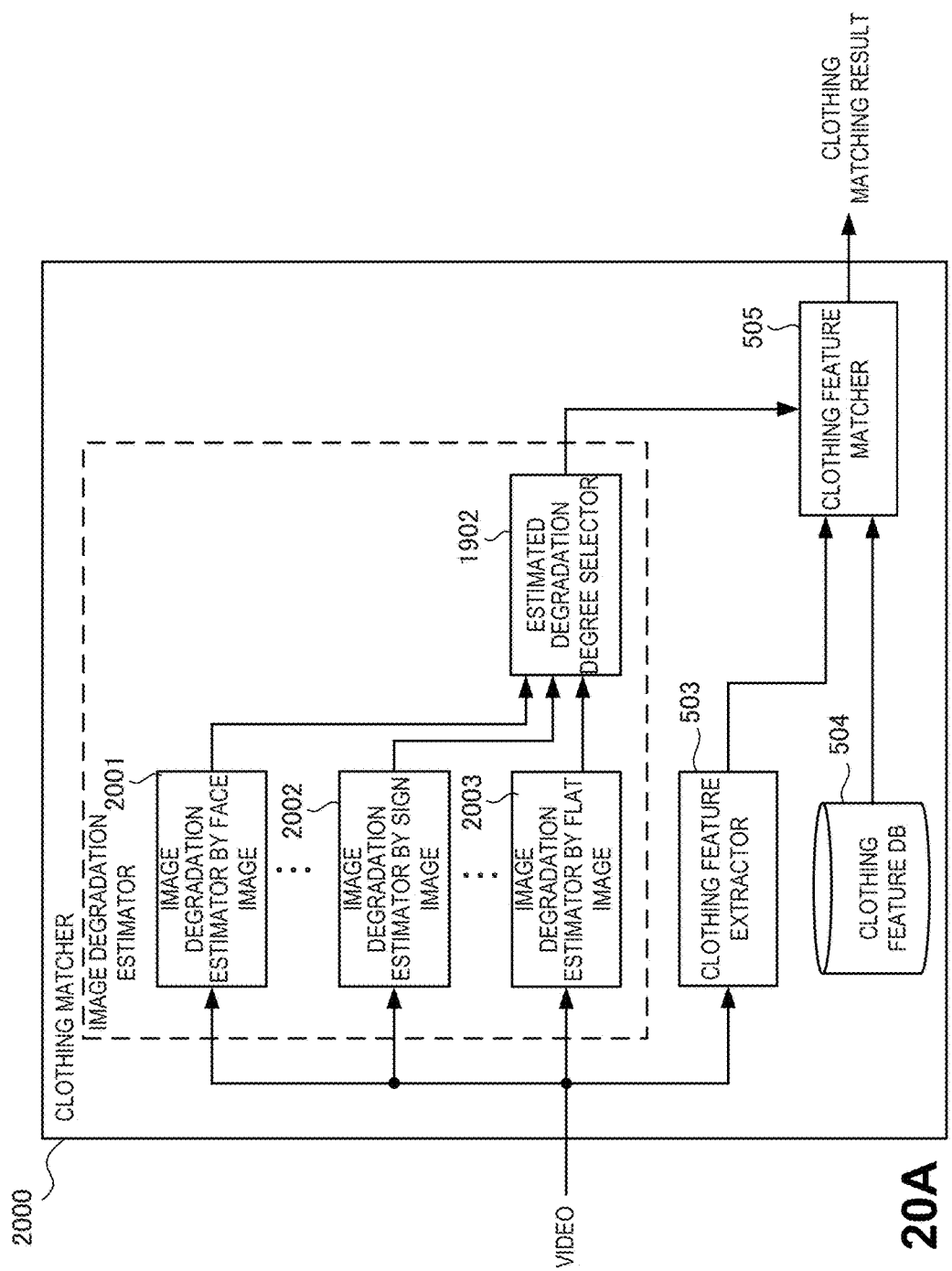
FIG. 20A is a block diagram showing the functional arrangement of a clothing matcher of the video processing apparatus according to the sixth embodiment of the present invention.

FIG. 20A is a block diagram showing the functional arrangement of a clothing matcher 2000 of the video processing apparatus 1900 according to this embodiment. Note that in FIG. 20A, the same reference numerals as in FIG. 5A denote the same functional components and a description thereof will be omitted.

The clothing matcher 2000 includes an image degradation estimator 2001 by a face image, an image degradation estimator 2002 by a sign image, an image degradation estimator 2003 by a flat image, and the estimated degradation degree selector 1902, which form an image degradation estimator. Note that the image degradation estimators 2001, 2002, and 2003 correspond to the image degradation estimators shown in FIGS. 5A, 16A, and 18A, respectively. The estimated degradation degree selector 1902 selects an image degradation degree to be used from the plurality of image degradation estimators 2001 to 2003.

(Estimated Degradation Degree Selection Table)

Figure 20B:
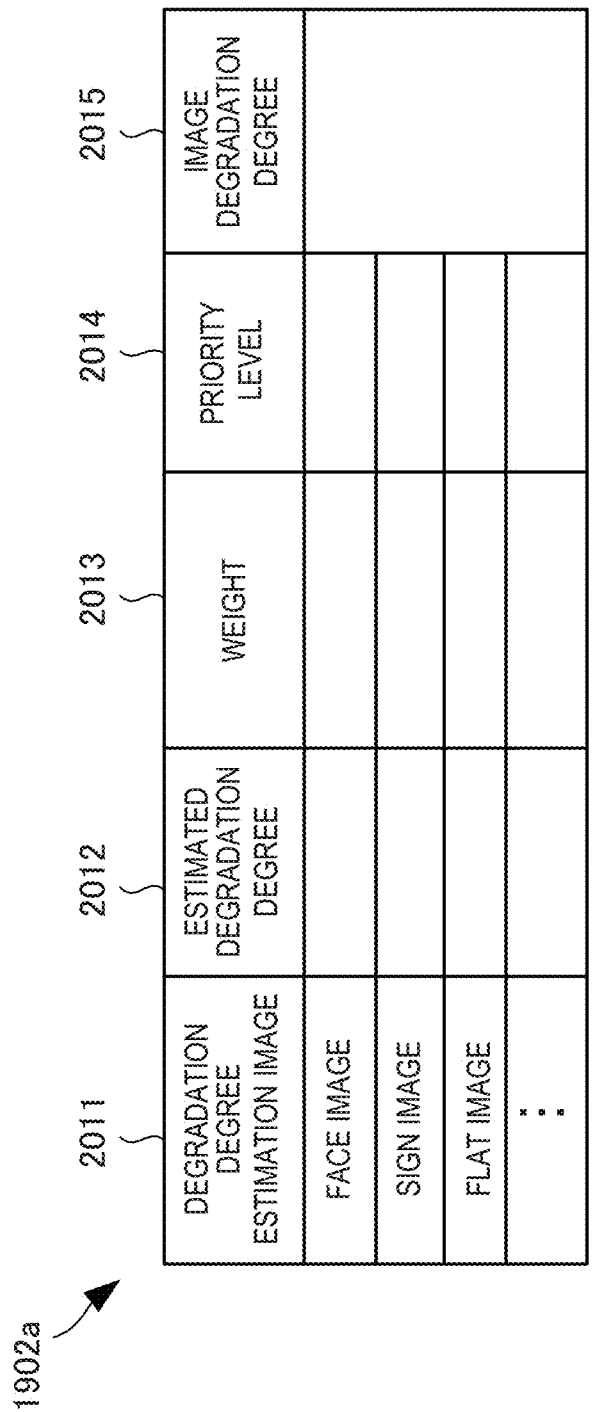
FIG. 20B is a table showing the structure of an estimated degradation degree selection table used by an estimated degradation degree selector according to the sixth embodiment of the present invention.

FIG. 20B is a table showing the structure of an estimated degradation degree selection table 1902a used by the estimated degradation degree selector 1902 according to this embodiment. The estimated degradation degree selection table 1902a is a table used by the estimated degradation degree selector 1902 to estimate an image degradation degree based on images of a plurality of regions.

The estimated degradation degree selection table 1902a stores an estimated degradation degree 2012, a weight 2013 for determining a contribution rate to feature matching, and a priority level 2014 for selection, in association with an image 2011 in which a degradation degree is estimated. The estimated degradation degree selection table 1902a stores an image degradation degree 2015 generated by the estimated degradation degree selector 1902.

According to this embodiment, appropriate image degradation is estimated in association with the feature of an object of a search target based on images of a plurality of regions in a video, and feature matching readily influenced by image degradation is especially controlled. With this control operation, it is possible to suppress a decrease in search accuracy of the object of a search target based on a feature extracted from a degraded image in the video.

Seventh Embodiment

A video processing apparatus according to this embodiment will be described. The video processing apparatus according to this embodiment is different from those in the second to sixth embodiments in that one of degrees of estimated image degradation generated based on a plurality of image degradation factors is selected based on an appropriate degradation factor, and used to control feature matching. Since other components and operations are the same as in the second to fifth embodiments, the same reference numerals and symbols denote the same components and operations and a detailed description thereof will be omitted.

Note that a person search will be exemplified in this embodiment. However, this embodiment is applied to another object search such as a vehicle search to obtain the same effects.

<<Functional Arrangement of Clothing Matcher>>

Figure 21A:
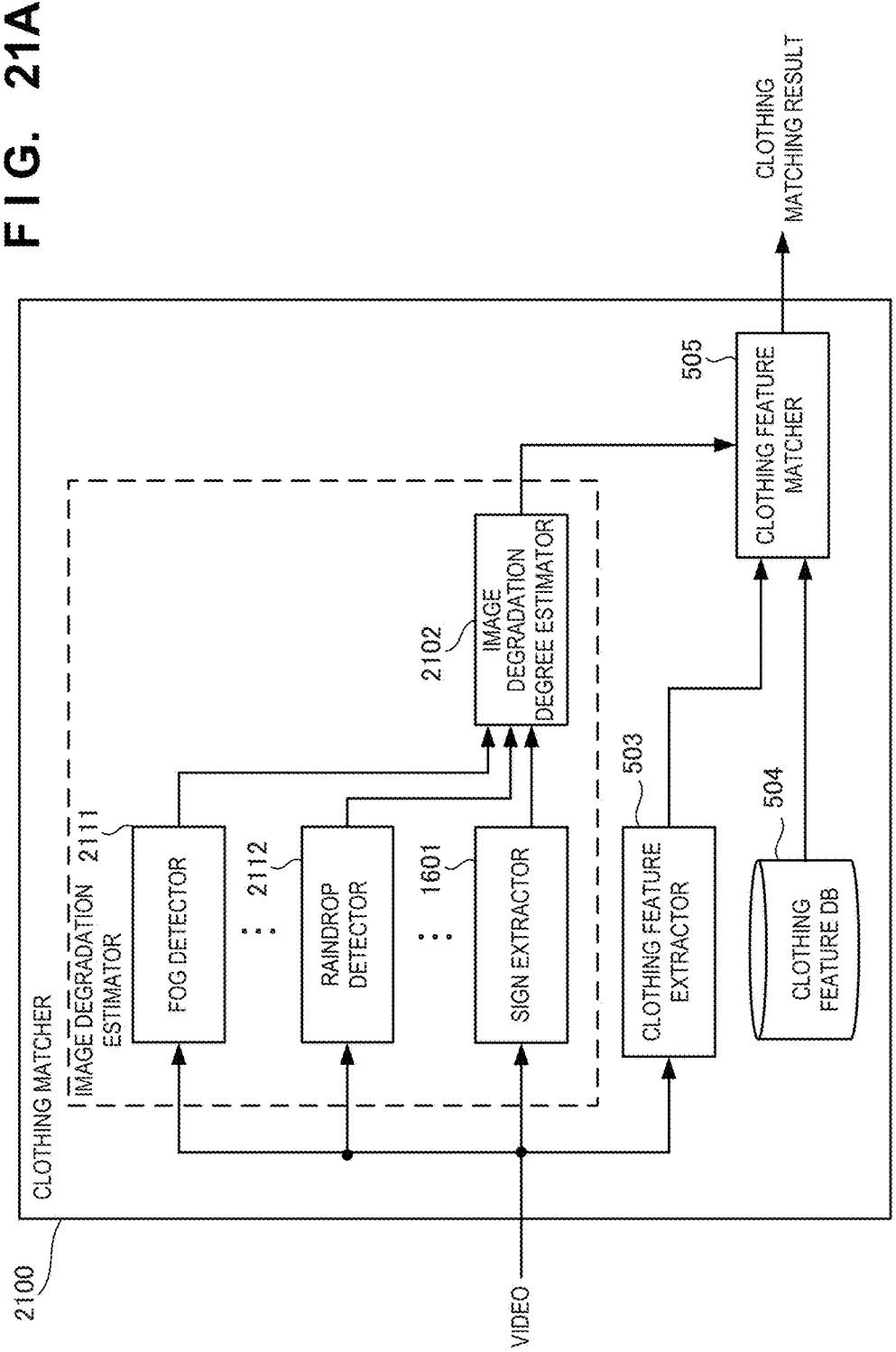
FIG. 21A is a block diagram showing the functional arrangement of a clothing matcher of a video processing apparatus according to the seventh embodiment of the present invention.

FIG. 21A is a block diagram showing the functional arrangement of a clothing matcher 2100 of the video processing apparatus according to this embodiment. Note that in FIG. 21A, the same reference numerals as in FIG. 5A denote the same functional components and a description thereof will be omitted.

The clothing matcher 2100 includes a fog detector 2111 for detecting a fog from a video, a raindrop detector 2112 for detecting raindrops from a video, a sign extractor 1601, and an image degradation degree estimator 2102, which form an image degradation estimator. Based on pieces of information from the fog detector 2111, raindrop detector 2112, and sign extractor 1601, the image degradation degree estimator 2102 estimates an image degradation degree influencing a feature subject to matching.

The fog detector 2111 detects a fog using, for example, a detector which has learned a tendency to make it difficult to see the entire screen by a fog as a whole. For example, by preparing learning images of a fog condition and other conditions to make a neural network learn, it is possible to detect a fog using the neural network which has learned. In this case, if an image of a spot can be acquired in advance, it is possible to detect a fog more accurately by including the image of the spot as a learning image. Similarly, as for raindrops, by inputting images of a rainfall condition and other conditions, and making a neural network learn, it is possible to construct a detector. When there are raindrops on the lens of a camera, detection is possible in the same manner. Note that the above-described method of detecting a fog or raindrops is merely an example, and other methods may be used. Furthermore, it may be possible to detect not only a fog or raindrops but also the degree of the fog or raindrops (the fog density, the amount of raindrops, or the like). This can be implemented by acquiring a video for each degree of a fog or raindrops, and making a neural network learn.

(Image Degradation Degree Estimation Table)

FIG. 21B is a table showing the structure of an image degradation degree estimation table 2102a used by an image degradation degree estimator 2102 according to this embodiment. The image degradation degree estimation table 2102a is a table used by the image degradation degree estimator 2102 to estimate an image degradation degree based on images of a plurality of degradation factors.

The image degradation degree estimation table 2102a stores a weight 2122 for determining a contribution rate to feature matching, and a priority level 2123 for selection, in association with a degradation factor 2121 which causes image degradation. The image degradation degree estimation table 2102a stores an image degradation degree 2124 generated by the image degradation degree estimator 2102.

According to this embodiment, appropriate image degradation is estimated from degrees of image degradation estimated based on a plurality of degradation factors from a video in association with the degradation factors or by combining the degradation factors, and feature matching readily influenced by image degradation is especially controlled. With this control operation, it is possible to suppress a decrease in search accuracy of an object of a search target based on a feature extracted from a degraded image in the video.

Eighth Embodiment

A video processing apparatus according to the eighth embodiment of the present invention will be described. The video processing apparatus according to this embodiment is different from those in the second to seventh embodiments in that image degradation is estimated in association with the type of a target image based on which a feature for searching for an object is obtained. In this embodiment, an example in which when searching for a person from a video, different degrees of image degradation are estimated in association with the types of patterns of clothes will be explained. Since other components and operations are the same as in the second to seventh embodiments, the same reference numerals and symbols denote the same components and operations and a detailed description thereof will be omitted. Note that a person search will be exemplified in this embodiment. However, this embodiment is applied to another object search such as a vehicle search to obtain the same effects.

<<Outline of Processing by Video Processing Apparatus>>

Figure 22:
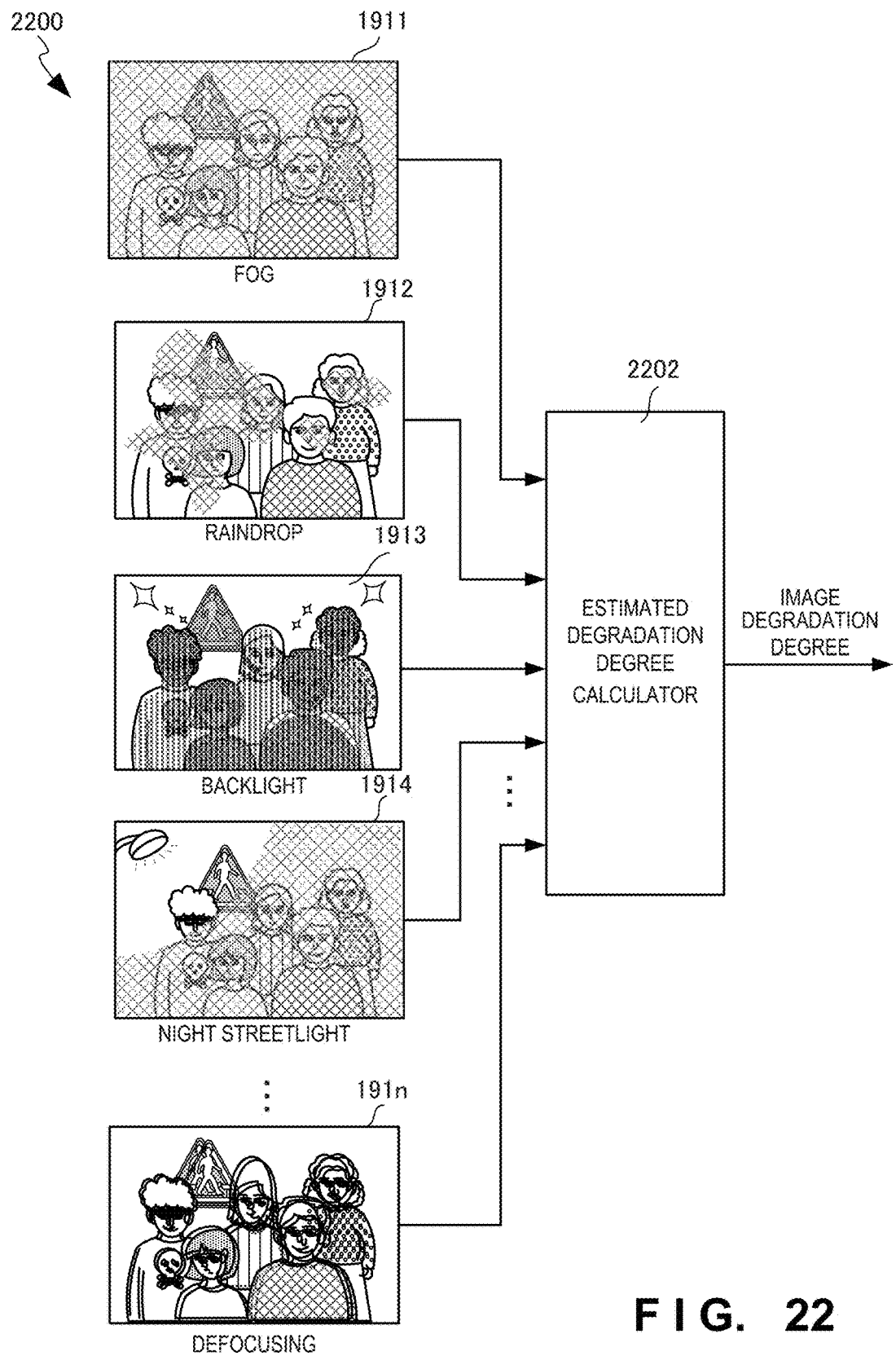
FIG. 22 is a view showing the outline of processing by a video processing apparatus according to the eighth embodiment of the present invention.

FIG. 22 is a view showing the outline of processing by a video processing apparatus 2200 according to this embodiment. Note that FIG. 22 shows processing up to generation of an image degradation degree. Processing of searching for an object from a video using the image degradation degree is the same as in FIG. 2, and an illustration and description thereof will be omitted. The same reference numerals as in FIG. 19 denote the same elements and a description thereof will be omitted.

The video processing apparatus 2200 searches for a characteristic person from video data of various videos 1911 to 191n. At this time, in the videos 1911 to 191n, image degradation occurs due to a camera condition (for example, a shake or defocusing) or an image capturing environment (for example, a fog, raindrops, or backlight) such as weather. If matching is performed using, as a feature, the pattern of the clothes of the person in the video with image degradation, the reliability of a person search lowers due to a decrease in accuracy of the feature. For example, if the clothes have a stripe, dot, or grid pattern, lines or dots cannot be recognized as a clearly separated pattern due to image degradation. On the other hand, a person dressed in blur pattern clothes may be unwantedly recognized as a search target.

In this embodiment, an estimated degradation degree calculator 2202 selects an image degradation degree, which influences a feature depending on a type of pattern as a feature subject to matching, from a plurality of image degradation degrees obtained from a plurality of image regions in which image degradation can be estimated by comparison with a known image. Alternatively, the estimated degradation degree calculator 2202 calculates an image degradation degree to be used for clothing feature matching by combining the plurality of image degradation degrees.

With this processing, an image degradation degree corresponding to a feature subject to matching is calculated, and the accuracy decrease of feature matching due to the occurrence of image degradation is prevented, thereby maintaining the accuracy of a person search even in image degradation.

<<Functional Arrangement of Clothing Matcher>>

Figure 23:
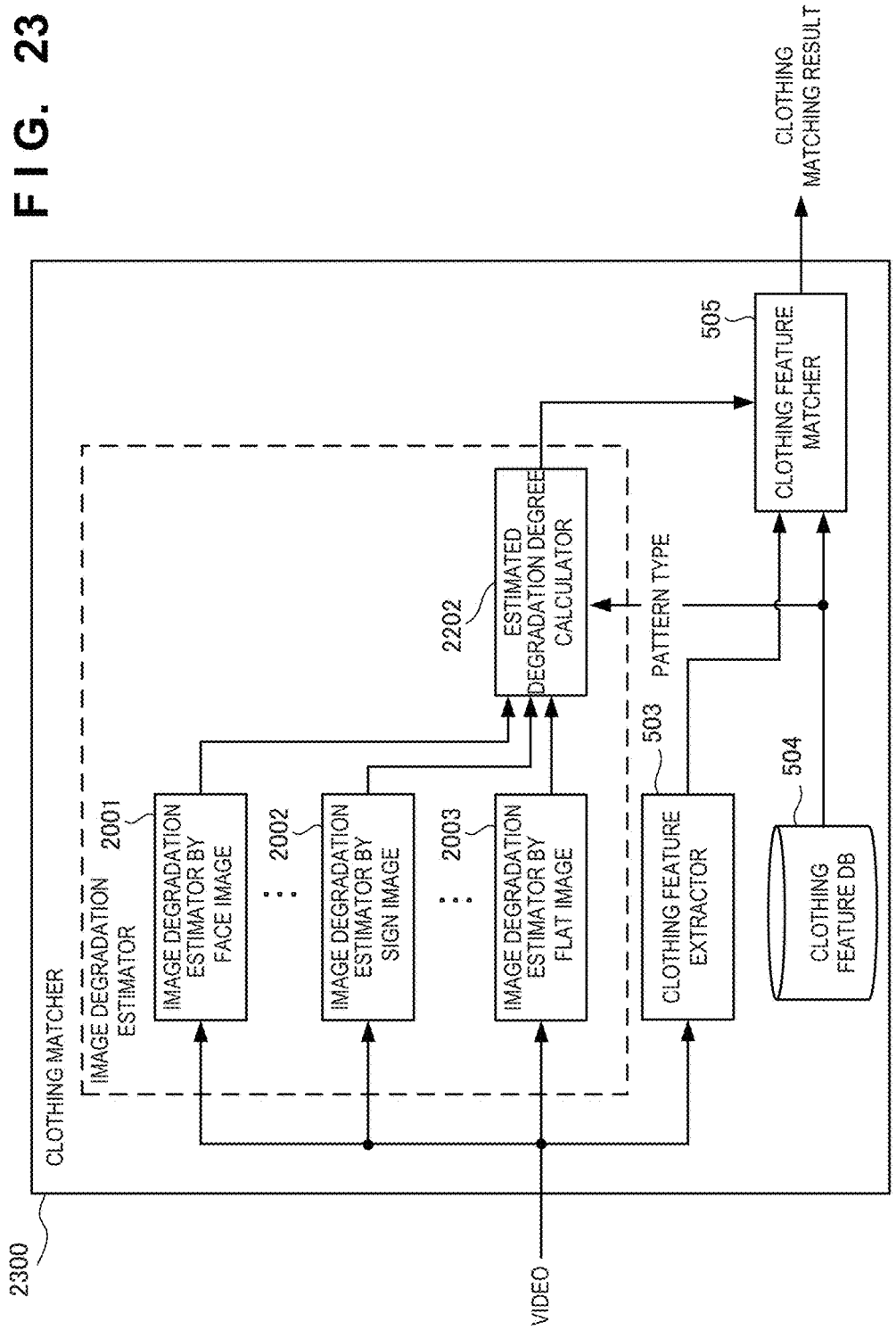
FIG. 23 is a block diagram showing the functional arrangement of a clothing matcher of the video processing apparatus according to the eighth embodiment of the present invention.

FIG. 23 is a block diagram showing the functional arrangement of a clothing matcher 2300 of the video processing apparatus 2200 according to this embodiment. Note that in FIG. 23, the same reference numerals as in FIGS. 5A and 20A denote the same functional components and a description thereof will be omitted.

The clothing matcher 2300 includes an image degradation estimator 2001 by a face image, an image degradation estimator 2002 by a sign image, an image degradation estimator 2003 by a flat image, and the estimated degradation degree calculator 2202, which form an image degradation estimator. The estimated degradation degree calculator 2202 calculates an estimated degradation degree based on a pattern type subject to feature matching from the plurality of image degradation estimators 2001 to 2003.

(Estimated Degradation Degree Calculation Table)

FIG. 24 is a table showing the structure of an estimated degradation degree calculation table 2202a used by the estimated degradation degree calculator 2202 according to this embodiment. The estimated degradation degree calculation table 2202a is a table used by the estimated degradation degree calculator 2202 to calculate an estimated degradation degree based on a pattern type subject to feature matching.

The estimated degradation degree calculation table 2202a stores a plurality of degradation degree estimation images 2402 in association with a pattern type 2401 subject to feature matching. The estimated degradation degree calculation table 2202a stores, in association with the degradation degree estimation image 2402, an estimated degradation degree 2403 estimated from the degradation degree estimation image 2402, and a calculated degradation degree 2404 calculated from the estimated degradation degree 2403 in association with the pattern type. The estimated degradation degree calculation table 2202a also stores a weight 2405 of feature matching.

The calculated degradation degree is a degradation degree obtained by correcting the estimated degradation degree in accordance with the pattern type. For example, if the pattern is close to a plain pattern, this is hardly influenced by degradation. However, if the pattern includes a number of small edges like a stripe pattern, the accuracy of matching abruptly drops as the degree of degradation increases. To deal with this, a calculated degradation degree is set so that it becomes a small value for a pattern close to a plain pattern, and it becomes a large value for a pattern like a stripe pattern. This degree may be calculated by learning, or determined heuristically based on experience and the like. Note that a case in which a degradation degree estimation image is directly stored has been described. However, only a conversion model for obtaining a calculated degradation degree from an estimated degradation degree may be stored. More specifically, a corresponding calculated degradation degree is stored for each value of a degradation estimation degree. Alternatively, a regression model of approximating the relationship between a degradation estimation degree and a calculated degradation degree may be obtained, and a parameter describing this model may be stored, thereby calculating a calculated degradation degree from an estimated degradation degree.

According to this embodiment, appropriate image degradation is estimated in association with the type of target image based on which a feature for searching for an object is obtained, and feature matching readily influenced by image degradation is especially controlled. With this control operation, it is possible to suppress a decrease in search accuracy of an object of a search target based on a feature extracted from a degraded image in the video.

Ninth Embodiment

A video processing apparatus according to this embodiment will be described. The video processing apparatus according to this embodiment is different from those in the second to eighth embodiments in that learning is performed for subsequent processing by feeding back estimation of image degradation, extraction of a feature, and a feature matching result to a feature database for storing a feature for matching. Since other components and operations are the same as in the second to eighth embodiments, the same reference numerals and symbols denote the same components and operations and a detailed description thereof will be omitted. Note that a person search will be exemplified in this embodiment. However, this embodiment is applied to another object search such as a vehicle search to obtain the same effects.

<<Functional Arrangement of Clothing Matcher>>

Figure 25A:
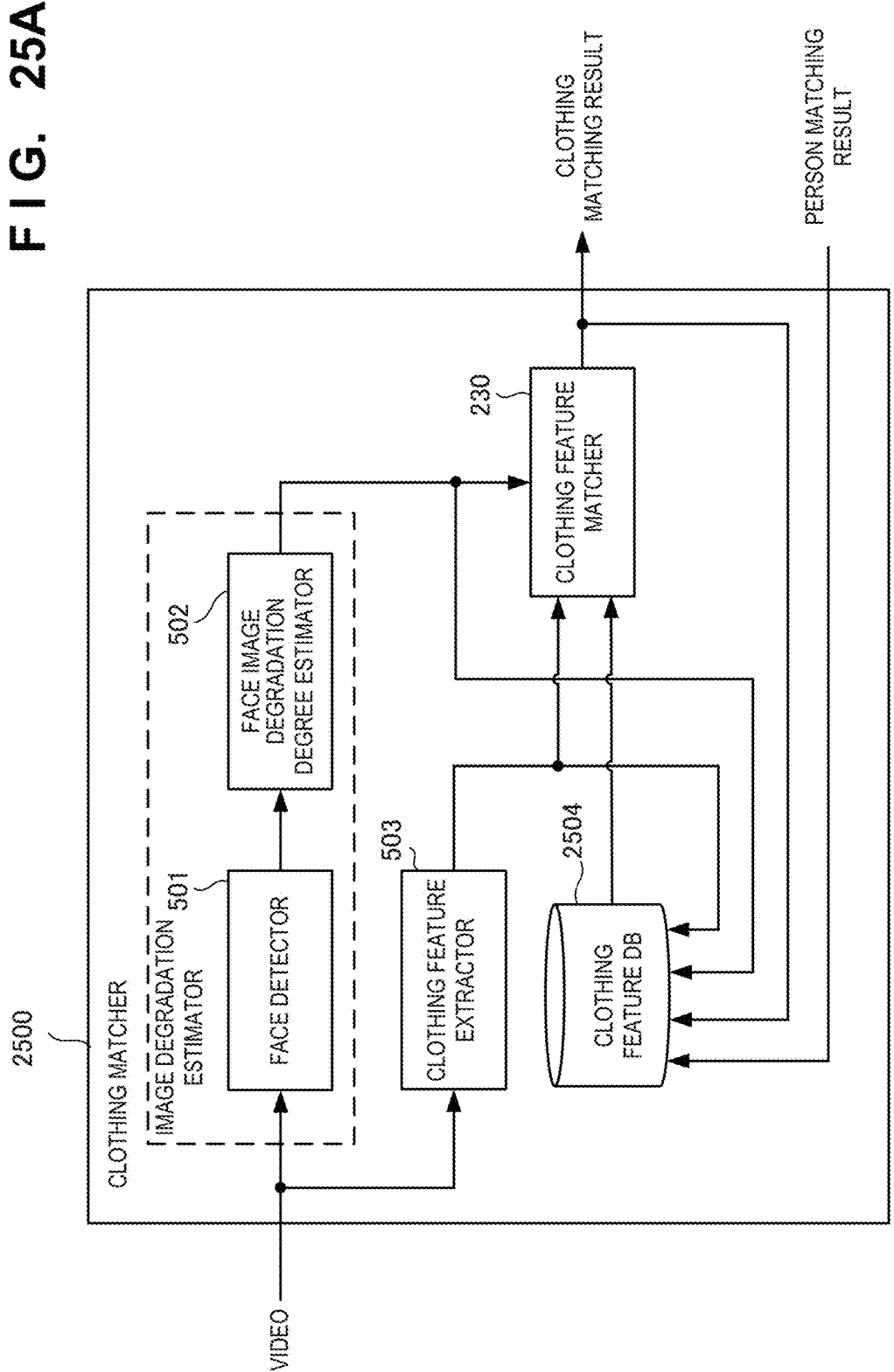
FIG. 25A is a block diagram showing the functional arrangement of a clothing matcher of a video processing apparatus according to the ninth embodiment of the present invention.

FIG. 25A is a block diagram showing the functional arrangement of a clothing matcher 2500 of the video processing apparatus according to this embodiment. Note that in FIG. 25A, the same reference numerals as in FIG. 5A denote the same functional components and a description thereof will be omitted.

A clothing feature DB 2504 of the clothing matcher 2500 stores a clothing feature for a search to perform matching with a feature extracted by a clothing feature extractor 503. The clothing feature DB 2504 also stores, in association with each other, an image degradation degree from an image degradation estimator, a clothing feature extracted by the clothing feature extractor 503, and a person matching result of a search person matcher 405, which have been fed back. These data are used for feature matching for a subsequent person search in order to reflect image degradation and perform a person search with higher accuracy.

More specifically, the relationship between an image degradation degree and reliability is learned, and a parameter of a model of calculating reliability from an image degradation degree is updated. For example, if image degradation is caused by a shake, a change degree of the clothing feature of the same person when a shake occurs with reference to a case in which no shake occurs is obtained based on fed back results, and the change degree of the feature and the degree of the shake obtained as an image degradation degree are associated with each other. By performing this operation for a plurality of samples, the relationship between the image degradation degree and the reliability is obtained and sequentially updated. To associate the features of the same person with each other between different frames, it is necessary to track the target person. Various existing methods can be used for the tracking processing. Alternatively, the operator may explicitly input whether a person is the same person in a different frame, thereby associating features. Similarly, as for a fog or raindrops, by comparing the features of the same person between frames including different degrees of a fog or raindrops, it is possible to calculate the relationship between the image degradation degree and the reliability based on fed back results.

(Clothing Feature DB)

Figure 25B:
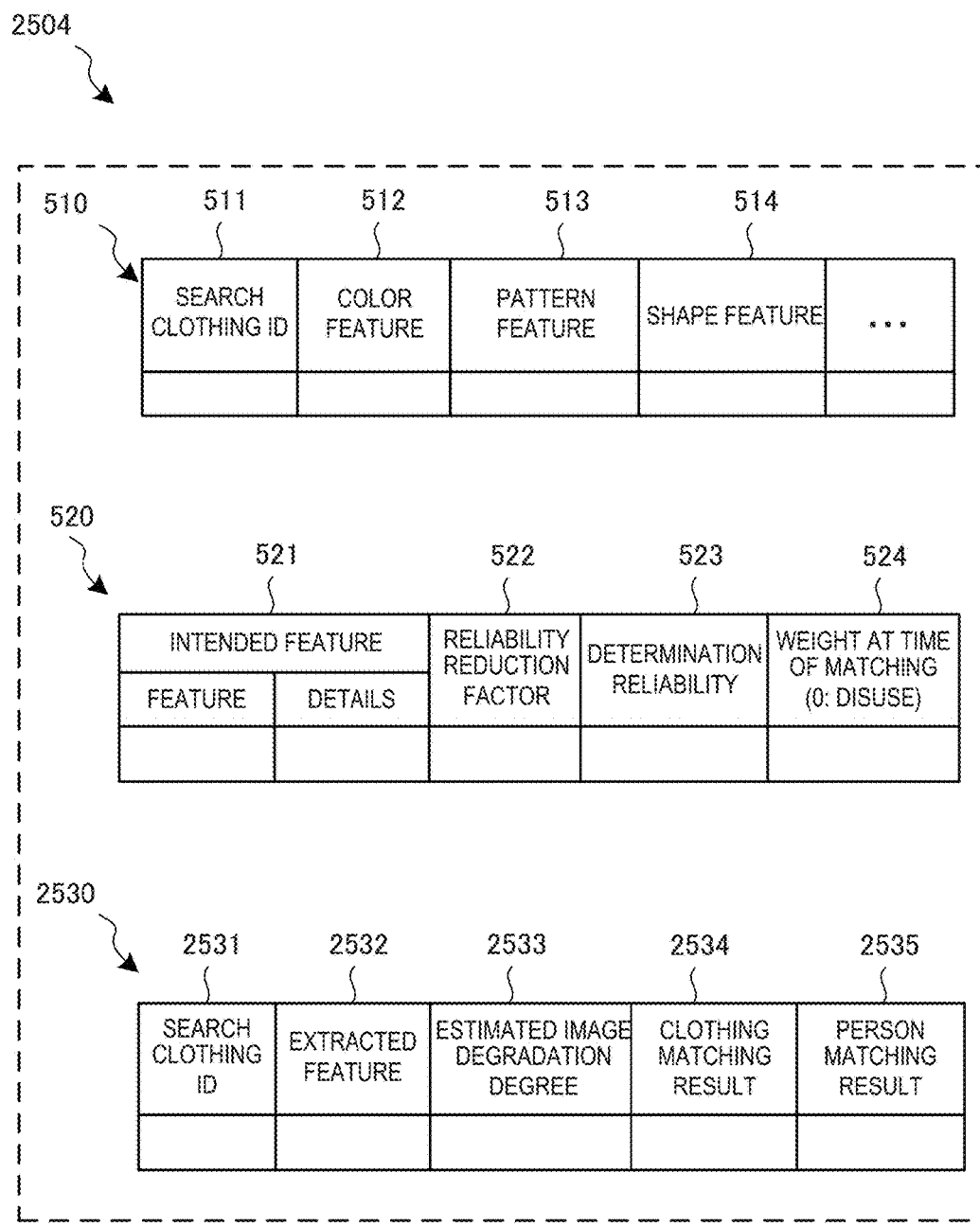
FIG. 25B is a view showing the structure of a clothing feature DB of the clothing matcher according to the ninth embodiment of the present invention.

FIG. 25B is a view showing the structure of the clothing feature DB 2504 of the clothing matcher 2500 according to this embodiment. Note that in FIG. 25B, the same reference numerals as in FIG. 5B denote the same elements and a description thereof will be omitted.

The clothing feature DB 2504 stores fed back matching information 2530 in addition to a feature table 510 and image degradation table 520 which are shown in FIG. 5B. The matching information 2530 stores an extracted feature 2532, an estimated image degradation degree, a clothing matching result 2534, and a person matching result 2535 in association with a clothing ID 2531 of a search target.

According to this embodiment, estimation of image degradation, extraction of a feature, and a feature matching result are fed back to a feature database, and used for subsequent processing. With this learning processing, it is possible to further suppress a decrease in search accuracy of an object of a search target based on a feature extracted from a degraded image in a video.

10th Embodiment

A video processing apparatus according to the tenth embodiment of the present invention will be described. The video processing apparatus according to this embodiment is different from those in the second to ninth embodiments in that matching between the degrees of image degradation of different images in a video and matching between extracted features of the different images are performed in addition to matching with a feature in a feature database. Since other components and operations are the same as in the second to ninth embodiments, the same reference numerals and symbols denote the same components and operations and a detailed description thereof will be omitted. Note that a person search will be exemplified in this embodiment. However, this embodiment is applied to another object search such as a vehicle search to obtain the same effects.

<<Functional Arrangement of Clothing Matcher>>

Figure 26:
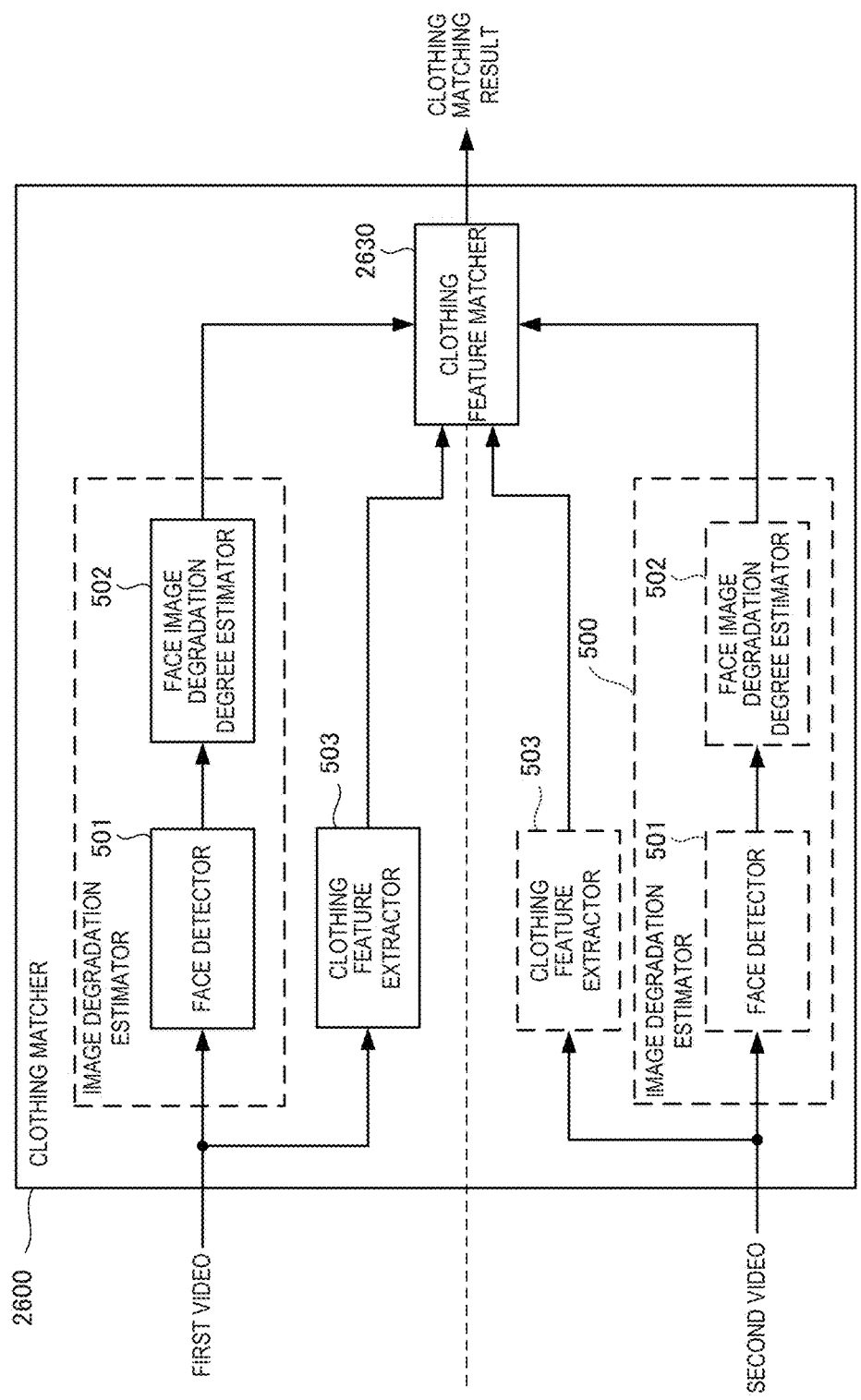
FIG. 26 is a block diagram showing the functional arrangement of a clothing matcher of a video processing apparatus according to the 10th embodiment of the present invention.

FIG. 26 is a block diagram showing the functional arrangement of a clothing matcher 2600 of the video processing apparatus according to this embodiment. Note that in FIG. 26, the same reference numerals as in FIG. 5A denote the same functional components and a description thereof will be omitted.

The clothing matcher 2600 includes a plurality of sets of face detectors 501, face image degradation degree estimators 502, and clothing feature extractors 503. Alternatively, the clothing matcher 2600 may repeatedly use the same face detector 501, face image degradation degree estimator 502, and clothing feature extractor 503. A clothing feature matcher 2630 performs matching between clothing features from the clothing feature extractors 503 of the plurality of sets and between image degradation degrees from image degradation estimators of the plurality of sets, thereby generating a matching result.

(Clothing Feature Matcher)

Figure 27A:
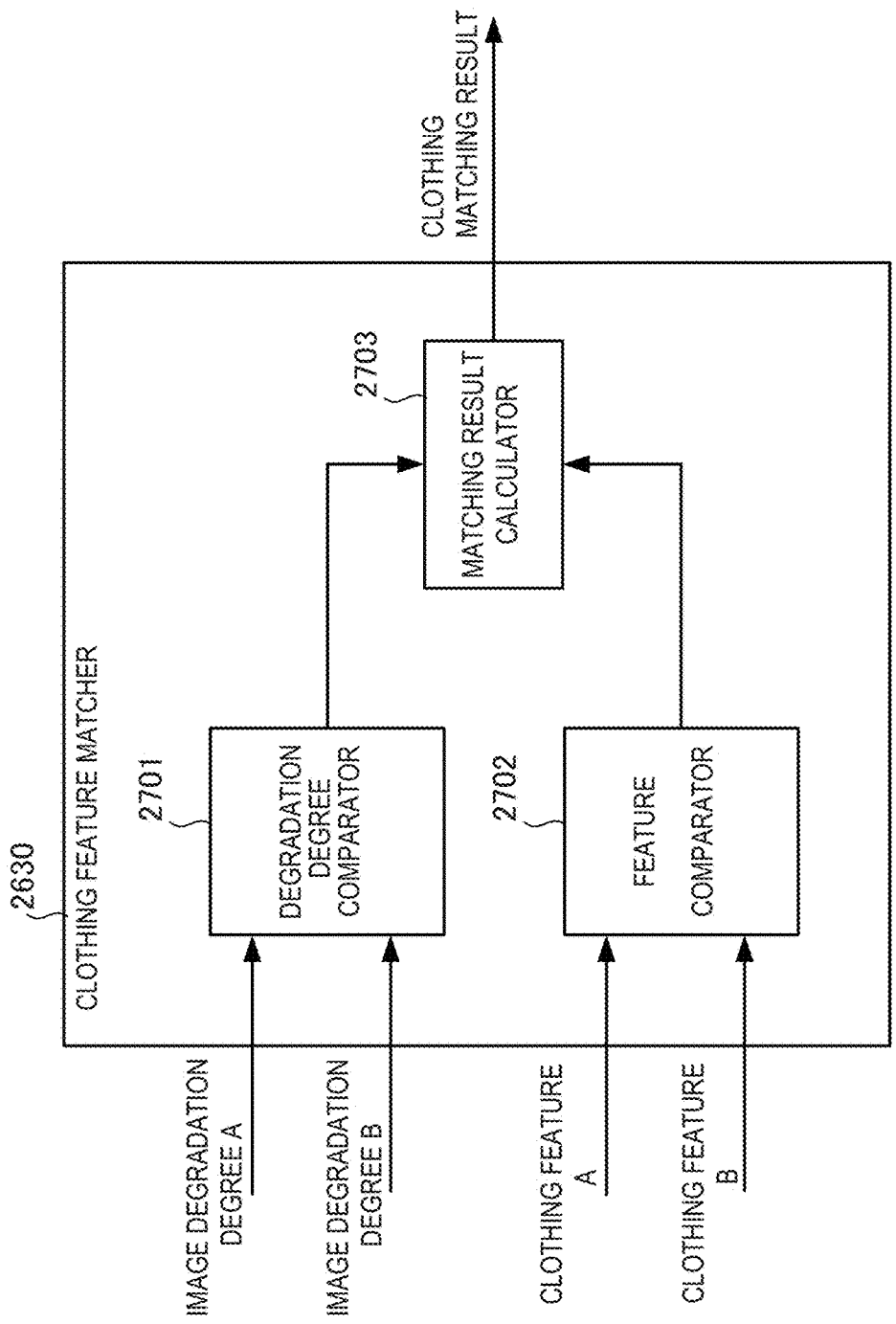
FIG. 27A is a block diagram showing the functional arrangement of a clothing feature matcher of the clothing matcher according to the 10th embodiment of the present invention.

FIG. 27A is a block diagram showing the functional arrangement of the clothing feature matcher 2630 of the clothing matcher 2600 according to this embodiment. Note that in FIG. 27A, one of image degradation degrees to be compared is denoted as image degradation degree A and the other is denoted as image degradation degree B. Furthermore, one of clothing features to be compared is denoted as clothing feature A and the other is denoted as clothing feature B.

The clothing feature matcher 2630 includes a degradation degree comparator 2701 for comparing image degradation degree A with image degradation degree B, and a feature comparator 2702 for comparing clothing feature A with clothing feature B. The clothing feature matcher 2630 also includes a matching result calculator 2703 for calculating a clothing matching result from the comparison result of the image degradation degrees and that of the clothing features.

(Clothing Feature Matching Table)

FIG. 27B is a table showing the structure of a clothing feature matching table 2630a used by the clothing feature matcher 2630 according to this embodiment. The clothing feature matching table 2630a is a table used by the clothing feature matcher 2630 to generate a clothing matching result from a plurality of image degradation degrees and a plurality of clothing features. An example of describing the matching results in a table format is shown for the sake of convenience but the matching results need not always be stored in the table format, similarly to FIG. 4C.

The clothing feature matching table 2630a stores an image degradation degree A 2712, an image degradation degree B 2713, and a degradation degree comparison result 2714 in association with a clothing ID 2711 of a search target. The clothing feature matching table 2630a also stores a clothing feature A 2715, a clothing feature B 2716, and a clothing feature comparison result 2717 in association with the clothing ID 2711 of the search target. The clothing feature matching table 2630a stores a degradation degree comparison result 2714. In addition, the clothing feature matching table 2630a stores a matching algorithm 2718 for generating a clothing matching result from the degradation degree comparison result 2714 and the clothing feature comparison result 2717, and a generated clothing matching result 1719.

According to this embodiment, matching is performed using combinations of estimated degrees of image degradation and extracted features. It is, therefore, possible to accurately search for an object from an image in the same environment while suppressing a decrease in search accuracy of the object of a search target based on a feature extracted from a degraded image in a video.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when a video processing program for implementing the functions of the embodiments is supplied to the system or apparatus directly or from a remote site. Hence, the present invention also incorporates the program installed in a computer to implement the functions of the present invention on the computer, a medium storing the program, and a WWW (World Wide Web) server that causes a user to download the program. The present invention specifically incorporates at least a non-transitory computer readable medium storing a program for causing the computer to execute the processing steps included in the above-described embodiments.

Other Expressions of Embodiments

Some or all of the above-described embodiments can also be described as in the following supplementary notes but are not limited to the followings.

(Supplementary Note 1)

There is provided a video processing apparatus comprising:

an image degradation estimator that extracts an image in an image region used as an index of image degradation from a video and estimates a degree of image degradation in the image region;

a feature extractor that extracts a feature of an object of a search target from the video;

a feature database that stores the feature of the object of the search target; and a matcher that controls matching between the extracted feature and the stored feature based on the degree of image degradation estimated by said image degradation estimator, when searching for the object from the video.

(Supplementary Note 2)

There is provided the video processing apparatus according to supplementary note 1, wherein the feature of the object is a feature of a pattern on the object.

(Supplementary Note 3)

There is provided the video processing apparatus according to supplementary note 2, wherein the image degradation estimator estimates a different degree of image degradation in association with a type of the pattern on the object.

(Supplementary Note 4)

There is provided the video processing apparatus according to supplementary note 2 or 3, wherein the feature of the object further includes a feature of a color of the object, and said matcher controls to perform matching by the feature of the color, if reliability of matching by the feature of the pattern lowers due to the image degradation.

(Supplementary Note 5)

There is provided the video processing apparatus according to any one of supplementary notes 1 to 4, wherein the image region is a part of the object of the search target.

(Supplementary Note 6)

There is provided the video processing apparatus according to supplementary note 5, wherein the object of the search target is a person, the image degradation estimator estimates a degree of image degradation based on a contour or an edge of a face image that is a part of a person image, and the feature is a feature of clothes or a portable object of the person.

(Supplementary Note 7)

There is provided the video processing apparatus according to supplementary note 5, wherein the object of the search target is a vehicle, the image degradation estimator estimates a degree of image degradation based on a contour or an edge of a license plate image that is a part of a vehicle image, and the feature is a feature of a body, an attachment, or a load of the vehicle.

(Supplementary Note 8)

There is provided the video processing apparatus according to any one of supplementary notes 1 to 7, wherein the image region is a specific region in the video.

(Supplementary Note 9)

There is provided the video processing apparatus according to supplementary note 8, wherein the image degradation estimator estimates a degree of image degradation based on an edge of a known sign image.

(Supplementary Note 10)

There is provided the video processing apparatus according to supplementary note 8, wherein the image degradation estimator estimates a degree of image degradation based on pixel variations of a known flat image.

(Supplementary Note 11)

There is provided the video processing apparatus according to any one of supplementary notes 1 to 10, wherein the image degradation estimator recognizes an image degradation factor from the video, and estimates a degree of image degradation based on the factor.

(Supplementary Note 12)

There is provided the video processing apparatus according to any one of supplementary notes 1 to 11, wherein at least a combination of the degree of image degradation, the extracted feature, and a result of the matching is fed back to the feature database.

(Supplementary Note 13)

There is provided the video processing apparatus according to any one of supplementary notes 1 to 12, wherein the matcher performs matching of combinations of at least the degrees of image degradation and the extracted feature.

(Supplementary Note 14)

There is provided a video processing method comprising:

extracting an image in an image region used as an index of image degradation from a video and estimating a degree of image degradation in the image region;

extracting a feature of an object of a search target from the video;

storing the feature of the object of the search target in a feature database; and controlling matching between the extracted feature and the stored feature based on the degree of image degradation estimated in the estimating, when searching for the object from the video.

(Supplementary Note 15)

There is provided the video processing method according to supplementary note 14, wherein the feature of the object is a feature of a pattern on the object.

(Supplementary Note 16)

There is provided the video processing method according to supplementary note 15, wherein in the estimating, a different degree of image degradation is estimated in association with a type of the pattern on the object.

(Supplementary Note 17)

There is provided the video processing method according to supplementary note 15 or 16, wherein the feature of the object further includes a feature of a color of the object, and control is executed to perform matching by the feature of the color in the controlling, if reliability of matching by the feature of the pattern lowers due to the image degradation.

(Supplementary Note 18)

There is provided the video processing method according to any one of supplementary notes 14 to 17, wherein the image region is a part of the object of the search target.

(Supplementary Note 19)

There is provided the video processing method according to supplementary note 18, wherein the object of the search target is a person, a degree of image degradation is estimated based on a contour or an edge of a face image that is a part of a person image in the estimating, and the feature is a feature of clothes or a portable object of the person.

(Supplementary Note 20)

There is provided the video processing method according to supplementary note 18, wherein the object of the search target is a vehicle, a degree of image degradation is estimated based on a contour or an edge of a license plate image that is a part of a vehicle image in the estimating, and the feature is a feature of a body, an attachment, or a load of the vehicle.

(Supplementary Note 21)

There is provided the video processing method according to any one of supplementary notes 14 to 20, wherein the image region is a specific region in the video.

(Supplementary Note 22)

There is provided the video processing method according to supplementary note 21, wherein in the estimating, a degree of image degradation is estimated based on an edge of a known sign image.

(Supplementary Note 23)

There is provided the video processing method according to supplementary note 21, wherein in the estimating, a degree of image degradation is estimated based on pixel variations of a known flat image.

(Supplementary Note 24)

There is provided the video processing method according to any one of supplementary notes 14 to 23, wherein in the estimating, an image degradation factor is recognized from the video and a degree of image degradation is estimated based on the factor.

(Supplementary Note 25)

There is provided the video processing method according to any one of supplementary notes 14 to 24, wherein at least a combination of the degree of image degradation, the extracted feature, and a result of the matching is fed back to the feature database.

(Supplementary Note 26)

There is provided the video processing method according to any one of supplementary notes 14 to 25, wherein in the controlling, matching of combinations of at least the degrees of image degradation and the extracted feature is performed.

(Supplementary Note 27)

There is provided a video processing program for causing a computer to execute a method, comprising:

extracting an image in an image region used as an index of image degradation from a video and estimating a degree of image degradation in the image region;

extracting a feature of an object of a search target from the video;

storing the feature of the object of the search target in a feature database; and controlling matching between the extracted feature and the stored feature based on the degree of image degradation estimated in the estimating, when searching for the object from the video.

(Supplementary Note 28)

There is provided the video processing program according to supplementary note 27, wherein the feature of the object is a feature of a pattern on the object.

(Supplementary Note 29)

There is provided the video processing program according to supplementary note 28, wherein in the estimating, a different degree of image degradation is estimated in association with a type of the pattern on the object.

(Supplementary Note 30)

There is provided the video processing program according to supplementary note 28 or 29, wherein the feature of the object further includes a feature of a color of the object, and control is executed to perform matching by the feature of the color in the controlling, if reliability of matching by the feature of the pattern lowers due to the image degradation.

(Supplementary Note 31)

There is provided the video processing program according to any one of supplementary notes 27 to 30, wherein the image region is a part of the object of the search target.

(Supplementary Note 32)

There is provided the video processing program according to supplementary note 31, wherein the object of the search target is a person, a degree of image degradation is estimated based on a contour or an edge of a face image that is a part of a person image in the estimating, and the feature is a feature of clothes or a portable object of the person.

(Supplementary Note 33)

There is provided the video processing program according to supplementary note 31, wherein the object of the search target is a vehicle, a degree of image degradation is estimated based on a contour or an edge of a license plate image that is a part of a vehicle image in the estimating, and the feature is a feature of a body, an attachment, or a load of the vehicle.

(Supplementary Note 34)

There is provided the video processing program according to any one of supplementary notes 27 to 33, wherein the image region is a specific region in the video.

(Supplementary Note 35)

There is provided the video processing program according to supplementary note 34, wherein in the estimating, a degree of image degradation is estimated based on an edge of a known sign image.

(Supplementary Note 36)

There is provided the video processing program according to supplementary note 34, wherein in the estimating, a degree of image degradation is estimated based on pixel variations of a known flat image.

(Supplementary Note 37)

There is provided the video processing program according to any one of supplementary notes 27 to 36, wherein in the estimating, an image degradation factor is recognized from the video and a degree of image degradation is estimated based on the factor.

(Supplementary Note 38)

There is provided the video processing program according to any one of supplementary notes 27 to 37, wherein at least a combination of the degree of image degradation, the extracted feature, and a result of the matching is fed back to the feature database.

(Supplementary Note 39)

There is provided the video processing program according to any one of supplementary notes 27 to 38, wherein in the controlling, matching of at least two combinations each including the degrees of image degradation or the extracted features is performed.

This application claims the benefit of Japanese Patent Application No. 2013-173165 filed on Aug. 23, 2013, which is hereby incorporated by reference herein in its entirety.

The invention claimed is:

1. A video processing apparatus, the apparatus comprising:

a feature database that stores features of objects, the objects associated with each other;

a memory storing instructions; and a processor configured to execute the instructions to:

extract an image in an image region used as an index of image degradation from a video and estimate a degree of image degradation in the image region;

extract a feature of an object to be a search target from the video;

and change matching processing between the extracted feature and the stored features in accordance with the estimated degree of image degradation, when searching for the object from the video.

2. The video processing apparatus according to claim 1, wherein the feature of the object is a feature of a pattern on the object.

3. The video processing apparatus according to claim 2, wherein the instructions to estimate the degree of image degradation include instructions to estimate a different degree of image degradation in association with a type of the pattern on the object.

4. The video processing apparatus according to claim 2, wherein the feature of the object further includes a feature of a color of the object, and the instructions to change matching processing include instructions to perform matching by the feature of the color, if reliability of matching by the feature of the pattern lowers due to the image degradation.

5. The video processing apparatus according to claim 1, wherein the image region is a part of the object of the search target.

6. The video processing apparatus according to claim 5, wherein the object as the search target is a person, the instructions to estimate the degree of image degradation include instructions to estimate a degree of image degradation based on a contour or an edge of a face image that is a part of a person image, and the feature is a feature of clothes or a portable object of the person.

7. The video processing apparatus according to claim 5, wherein the object of the search target is a vehicle, the instructions to estimate the degree of image degradation include instructions to estimate a degree of image degradation based on a contour or an edge of a license plate image that is a part of a vehicle image, and the feature is a feature of a body, an attachment, or a load of the vehicle.

8. The video processing apparatus according to claim 1, wherein the image region is a specific region in the video.

9. The video processing apparatus according to claim 8, wherein the instructions to estimate the degree of image degradation include instructions to estimate a degree of image degradation based on an edge of a known sign image.

10. The video processing apparatus according to claim 8, wherein the instructions to estimate the degree of image degradation include instructions to estimate a degree of image degradation based on pixel variations of a known flat image.

11. The video processing apparatus according to claim 1, wherein the instructions to estimate the degree of image degradation include instructions to recognize an image degradation factor from the video, and estimate a degree of image degradation based on the factor.

12. The video processing apparatus according to claim 1, wherein at least a combination of the degree of image degradation, the extracted feature, and a result of the matching is fed back to said feature database.

13. The video processing apparatus according to claim 1, wherein the instructions to change matching processing include instructions to perform matching of combinations of at least the degree of image degradation and the extracted feature.

14. A video processing method comprising:
extracting an image in an image region used as an index of image degradation from a video and estimating a degree of image degradation in the image region;
extracting a feature of an object of a search target from the video;
storing the feature of the object of the search target in a feature database; and
changing matching processing between the extracted feature and the stored feature in accordance with the estimated degree of image degradation, when searching for the object from the video.

15. A non-transitory computer readable medium storing a video processing program for causing a computer to execute a method, comprising:
extracting an image in an image region used as an index of image degradation from a video and estimating a degree of image degradation in the image region;
extracting a feature of an object of a search target from the video;
storing the feature of the object of the search target in a feature database; and
changing matching processing between the extracted feature and the stored feature in accordance with the estimated degree of image degradation, when searching for the object from the video.

16. A video processing apparatus, the apparatus comprising:
a feature database that stores features of objects and the objects associated with each other;
a memory storing instructions; and
a processor configured to execute the instructions to:
extract an image in an image region used as an index of image degradation from a video and estimate a degree of image degradation in the image region;
extract a feature of an object to be a search target from the video; and
match between the extracted feature and the stored features, and output a matching result with the estimated degree of image degradation, when searching for the object from the video.

17. A video processing apparatus, the apparatus comprising:
a feature database that stores plurality kinds of features of an object and the object associated with each other;
a memory storing instructions; and
a processor configured to execute the instructions to:
extract an image in an image region used as an index of image degradation from a video and estimate a degree of image degradation in the image region;
extract the plurality kinds of features of an object to be a search target from the video; and
change a combination of the plurality kinds of features to be used on matching between the extracted features and the stored features, in accordance with the estimated degree of image degradation, when searching for the object from the video.

* * * * *